(12) United States Patent
Richard et al.

(10) Patent No.: US 6,847,450 B2
(45) Date of Patent: Jan. 25, 2005

(54) SYSTEM AND METHOD FOR OPTICAL MULTIPLEXING AND/OR DEMULTIPLEXING

(75) Inventors: Jenkin A. Richard, Palo Alto, CA (US); Eric V. Chamness, Menlo Park, CA (US); George H. Guan, Fremont, CA (US); Anjul K. Katare, Fremont, CA (US); Steven J. Benerofe, San Francisco, CA (US); Qunwen Leng, San Jose, CA (US)

(73) Assignee: Oplink Communications, Inc., San Jose, CA (US)

( * ) Notice: Subject to any disclaimer, the term of this patent is extended or adjusted under 35 U.S.C. 154(b) by 84 days.

(21) Appl. No.: 10/206,624

(22) Filed: Jul. 26, 2002

(65) Prior Publication Data

US 2003/0020913 A1 Jan. 30, 2003

Related U.S. Application Data

(63) Continuation-in-part of application No. 09/916,624, filed on Jul. 27, 2001.
(60) Provisional application No. 60/350,407, filed on Jan. 18, 2002.

(51) Int. Cl.$^7$ .............................................. G01B 11/00
(52) U.S. Cl. .................. 356/399; 356/153; 356/139.04
(58) Field of Search ................................ 356/153, 399, 356/139.04

(56) References Cited

U.S. PATENT DOCUMENTS

| | | | |
|---|---|---|---|
| 3,879,105 A | 4/1975 | Broche et al. ............... 359/431 |
| 4,118,109 A | 10/1978 | Crawford et al. ........... 359/196 |
| 4,146,329 A | 3/1979 | King et al. .................. 356/152 |
| 4,468,119 A | 8/1984 | Hamar ..................... 356/152.1 |
| 4,636,030 A | 1/1987 | Carter et al. ............. 350/96.18 |
| 4,701,031 A | 10/1987 | Penney et al. .............. 350/371 |
| 4,741,796 A | 5/1988 | Althaus et al. .......... 156/272.4 |

(List continued on next page.)

FOREIGN PATENT DOCUMENTS

| | | |
|---|---|---|
| EP | 56143928 | 4/1980 |
| EP | 56137303 | 10/1981 |
| EP | 0268523 | 5/1988 |
| EP | 0651475 | 5/1995 |
| EP | 1014125 | 6/2000 |

OTHER PUBLICATIONS

Hecht, Eugene, Optics, 2$^{nd}$ Ed., Addison–Wesley Publishing Co., 1987, pp. 166–169.
O'Shea, Donald C., "Mirrors and Prisms," Elements of Modern Optical Design, John Wiley & Sons, Inc., 1985, pp. 119–141.
Mobarhan, Kamran S. et al., "Fiber to Waveguide Alignment Algorithm," Application Note—Fiber to Waveguide Alignment Algorithm, Newport Corporation Worldwide Headquarters, No. 6, pp. 1–5.

Primary Examiner—Michael P. Stafira
Assistant Examiner—Juan D Valentin, II
(74) Attorney, Agent, or Firm—Fish & Richardson P.C.

(57) ABSTRACT

Improved methods and systems for routing and aligning beams and optical elements in an optical device include a multiplexing device and/or a demultiplexing device, which includes an optical alignment element (OAE). The OAE can be configured to substantially compensate for the cumulative alignment errors in the beam path. The OAE allows the optical elements in a device, other than the OAE, to be placed and fixed in place without substantially compensating for optical alignment errors. The OAE is inserted into the beam path and adjusted. This greatly increases the ease in the manufacturing of optical devices, especially for devices with numerous optical elements, and lowers the cost of manufacturing. The multiplexing and/or demultiplexing device can reside within a standard small form factor, such as a GBIC. The devices fold the paths of the traversing beams with a geometry which allows a small package.

31 Claims, 84 Drawing Sheets

U.S. PATENT DOCUMENTS

| | | | |
|---|---|---|---|
| 4,798,439 A | 1/1989 | Preston | 350/96.2 |
| 4,850,686 A | 7/1989 | Morimoto et al. | 359/196 |
| 4,988,167 A | 1/1991 | Fergason | 349/195 |
| 5,223,970 A | 6/1993 | Oono et al. | 359/223 |
| 5,229,883 A | 7/1993 | Jackson et al. | 359/569 |
| 5,448,662 A | 9/1995 | Kittell et al. | 385/25 |
| 5,583,683 A | 12/1996 | Scobey | |
| 5,602,955 A | 2/1997 | Haake | 385/136 |
| 5,638,472 A | 6/1997 | Van Delden | 385/33 |
| 5,854,651 A | 12/1998 | Kessler et al. | 347/241 |
| 5,859,947 A * | 1/1999 | Kiryuscheva et al. | 356/153 |
| 5,926,594 A * | 7/1999 | Song et al. | 385/49 |
| 5,953,354 A | 9/1999 | Staver et al. | 372/18 |
| 6,042,249 A | 3/2000 | Spangenberg | 362/259 |
| 6,098,264 A * | 8/2000 | Harrigan et al. | 29/464 |
| 6,118,912 A | 9/2000 | Xu | |
| 6,137,926 A | 10/2000 | Maynard | 385/18 |
| 6,187,515 B1 | 2/2001 | Tran et al. | 430/321 |
| 6,196,226 B1 | 3/2001 | Hochman et al. | 128/653.1 |
| 6,205,266 B1 * | 3/2001 | Palen et al. | 385/15 |
| 6,275,630 B1 | 8/2001 | Yang et al. | 385/37 |
| 6,339,470 B1 * | 1/2002 | Papademetriou et al. | 356/153 |
| 6,473,250 B1 | 10/2002 | Chapman et al. | 359/837 |
| 6,555,983 B1 * | 4/2003 | Davies | 318/567 |
| 6,587,611 B1 * | 7/2003 | Hunt | 385/18 |
| 6,610,974 B1 * | 8/2003 | Hunt et al. | 385/18 |

* cited by examiner

TOP ISOMETRIC VIEW

BOTTOM ISOMETRIC VIEW

TOP VIEW

SIDE VIEW

SIDE VIEW

BOTTOM ISOMETRIC VIEW

BOTTOM VIEW

ISOMETRIC VIEW

FRONT VIEW

ISOMETRIC VIEW

TOP VIEW

TOP ISOMETRIC VIEW

TOP ISOMETRIC VIEW

BOTTOM ISOMETRIC VIEW

BOTTOM ISOMETRIC VIEW

SIDE CROSS-SECTIONAL VIEW

ISOMETRIC VIEW

TOP VIEW

TOP ISOMETRIC VIEW

SIDE CROSS-SECTIONAL VIEW

SIDE CROSS-SECTIONAL VIEW

SIDE VIEW

SIDE VIEW

TOP ISOMETRIC VIEW

BOTTOM ISOMETRIC VIEW

TOP ISOMETRIC VIEW

BOTTOM ISOMETRIC VIEW

FRONT VIEW

SIDE VIEW

TOP ISOMETRIC VIEW

BOTTOM ISOMETRIC VIEW

SIDE VIEW

TOP ISOMETRIC VIEW

BOTTOM ISOMETRIC VIEW

TOP VIEW

SIDE VIEW

TOP ISOMETRIC VIEW

BOTTOM ISOMETRIC VIEW

TOP VIEW

FRONT VIEW

SIDE VIEW

TOP ISOMETRIC VIEW

BOTTOM ISOMETRIC VIEW

BACK VIEW

FRONT VIEW

SYSTEM AND METHOD FOR OPTICAL MULTIPLEXING AND/OR DEMULTIPLEXING

CROSS-REFERENCE TO RELATED APPLICATIONS

This application is a Continuation-in-Part of co-pending U.S. patent application Ser. No. 09/916,624 entitled "Optical Alignment Element Method," filed on Jul. 27, 2001. This application also claims priority from Provisional Application Ser. No. 60/350,407 entitled "System and Method for Optical Multiplexing and/or Demultiplexing," filed on Jan. 18, 2002.

FIELD OF THE INVENTION

The field of the invention relates to routing and alignment of beams in an optical system and more particularly to systems and methods for wave division multiplexing and/or demultiplexing for a fiber optic network.

BACKGROUND OF THE INVENTION

Precision alignment of an optical beam through optical devices and systems may pose a variety of challenges. Devices may contain multiple optical elements, each having an associated alignment error that must be corrected. For instance, in optical multiplexing, a number of beams from different sources may need to be aligned with the tip of an optical fiber and each beam path may have different alignment error due to inaccuracies inherent in the fabrication and placement of optical components used in the device. One approach to alignment involves individually aligning the beam source and target, as well as each optical component, in multiple dimensions as they are placed. Manipulating multiple interdependent components may be complex and time consuming, and may be difficult due to the size and configuration of the system. In addition, aligning the source or target can be difficult, since it may be electrically powered and have unique mounting or monitoring requirements. Also, the source or target may be the largest element and allowing for movement during alignment may increase the form factor of the entire device.

One example of an optical system requiring alignment is an optical network carrying multiple channels of information on an optical fiber. The information on each channel may be carried in an optical signal within a defined range of wavelengths that can be separated from the other channels. Wavelength division multiplexing (WDM) may be used to add a channel to the fiber or to combine and add a number of channels to the fiber. Wavelength division demultiplexing (WDDM) may be used to separate channels from the fiber.

One approach for WDDM is to use dispersion to separate the channels in an optical signal. However, it may be difficult to align the multiple dispersed channels with target fibers or other optical components intended to receive the separate channels. Among other things, temperature changes may cause thermal expansion or contraction of components that result in alignment error. Moreover, a long beam path may be required to achieve sufficient physical separation of the channels, which exacerbates alignment errors and may place limitations on the minimum size of the system.

Another approach involves using wavelength filters to separate individual channels from the incoming signal. In order to provide alignment, the signals may be carried to and from the filters by optical fibers coupled to the filters. However, a series of fiber loops may be required to route the signals to and from the filters, which can place limitations on the minimum size of the system. For instance, a WDDM may interface with a plurality of receive optical assemblies (ROSAs) which use a standard form factor, such as a GigaBaud Interface Converter (GBIC) form factor.

The GBIC specification was developed by a group of electronic manufacturers in order to arrive at a standard form factor transceiver module for use with a wide variety of serial transmission media and connectors. The specification defines the electronic, electrical, and physical interface of a removable serial transceiver module designed to operate at Gigabaud speeds. A GBIC provides a pluggable communication module which may be inserted and removed from a host or switch chassis without powering off the receiving socket. The GBIC form factor defines a module housing which includes a first electrical connector for connecting the module to a host device or chassis. This first electrical connector mates with a standard socket, which provides the interface between the host device printed circuit board and the module. The GBIC module itself is designed to slide into a mounting slot formed within the chassis of a host device.

Each GBIC may be coupled to an optical fiber loop that feeds into a filter. The fiber loops and other components may be included in a housing with a form factor much larger than the GBIC. Accordingly, one possible design for a 4-to-1 WDDM system would use four GBICs (one for receiving each channel) and a separate housing for the WDDM. In many applications, however, it may be desirable to provide a much more compact design, such as a WDM or WDDM that can be configured to fit within a single GBIC or smaller form factor.

Accordingly, there exists a need for improved methods and systems for routing and aligning beams and optical elements in an optical device, such as a WDM, WDDM or other optical device.

SUMMARY OF THE INVENTION

Improved methods and systems for routing and aligning beams and optical elements in an optical device, such as a WDM, WDDM or other optical device, are provided in accordance with embodiments of the present invention.

One aspect of the present invention provides an optical alignment element (OAE) that can be configured to substantially compensate for the cumulative alignment errors in the beam path. The OAE allows the optical elements in a device, other than the OAE, to be placed and fixed in place without substantially compensating for optical alignment errors. The OAE is inserted into the beam path and adjusted. This greatly increases the ease in the manufacturing of optical devices, especially for devices with numerous optical elements, and lowers the cost of manufacturing.

Another aspect of the present invention provides a compact multiplexer and/or demultiplex configuration which allows for the alignment of multiple folded beam paths to combine or separate optical channels. In one embodiment, a number of filters and mirrors are mounted on a core to route the beams. This aspect of the invention can be used to provide a very compact design and to permit flexibility in the placement of optical components. For instance, active components (such as lasers or optical receivers) may be positioned so that the electrical leads pass through the bottom of the device for convenient mounting to a printed circuit board, while an optical fiber which transmits or receives the optical signal from the network passes through the side of the device. The flexibility in routing, folding and aligning optical beams allows the components to be positioned conveniently for interfacing to external devices rather than being constrained by the alignment requirements of the device.

Another aspect of the present invention uses a compact form factor for a multiplexing device and/or demultiplexing device. The form factor may be a standard form factor typically used for a pluggable communications module which interfaces between serial transmission media and a host socket. These form factors may be defined for hot pluggable devices, such as receive optical sub-assemblies (ROSAs) and transmit optical sub-assemblies (TOSAs) in optical systems. Examples of these form factors include the GBIC form factor, the small form factor (SFF) and the small form pluggable (SFP) form factor. Aspects of the present invention provide for a compact multiplexer and/or demultiplexer using one of these form factors or an external housing and socket that is compatible with one of these form factors. This aspect of the invention can be used to provide a compact multiplexer and/or demultiplexer that can be inserted or removed from host sockets as part of a single module compatible with current host sockets used for ROSAs and TOSAs and thereby provide substantially more functionality with the same convenience.

In an exemplary embodiment, a multiplexing device is provided, which comprises: a plurality of components, wherein each component provides a beam with a channel in a range of wavelengths; a filter associated with each channel, wherein each filter is configured to select the beam for the respective channel; an output to receive the beam for each component after the beam traverses the respective filter; and an optical alignment element (OAE) associated with each channel, wherein the OAE can be configured to provide at least two directional changes in the path of the beam. In addition, in some embodiments, the path of the beam input to the OAE may be non-coplanar with the path of the beam output from the OAE.

In another exemplary embodiment, a demultiplexing device is provided, which comprises: an input, wherein the input provides a beam with a plurality of channels, each channel in a range of wavelengths; a filter associated with each channel, wherein each filter is configured to select the beam for the respective channel; a plurality of outputs associated with each channel, wherein each output receives the beam for the respective channel after the beam traverses the respective filter; and an OAE associated with each channel, wherein the OAE can be configured to provide at least two directional changes in the path of the beam. In addition, in some embodiments, the path of the beam input to the OAE may be non-coplanar with the path of the beam output from the OAE.

In another exemplary embodiment, a method for multiplexing a plurality of beams, each beam including a channel in a range of wavelengths is provided, which comprises the steps of: (a) traversing the plurality of beams through a plurality of filters, each filter associated with one of the channels, wherein each filter is configured to select the beam for the respective channel; (b) redirecting a path of each filtered beam using an OAE, wherein the OAE can be configured to provide at least two directional changes in the path of the filtered beam; and (c) outputting each filtered and redirected beam to a receiver. In addition, in some embodiments, the path of the beam input to the OAE may be non-coplanar with the path of the beam output from the OAE.

In another exemplary embodiment, a method for demultiplexing an optical signal, the optical signal including a plurality of channels in a range of wavelengths, is provided, which comprises the steps of: (a) traversing the optical signal through a plurality of filters, each filter associated with each channel, wherein each filter is configured to select the beam for the respective channel; (b) transmitting each channel after the beam traverses the respective filter; and (c) redirecting a path of each transmitted beam using an OAE, wherein the OAE can be configured to provide at least two directional changes in the path of the transmitted beam. In addition, in some embodiments, the path of the beam input to the OAE may be non-coplanar with the path of the beam output from the OAE.

In another exemplary embodiment, a frame is provided for assembling and aligning a multiplexer and/or demultiplexer. The frame forms a first plurality of openings and/or mounting surfaces, each configured to receive a light source or output element associated with a channel in a multiplexer or demultiplexer. The light source or output element may be fixed in place using hot wicking, solder, a press fit or interference fit or other method. The frame forms a second plurality of openings and/or mounting surfaces, each configured to receive a filter module associated with one of the channels to select the beam in the range of wavelengths for the respective channel. The filters may be fixed in place using hot wicking, solder, a press fit or interference fit or other method. The frame forms a third plurality of openings, each configured to receive an optical element associated with each channel in a position transverse to the beam for the respective channel. The opening for each optical element may be sized to allow the optical element to be moved within such opening for alignment prior to being fixedly mounted to the frame. The frame may be provided in exemplary embodiments by a core that fits into a chassis or by a unitary frame with holes and angled surfaces for inserting and/or mounting the optical components. In some embodiments additional optical components, such as mirrors or lenses, may be mounted to the frame.

Exemplary embodiments of the present invention may use one or more of the aspects described above, alone, or in combination.

DETAILED DESCRIPTION

Improved methods and systems for routing and aligning beams and optical elements in an optical device are described below. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
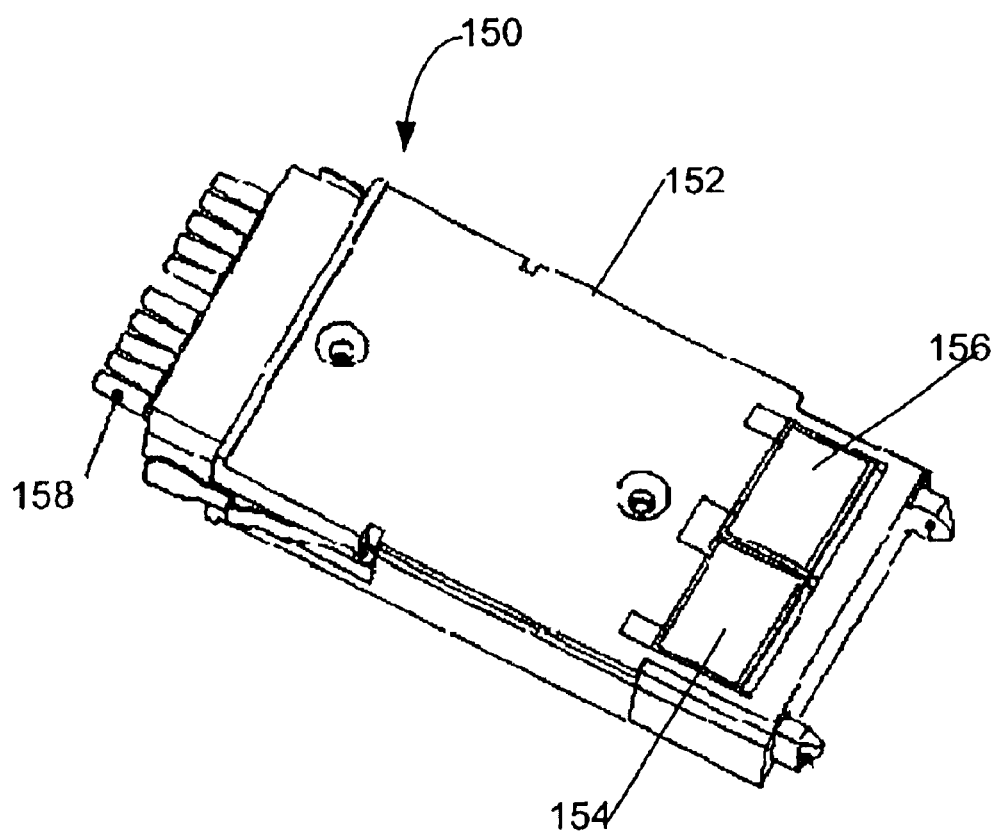
FIG. 1A illustrates an embodiment of WDM and WDDM devices in a GBIC form factor.

FIG. 1A illustrates an embodiment of WDM and WDDM devices in a GBIC form factor. The module 150 comprises the GBIC housing 152, which is part of the GBIC form factor, as defined by the GBIC specification. The module 150 may also comprise a connector which is compatible with the electrical interface defined by the GBIC specification and may be hot pluggable into a host socket. Within the GBIC housing 152 is a WDM device 154 and a WDDM device 156. Alternatively, multiple WDM devices, multiple WDDM devices, a combination of WDM and WDDM devices, a single WDM, or a single WDDM may reside within the GBIC housing 152. The WDM or WDDM devices 154 and 156 may support any number of channels, including but not limited to 2, 4, 8, 16, 32, 64, and 128 channels. A "channel", as used in this specification, is a path through which signals may flow. A channel may include a range of wavelengths of light. "Light" refers to any wavelength, including but not limited to non-visible wavelength of radiation, such as infrared. In this embodiment, the module 150 also comprises a fiber support 158. The function of the fiber strain relief 158 will be described below with FIG. 18C.

Other form factors may be used in connection with embodiments of the present invention. Various form factors allow for one or more TOSAs or ROSAs to be provided between optical fibers in an optical network and a socket for a host device or chassis. The form factors may be adapted for use in a hot pluggable environment where TOSAs and/or ROSAs may be added or removed from optical networking equipment without powering off the receiving socket. For instance, the GBIC form factor was developed in order to arrive at a standard small form factor transceiver module for use with a wide variety of serial transmission media and connectors. Other form factors include a small form factor (SFF), a small form factor pluggable (SFP), Xenpak, XPAK, XGP, XGP2, XFP or any other standard or non-standard form factor. Exemplary embodiments of the WDM device 154 and the WDDM device 156 are described below. In exemplary embodiments of the present invention, WDM and/or WDDM modules may be provided within a housing conforming to any of the above or other form factors. For instance, a WDM or WDDM module could replace the ROSA or TOSA normally embedded in the housing. The housing conforms to the form factor by providing external features which allow the housing to be mounted on a rack or other system adapted for devices with the respective form factor, such as external dimensions and surface features which allow the housing to fit in a cage, slide onto rails, attach to a clip or otherwise attach as required for the respective form factor. The housing may be considered to conform to the form factor even if it does not provide an electrical interface specified by the respective standard. For instance, some embodiments of the present invention may be passive and use optical fibers to provide inputs and outputs rather than active lasers and receivers. These embodiments may not provide an electrical connector interface, but may conform to the form factor for mounting purposes. Some embodiments of the present invention may also provide an electrical connector and an electrical interface compatible with any of the standards described above or may use a non-standard electrical interface.

Aspects of the present invention allow an entire WDM or WDDM (or a combination of one or more of the foregoing) to be conveniently provided within various small form factors. Thus, a WDM, WDDM or combination may be added or removed from a host device using only a single socket and without powering down the socket. This is in contrast to a conventional system that might use multiple GBIC or other modules (containing only ROSAs and TOSAs) in multiple sockets to provide transmitters and/or receivers for a WDM or WDDM.

The WDM device 154 can be a Coarse WDM (CWDM) or a Dense WDM (DWDM) device. The WDDM device 156 can be a Coarse WDDM (CWDDM) or a Dense WDDM (DWDDM) device. In an exemplary CWDM (or CWDDM) embodiment, the channels may for instance be divided among the following wavelengths: 1151 nm, 1531 nm, 1551 nm, and 1571 nm; 1471 nm, 1491 nm, 1511 nm, 1531 nm, 1551 nm, 1571 nm, 1591 nm, and 1611 nm; 1481 nm, 1501 nm, 1521 nm, 1541 nm, 1561 nm, 1581 nm, 1601 nm, and 1621 nm; or 1461 nm, 1481 nm, 1501 nm, 1521 nm, 1541 nm, 1561 nm, 1581 nm, 1601 nm. In an exemplary DWDM (or DWDDM) embodiment the channels may for instance be divided among the following wavelength spacings: 400 GHz, 200 GHz, 100 GHz, and 50 GHz.

Figure 1B:
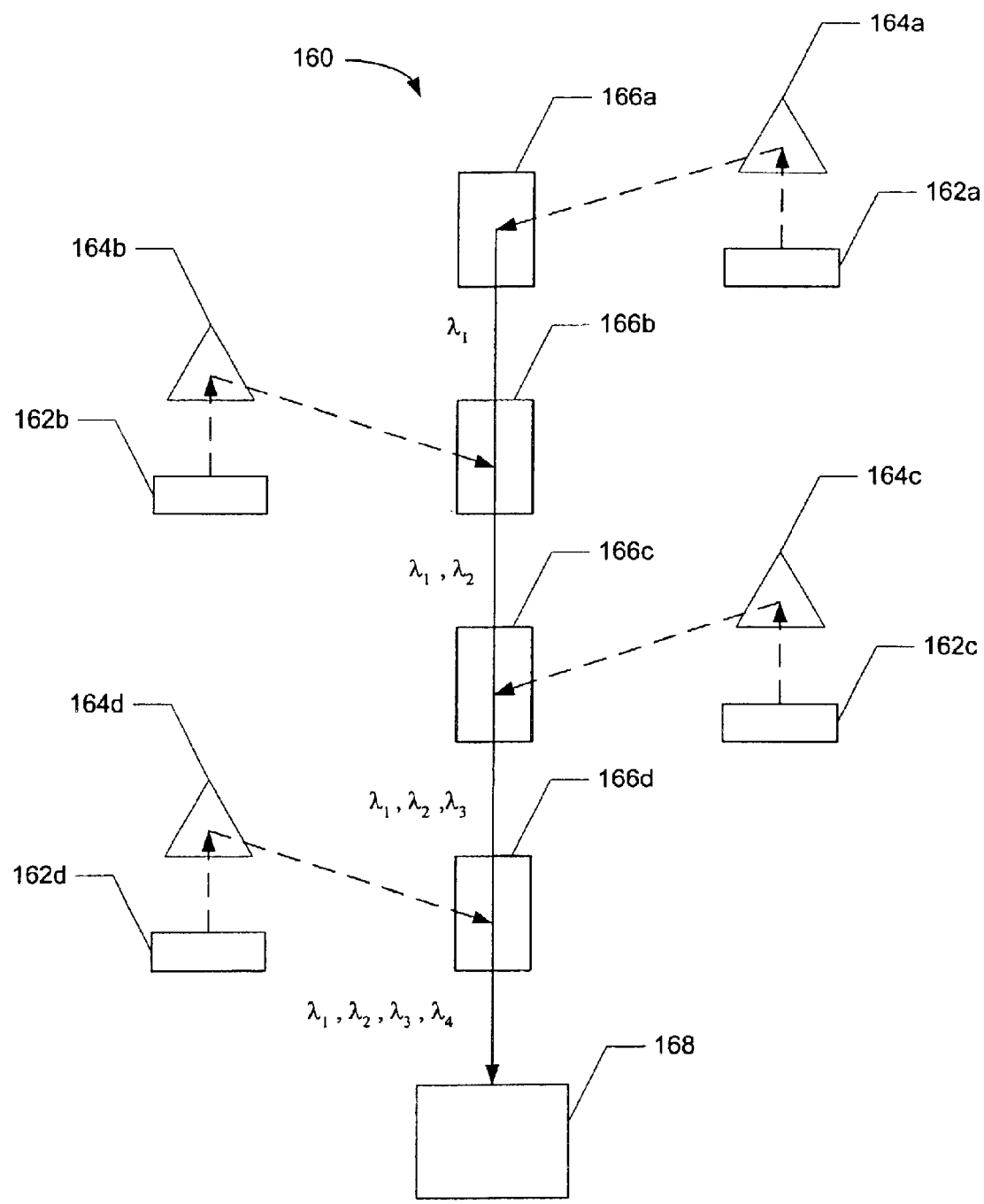
FIG. 1B illustrates a block diagram of an embodiment of a multiplexing device.

FIG. 1B illustrates a block diagram of an embodiment of a multiplexing device. The device 160 can use passive inputs and outputs (such as optical fibers) or active inputs and outputs (such as lasers and photosensors) or a combination of both. In this embodiment, the device 160 is a four-channel device, with four beam paths, although any number of beam paths may be supported. In the first beam path, the device 160 comprises a first light source 162a, a first OAE 164a, a first filter 166a, and an output element 168. In the second beam path, the device 160 comprises a second light source 162b, a second OAE 164b, a second filter 166b, and the output element 168. In the third beam path, the device 160 comprises a third light source 162c, a third OAE 164c, a third filter 166c, and the output element 168. In the fourth beam path, the device 160 comprises a fourth light source 162d, a fourth OAE 164d, a fourth filter 166d, and the output element 168. In this embodiment, any of the filters 166a–166d can be a reflective filter, or some other optical element which allows the channels from the beam paths to be multiplexed.

The light sources 162a–162d may be a transmitter, such as a laser, a laser can package, an array of can packages, a waveguide, a single- or multi-mode optical fiber, a light emitting diode, an array of light emitting diodes, an optical signal modulator, an optical network, an optical switch, or any other optical systems or subsystems which transmit or emit light. The output element 168 is some type of receiver, such as a single- or multi-mode optical fiber, detector, detector can package, nozzle, lens, focusing optic, collimator, waveguides, receivers or any other passive or active optical system or subsystem for receiving or detecting light. The nozzle can be configured to accept any type of connector, such as SC, FC, ST, LC, MU, or E2000, with any type of finish, such as PC, UPC<SPC, or APC. The first light source 162a emits a beam which traverses through the first OAE 164a. The beam exits the first OAE 164a to the first filter 166a. The first filter 166a selects a first range of wavelengths, $\lambda_1$, to traverse to the output element 168. The manner in which the first filter selects the first range of wavelengths depends upon the type of filter. If the first filter is a transmissive filter, a range of wavelengths (including at least the selected wavelengths) pass through the filter and other wavelengths are reflected. The range of wavelengths that passes through the filter may be wider than the selected wavelengths for the particular channel, but is narrow enough to avoid overlap and interference with other channels. If the filter is a transmissive grating or dispersive optic, the light is diffracted or dispersed at different angles depending upon wavelength. The desired wavelength is selected by aligning a range of wavelengths (including at least the selected wavelengths) from the grating or optic with the desired output path. If the filter is a reflective filter, a range of wavelengths (including at least the selected wavelengths) reflects from the filter and other wavelengths pass through the filter. If the filter is a reflective grating or optic, the light is reflected at different angles depending upon wavelength. The desired wavelength is selected by aligning a range of wavelengths (including at least the selected wavelengths) from the reflective grating or optic with the desired output path.

The first light source 162a, the first OAE 164a and the first filter 166a are considered to be associated with first channel (provided by the first range of wavelengths). These components provide, align and filter the beam carrying the first channel in order to supply it to the output element 168. Similarly, second, third and fourth sets of light sources, OAEs and filters are provided to supply a second, third and fourth channel to the output element 168 as described below, and thereby provide a multiplexed output beam.

The second light source 162b emits a beam which traverses through the second OAE 164b to the second filter 166b. The second filter 166b selects a second range of wavelengths, $\lambda_2$, to traverse to the output element 168. $\lambda_1$ is transmitted through the second filter 166b. The third light source 162c emits a beam which traverses through the third OAE 164c to the third filter 166c. The third filter 166c selects a third range of wavelengths, $\lambda_3$, to traverse to the output element 168. $\lambda_1$, $\lambda_2$ are transmitted through the third filter 1606c. The fourth light source 162d emits a beam which traverses through the fourth OAE 164d to the fourth filter 166d. The fourth filter 166d selects a fourth range of wavelengths, $\lambda_4$, to traverse to the output element 168. $\lambda_1$, $\lambda_2$, $\lambda_3$ are transmitted through the fourth filter 166d. A composite multiplexed beam comprising $\lambda_1$, $\lambda_2$, $\lambda_3$, and $\lambda_4$ is transmitted to the output element 168.

Figure 1C:
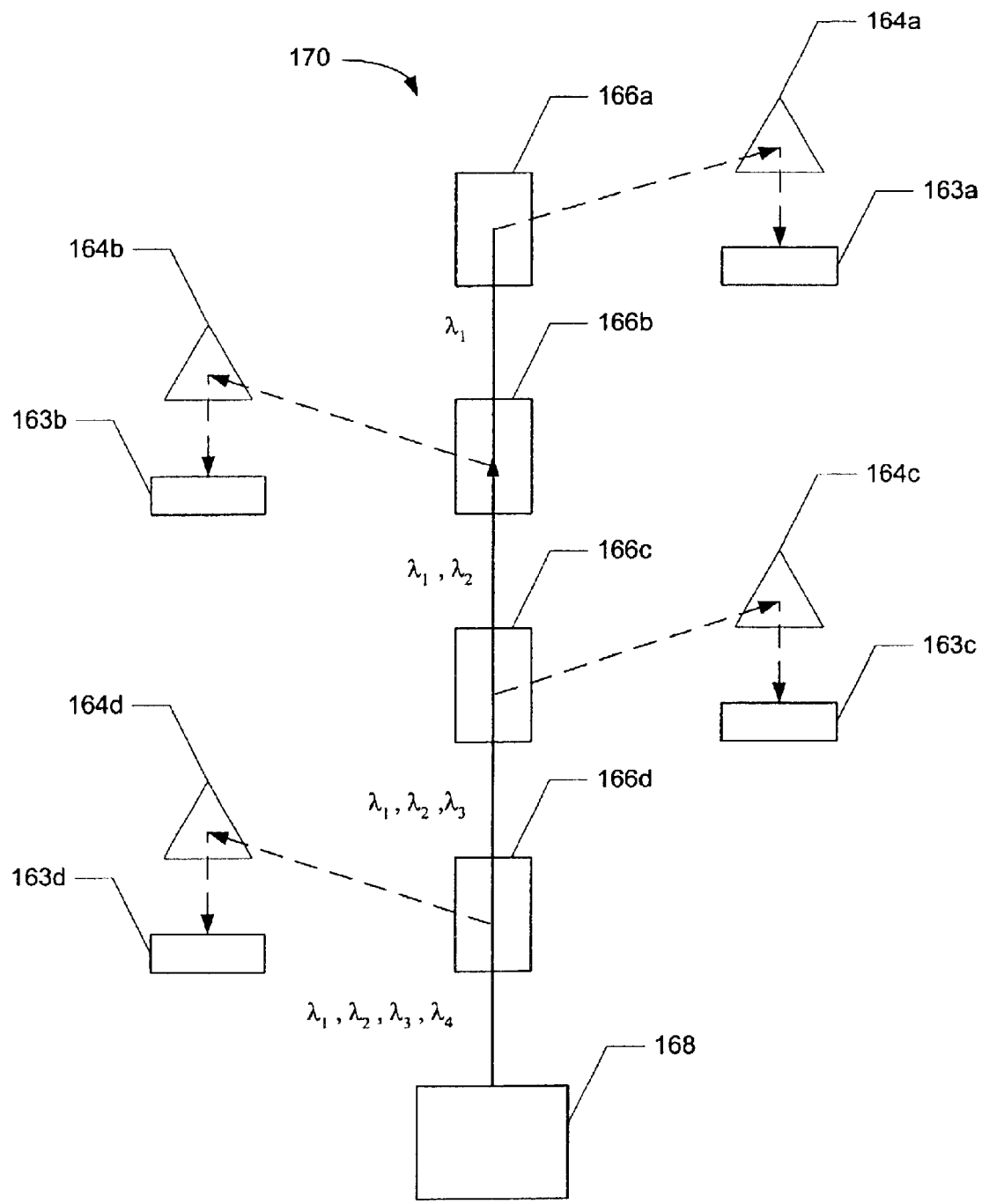
FIG. 1C illustrates a block diagram of an embodiment of a demultiplexing device.

FIG. 1C illustrates a block diagram of an embodiment of a demultiplexing device. The demultiplexing device 170 may comprise a similar structure as the multiplexing device 160 but differs in operation. In the demultiplexing device, a composite beam is received at input element 169. A range of wavelengths ($\lambda_1$, $\lambda_2$, $\lambda_3$, or $\lambda_4$) is selected by filters 166a–d, respectively and directed to OAE 164a–d respectively. The OAEs align the beams with the respective output element 163a–d. The input element 169 is some type of transmitter, such as a laser, a laser can package, an array of can packages, a waveguide, a single-or multi-mode optical fiber, a light emitting diode, an array of light emitting diodes, an optical signal modulator, an optical network, an optical switch or any other optical systems or subsystems which transmit or emit light. The output elements 163a–163d are each some type of receiver, such as a single- or multi-mode optical fiber, detector, detector can package, nozzle, lens, focusing optic, collimator, waveguides or any other passive or active optical system or subsystem for receiving or detecting light. The nozzle can be configured to accept any type of connector, such as SC, FC, ST, LC, MU, or E2000, with any type of finish, such as PC, UPC, SPC, or APC.

The input element 169 emits a multiplexed beam comprising $\lambda_1$, $\lambda_2$, $\lambda_3$, and $\lambda_4$ and transmits it to the fourth filter 166d. The fourth filter 166d selects $\lambda_4$ to traverse to the fourth OAE 164d. $\lambda_4$ traverses the fourth OAE 164d and is transmitted to the fourth output element 163d. The remaining wavelengths, $\lambda_1$, $\lambda_2$, and $\lambda_3$, are transmitted from the fourth filter 166d to the third filter 166c. The third filter 166c selects $\lambda_3$ to traverse to the third OAE 164c. $\lambda_3$ traverses the third OAE 164c and is transmitted to the third output element 163c. The remaining wavelengths, $\lambda_1$ and $\lambda_2$, are transmitted from the third filter 166c to the second filter 166b. The second filter 166b selects $\lambda_2$ to traverse to the second OAE 164b. $\lambda_2$ traverses the second OAE 164b and is transmitted to the second output element 163b. The remaining wavelength, $\lambda_1$, is transmitted from the second filter 166b to the first filter 166a. The first filter 166a causes $\lambda_1$ to traverse to the first OAE 164a. $\lambda_1$ traverses the first OAE 164a and is transmitted to the first output element 163a. Accordingly, each channel is associated with a filter, OAE and output element which select, align and output the respective channel.

The multiplexing device 160 and demultiplexing device 170 are described further in the Co-Pending U.S. patent application entitled, "Optical Alignment Element Method", Ser. No. 09/916,624, filed on Jul. 27, 2001 by the assignee of the present application. Applicants hereby incorporate this patent application by reference.

Figure 2A:
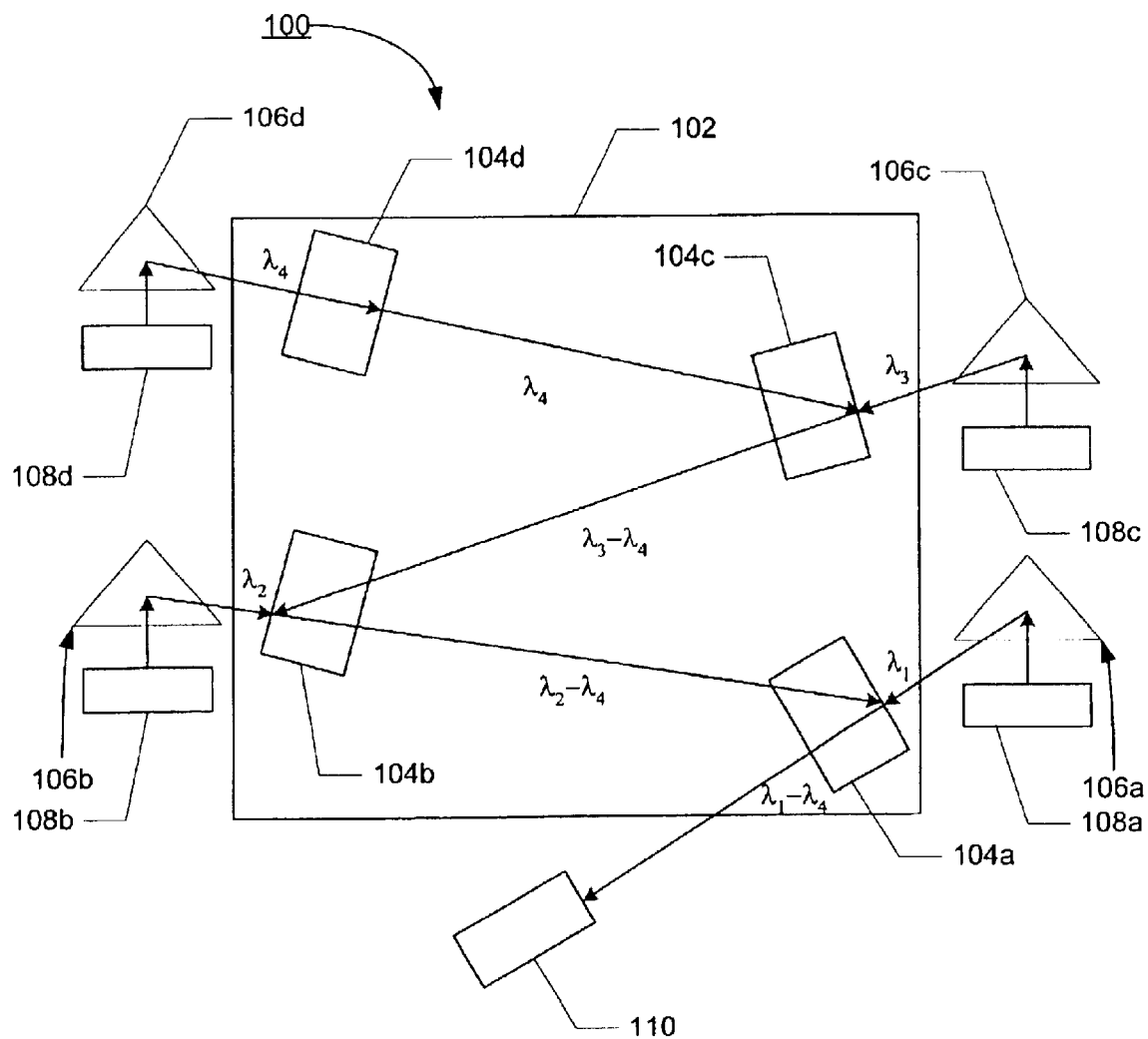
FIG. 2A illustrates a block diagram of another embodiment of a multiplexing device.

FIG. 2A illustrates a block diagram of another embodiment of a multiplexing device. The device 100 comprises a core 102 that may include a plurality of filters 104a–104d. In this embodiment, the filters may be transmissive filters which select a channel by allowing it to pass through the filter while other channels are reflected, although embodiments with different filters may be used as well. In this embodiment and other exemplary embodiments, the angle of incidence of the light beam on the filter may be optimized to enhance the filter's ability to select the desired channel. The angle of incidence is the angle between the light beam and a line that is perpendicular to the face of the filter. Accordingly, a light beam that is perpendicular to the face of the filter would have a zero degree angle of incidence. In the embodiment of FIG. 2A and other exemplary embodiments, the angle of incidence may be about ten degrees. In other embodiments, different angles may be selected to enhance performance of the particular filters being used.

In FIG. 2A, each filter 104a–104d transmits light of a particular wavelength range while reflecting other wavelengths. For example, each filter 104a–104d can be either band filters or edge filters, arranged in the appropriate order. Each filter 104a–104d is optically coupled to an optical alignment element (OAE) 106a–106d, which in turn is optically coupled to a light source 108a–108d. Each of the light sources 108a–108d transmits a respective channel in a particular range of wavelengths. For example, light source 108d emits a beam which includes wavelengths $\lambda_4$ to the OAE 106d, which redirects $\lambda_4$ to the filter 104d. Filter 104d transmits $\lambda_4$ to the filter 104c. In other embodiments, filter 104d can be omitted or replaced with a non-filtering optic. Light source 108c emits a beam which includes wavelengths $\lambda_3$ to the OAE 106c, which redirects $\lambda_3$ to the filter 104b. Filter 104c also reflects $\lambda_4$ toward filter 104b. Light source 108b emits a beam which includes wavelengths $\lambda_2$ to the OAE 106b, which redirects $\lambda_2$ to the filter 104a. Filter 104b also reflects $\lambda_3$–$\lambda_4$ toward filter 104a. Light source 108a emits a beam which includes wavelengths $\lambda_1$, to the OAE 106a, which redirects $\lambda_1$ to the output element 110. Filter 104a also reflects $\lambda_2$–$\lambda_4$ to the output element 110. In this manner, a composite beam composed of $\lambda_1$, $\lambda_2$, $\lambda_3$, and $\lambda_4$ is output to the output element 110.

The light sources 108a–108d may be transmitters which transmit, convey, carry, or guide light. In some embodiments, the transmitters may be active transmitters such as lasers, laser can packages, light emitting diodes, optical signal modulators, or other types of active transmitters. In some embodiments, the transmitters may be passive transmitters such as waveguides, single- or multi-mode optical fibers, or other types of passive transmitters. The filters 104a–104d can be transmissive filters, transmissive gratings, or any other dispersive, refractive or reflective optics. The filters 104a–104d can reflect light either from its front face or back face. The output element 110 is a target for the multiplexed channels and provides an output from the WDM housing for the combined beam. Output element 110 can be a receiver such as a single- or multi-mode optical fiber, a detector, a detector can package, a demultiplexer, a waveguide, a nozzle, or any other optical systems or subsystems for receiving or detecting light. The nozzle can be configured to accept any type of connector, such as SC, FC, ST, LC, MU, or E2000, with any type of finish, such as PC, UPC, SPC, or APC.

Figure 2B:
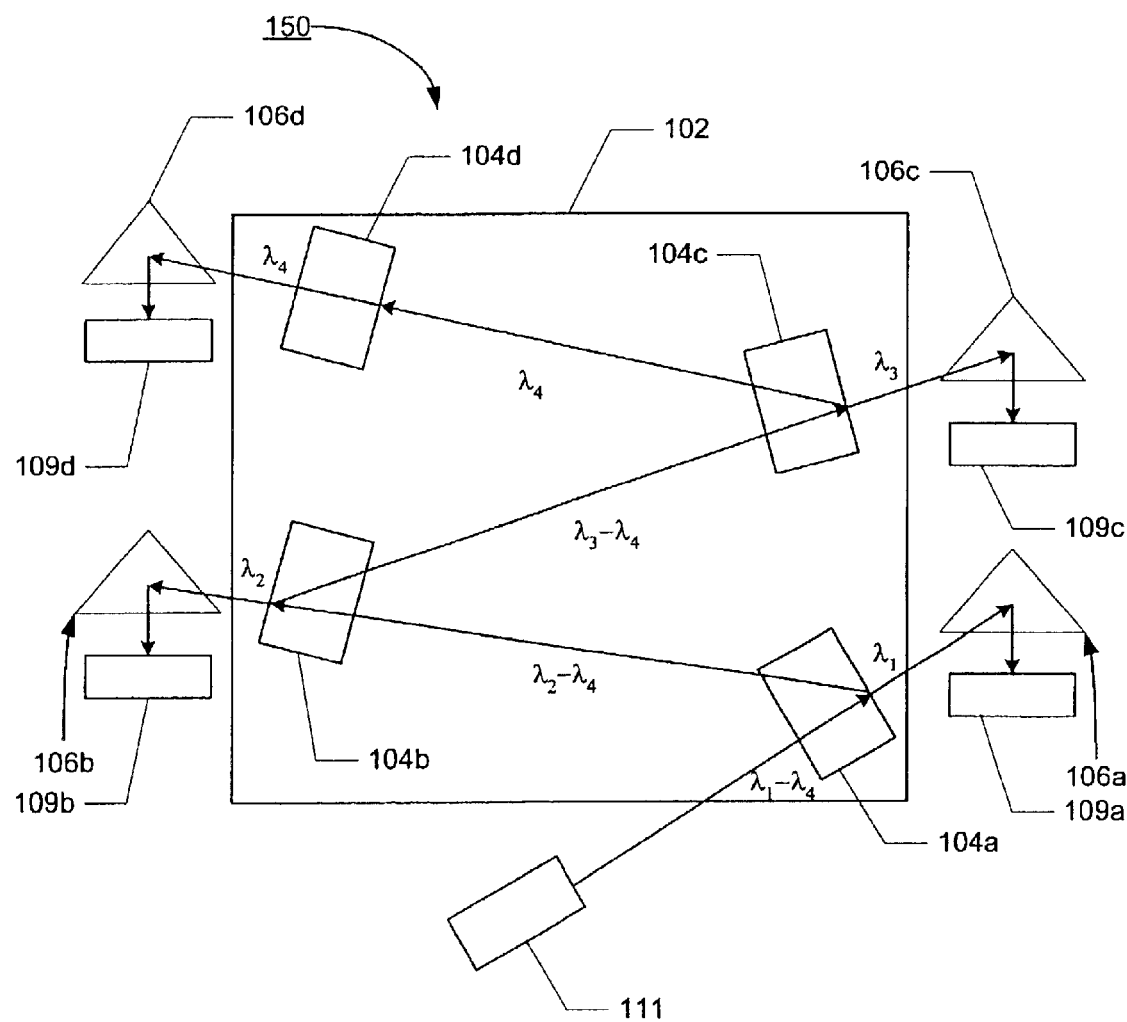
FIG. 2B illustrates a block diagram of another embodiment of a demultiplexing device.
Figure 2C:
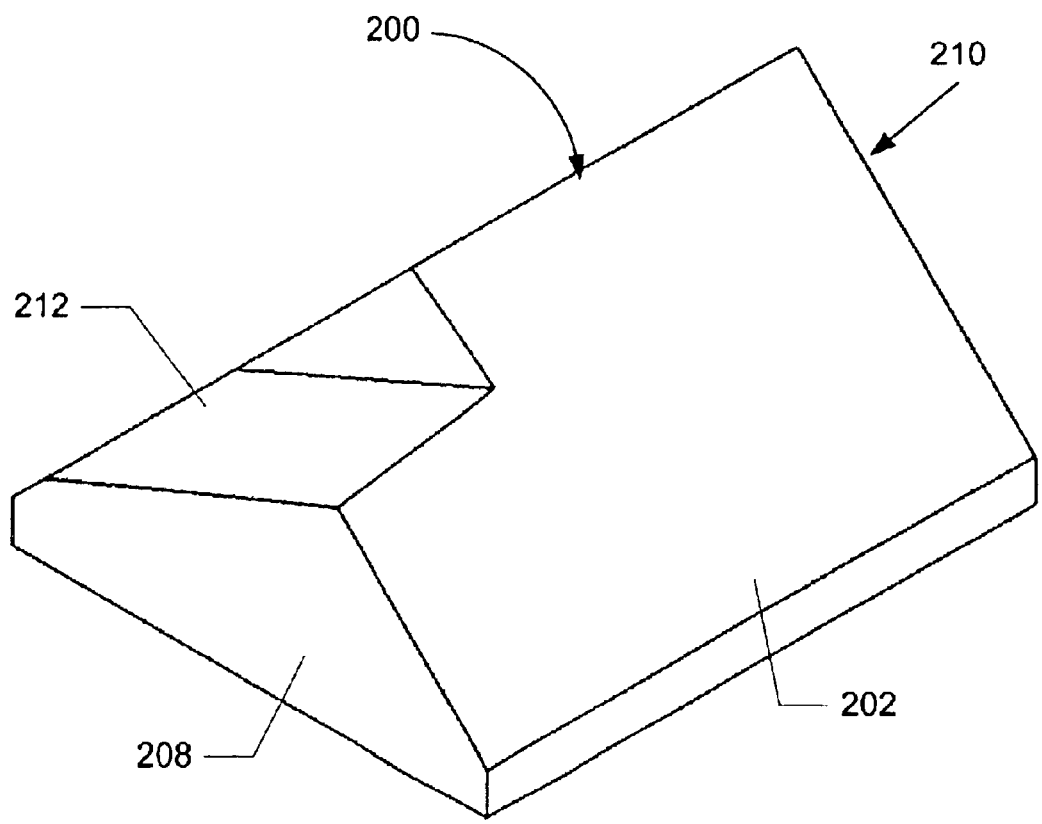
FIGS. 2C–2F illustrate a top isometric, bottom isometric, top, and side view, respectively, of an embodiment of a core of a device.
Figure 2C:
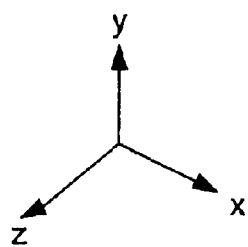
Figure 2D:
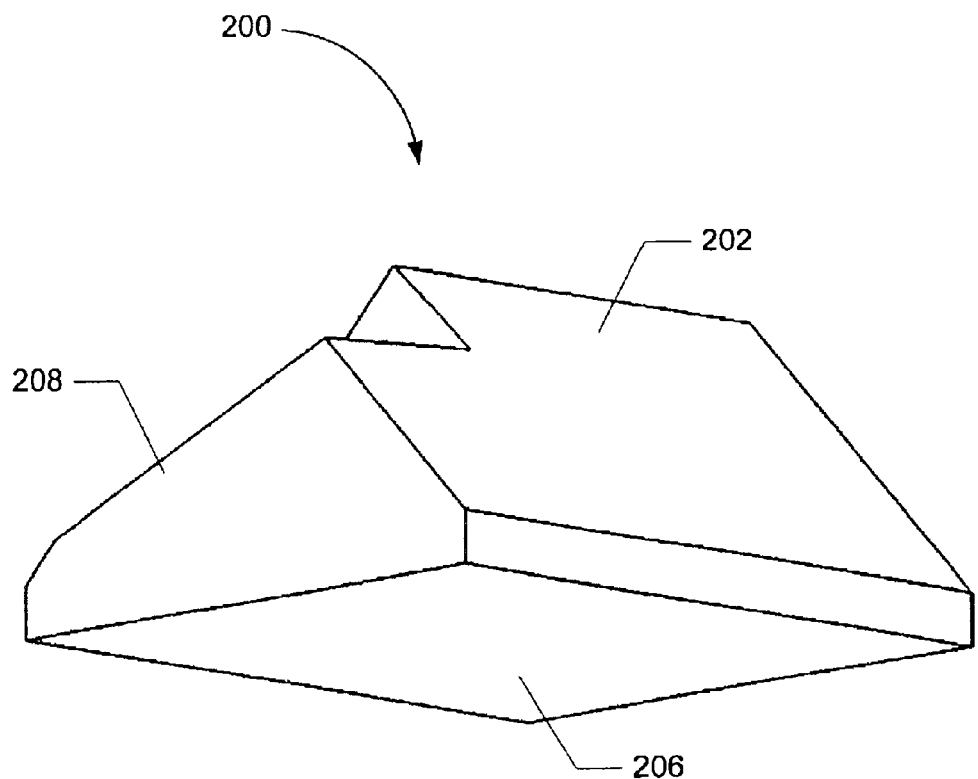
Figure 2D:
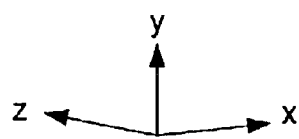
Figure 2E:
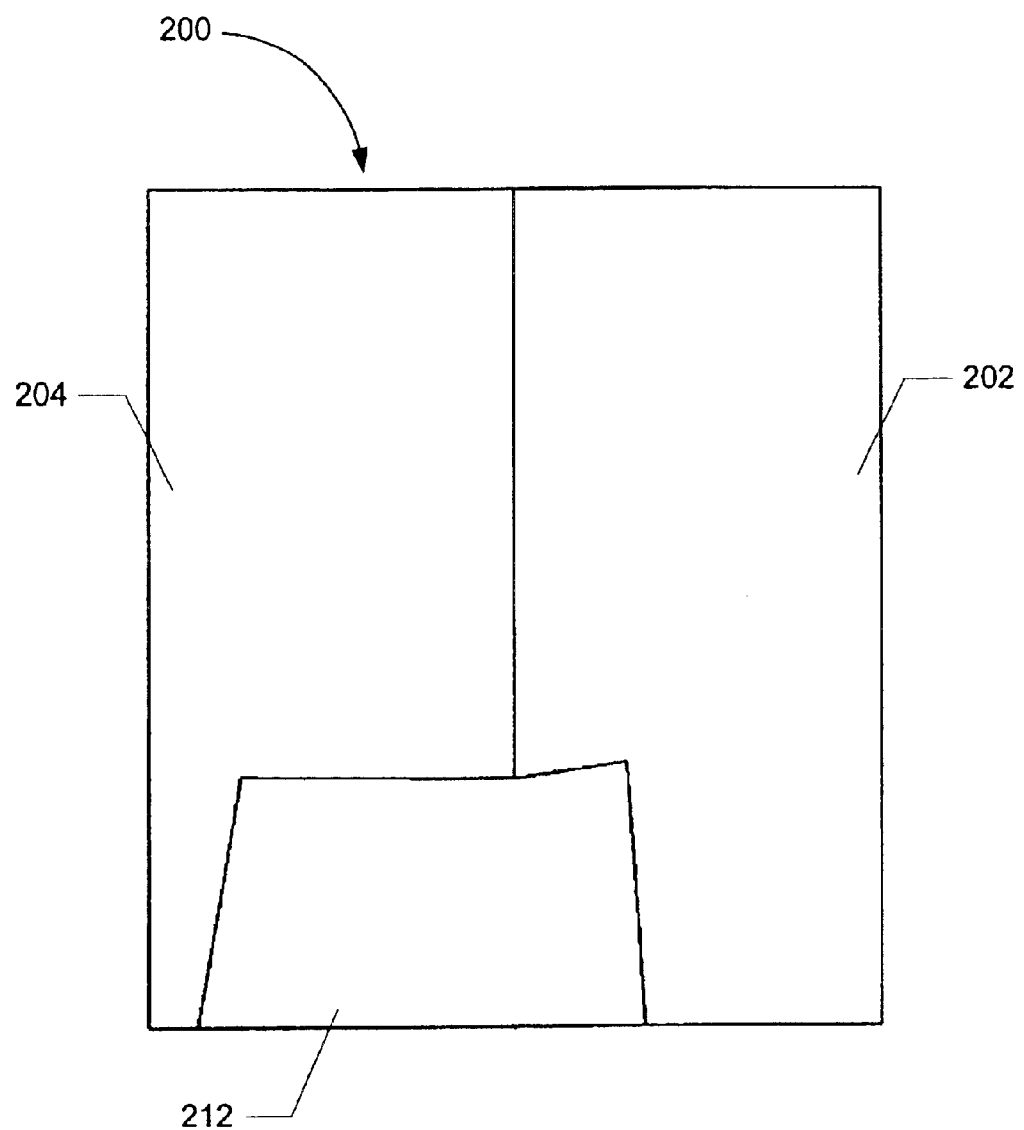
Figure 2F:
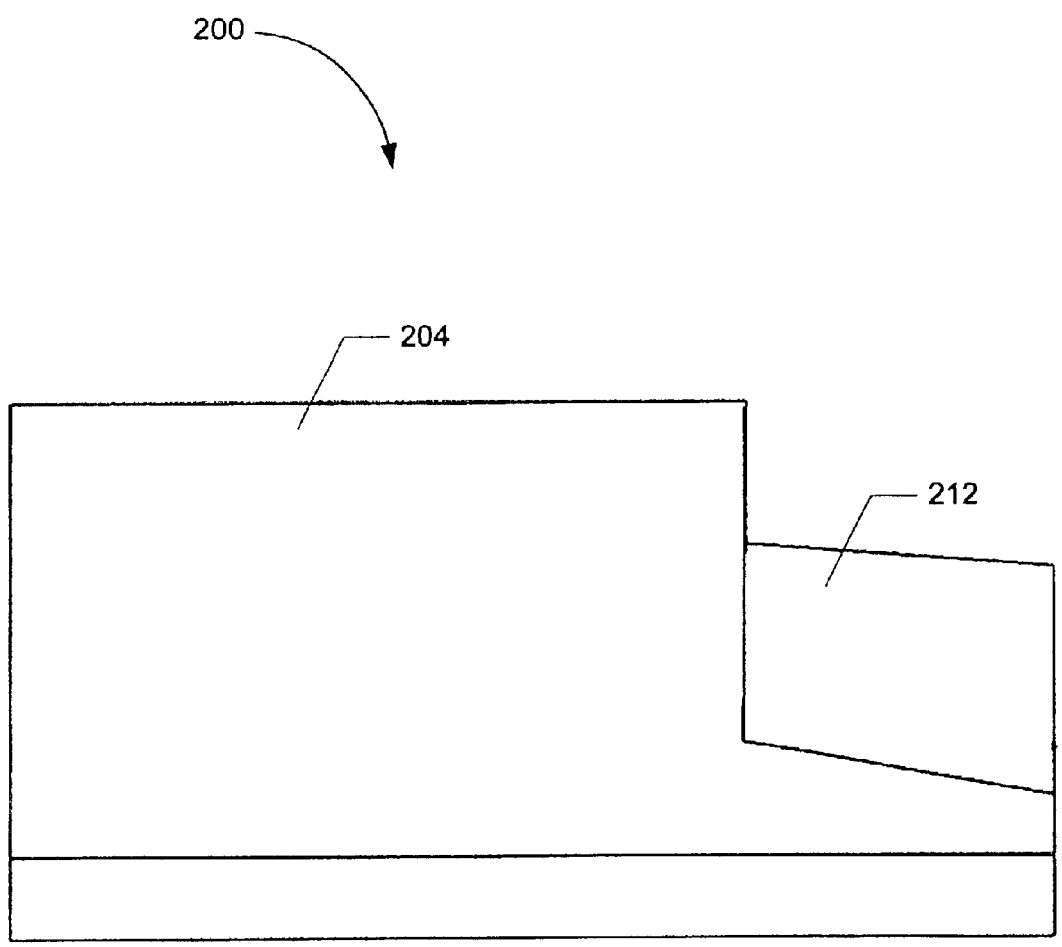
Figure 2F:
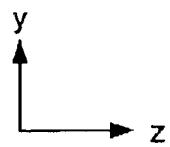
Figure 3A:
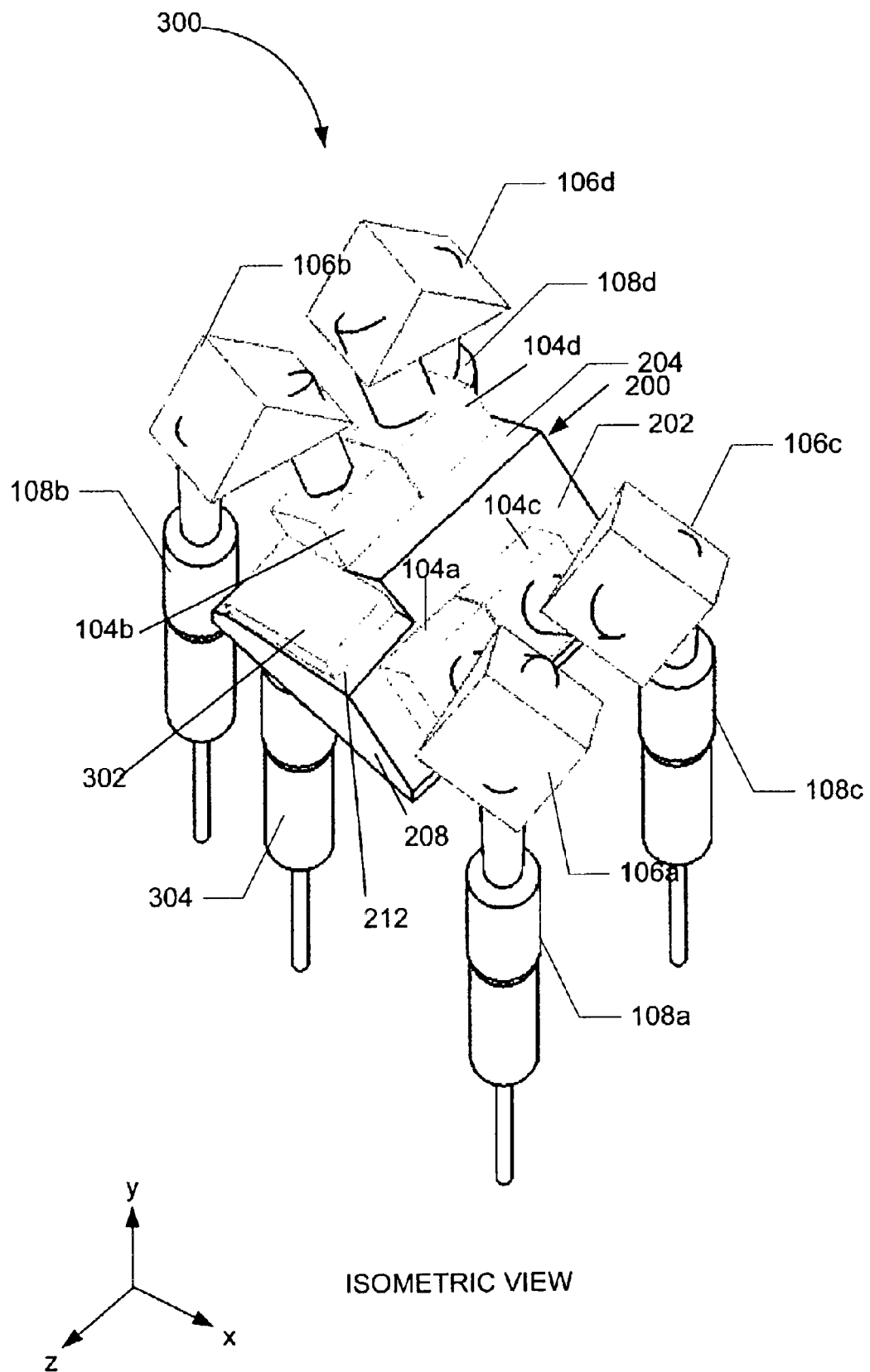
FIGS. 3A–3D illustrate an isometric, top, front, and side view, respectively, of an embodiment of the device with an embodiment of the core.
Figure 3B:
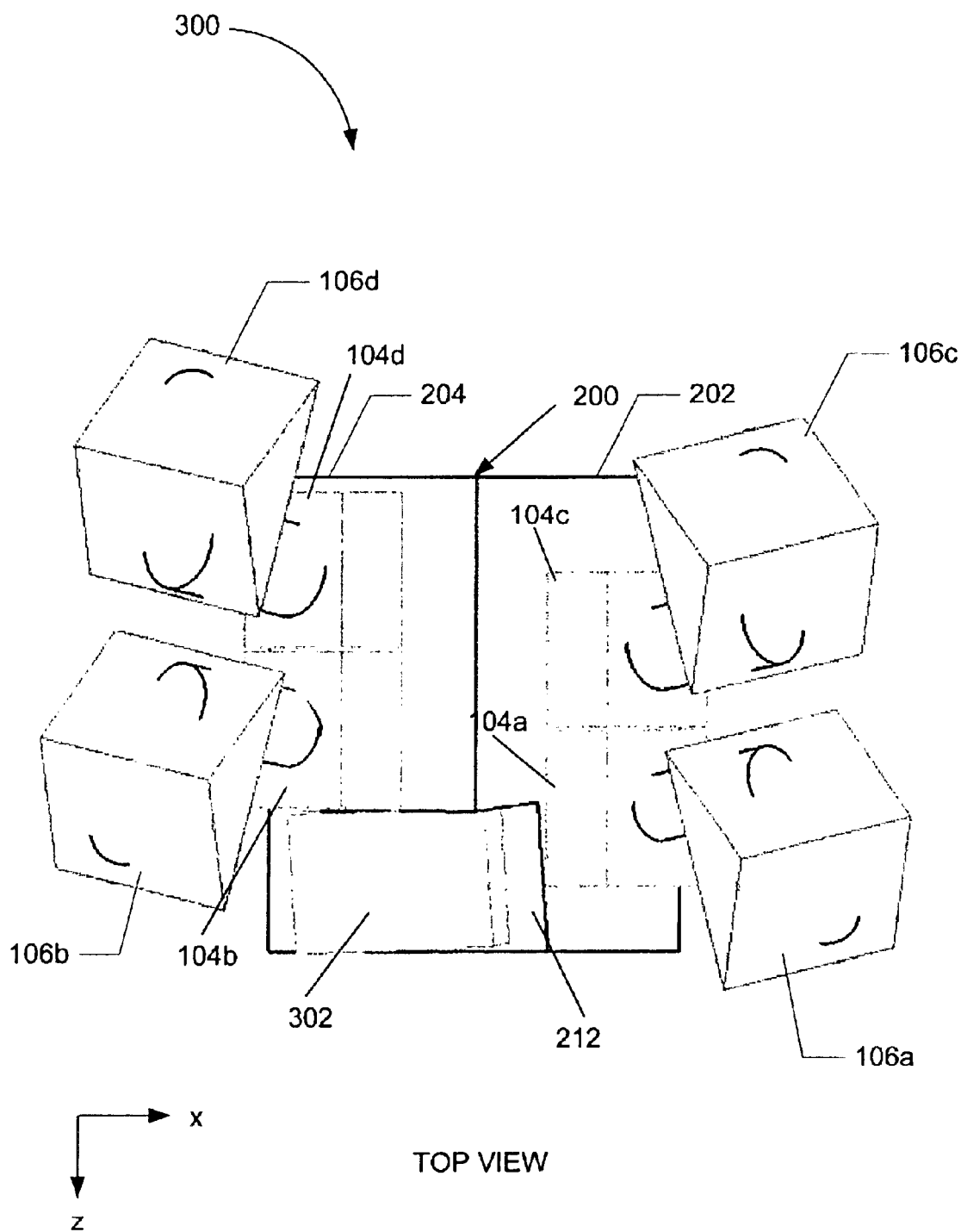
Figure 3C:
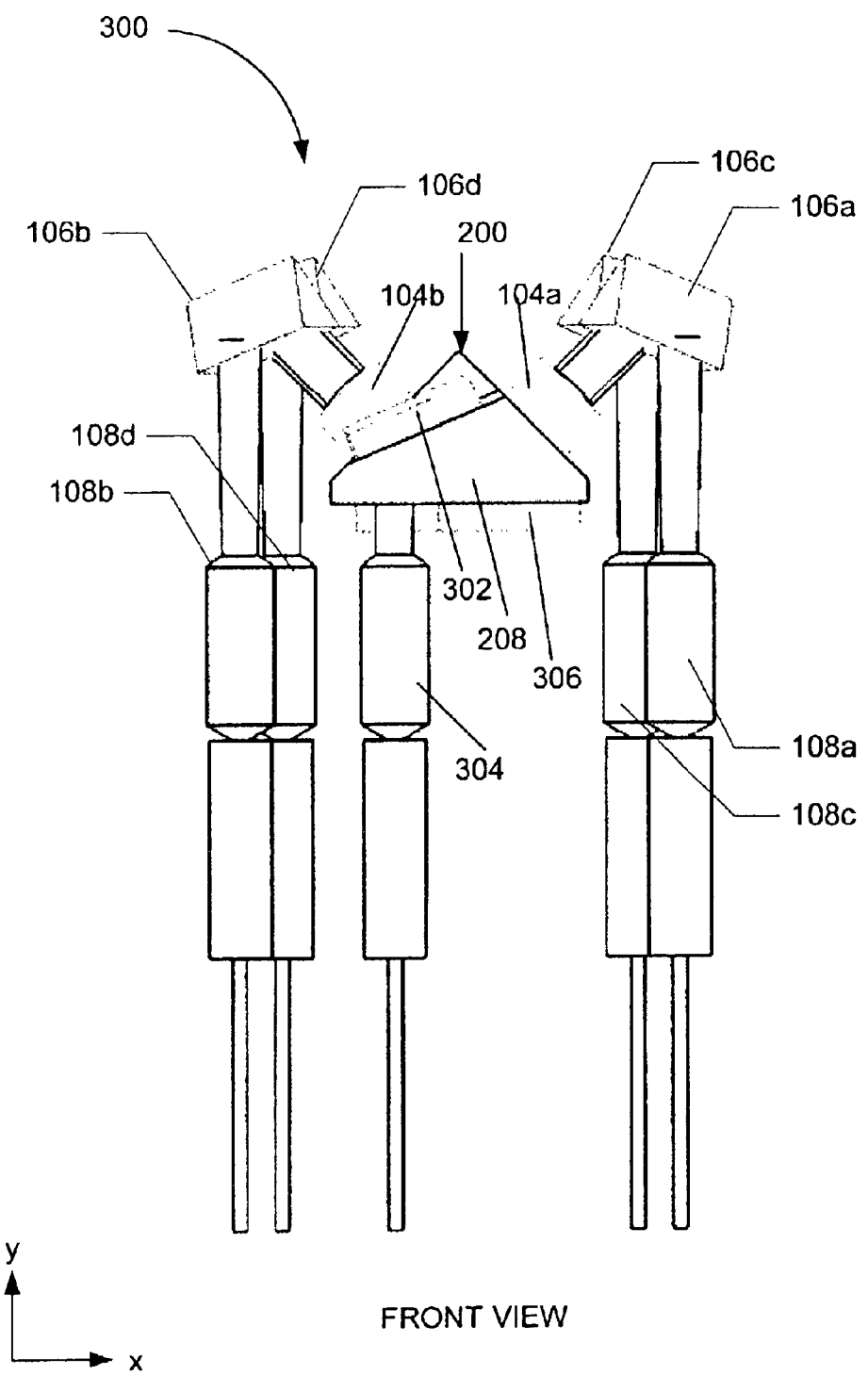
Figure 3D:
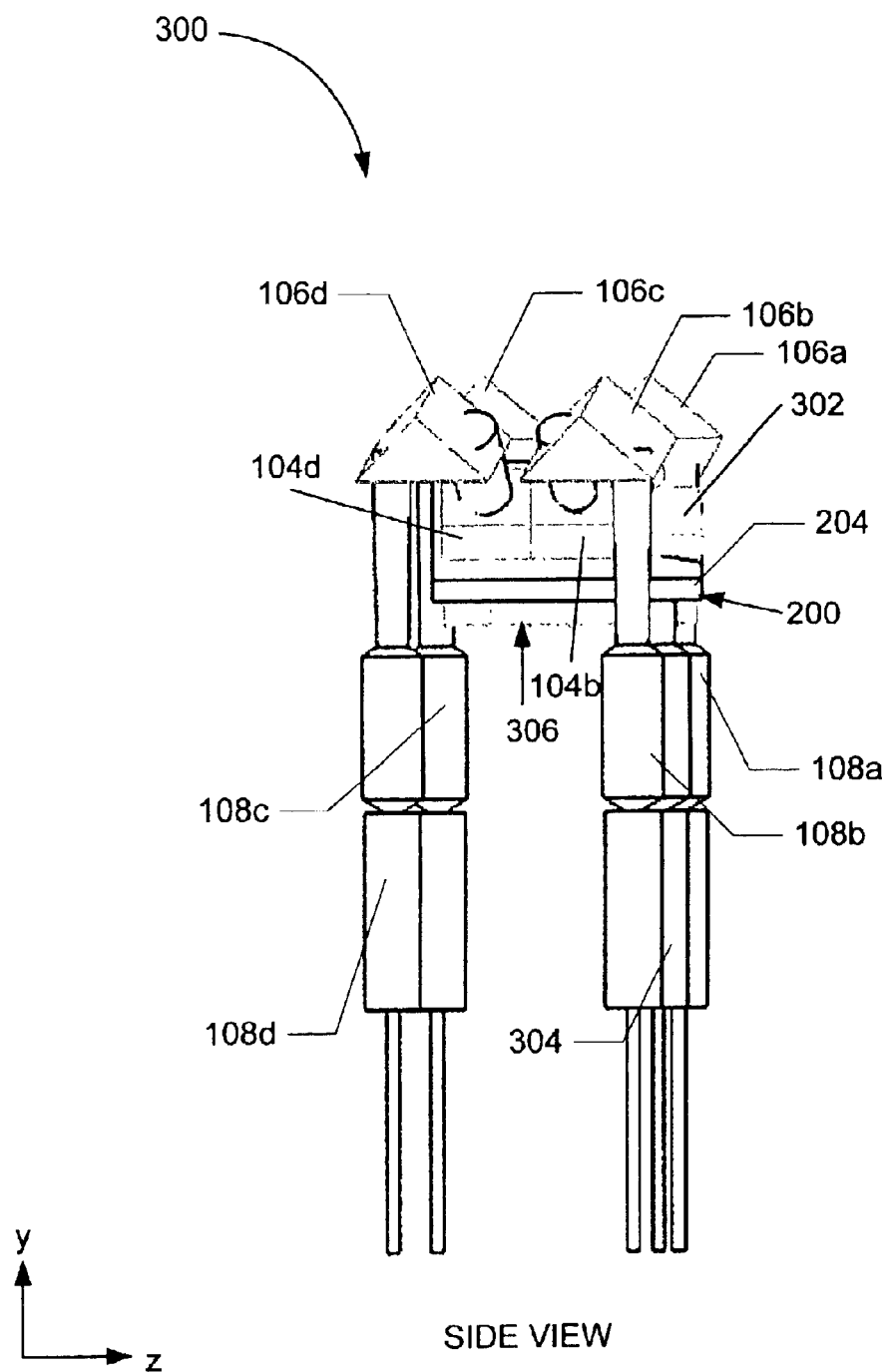

FIG. 2B illustrates a block diagram of another embodiment of a demultiplexing device. The demultiplexing device 150 may comprise a similar structure as the multiplexing device 100 but differs in operation. In the demultiplexing device 150, a composite beam is provided by input element 111. A range of wavelengths ($\lambda_1$, $\lambda_2$, $\lambda_3$, and $\lambda_4$) is selected by filters 104a–d respectively and directed to OAEs 106a–d respectively. The OAEs align the beams with the respective output element 109a–d. For example, assume that a composite beam of multiplexed light from input element 111 comprises four channels, $\lambda_1$–$\lambda_4$. Filter 104a transmits $\lambda_1$ to the OAE 106a while reflecting $\lambda_2$–$\lambda_4$ to the filter 104b. The OAE 106a redirects $\lambda_1$, to output element 109a. The filter 104b transmit $\lambda_2$ to the OAE 106b while reflecting $\lambda_3$–$\lambda_4$ to the filter 104c. The OAE 106b redirects $\lambda_2$ to output element 109b. The filter 104c transmits $\lambda_1$ to the OAE 106c while reflecting $\lambda_4$ to the filter 104d. The OAE 106c redirects $\lambda_3$ to output element 109c. The filter 104d transmits $\lambda_4$ to the OAE 106d. In other embodiments, filter 104d can be omitted or replaced by a non-filtering optic. The OAE 106d redirects $\lambda_4$ to output element 109d. In this manner, a multiplexed light is separated into its component channels. Light may be reflected from each filter 104a–104d either from its back or front face.

The output elements 109a–109d are targets for the channels from a multiplexed light and provide outputs from the WDDM housing for the channels. The output elements 109a–109d can comprise receivers such as collimators, waveguides, single- or multi-mode optical fibers, detectors, detector can packages, receivers or other optical systems or subsystems for receiving or detecting light. The filters 104a–104d can be transmissive filters, transmissive gratings, or any other dispersive, refractive or reflective optics configured to select the desired wavelengths. The filters 104a–104d can reflect light either from its front face or back face. The input element 111 can be a source of a multiplexed light such as a transmitter, and provides an input into the WDDM housing. In some embodiments, the transmitter may be an active transmitter such as a laser, a laser can package, an array of can packages, a light emitting diode, an array of light emitting diodes, an optical signal modulator, an optical network, an optical switch or any other optical systems or subsystems for transmitting or emitting light. In some embodiments, the transmitter may be a passive transmitter such as a waveguide, a single- or multi-mode optical fiber, or other type of passive transmitter. In other embodiments of the invention, more or fewer channels may be included in the device. Additional channels can be added to or subtracted from the devices 100 and 150 by removing or adding additional filters, OAE's, and components for the additional channels as required.

FIGS. 2C–2F illustrate a top isometric, bottom isometric, top, and side view, respectively, of an embodiment of a core that may be used with a multiplexing device or demultiplexing device, such as those described in connection with FIGS. 2A and 2B. Core 200 has a prismatic shape and is composed of an optically transmissive material such as BK7 fused silicon or any other transparent glass or crystalline material that will transmit the light of interest. The core 200 comprises three side faces 202, 204, 206, and two end faces 208, 210. The core 200 also comprises a cut face 212. The function of the cut face 212 will be described below.

FIGS. 3A–3D illustrate an isometric, top, front, and side view, respectively, of an embodiment of a multiplexing device including an embodiment of the core. In this embodiment, the multiplexing device uses light sources 108a–d that are passive. The filters 104a–104d are coupled to the side faces 202 and 204 of the core 200. A first mirror 302 is coupled to the cut 212, and a second mirror 306 is coupled to the side face 206. The OAE's 106a–106d are then placed proximate to the core 200 so that they are optically coupled to their respective filters 104a–104d.

Light source 108d transmits or emits $\lambda_4$ to the OAE 106d, which redirects $\lambda_4$ to the filter 104d. Filter 104d transmits $\lambda_4$ to the second mirror 306. The second mirror 306 reflects $\lambda_4$ to the filter 104c. Light source 108c transmits or emits $\lambda_3$ to the OAE 106c, which redirects $\lambda_3$ to the filter 104c. Filter 104c transmits $\lambda_3$ to the second mirror 306 and also reflects $\lambda_4$ to the second mirror 306. The second mirror 306 in turn reflects $\lambda_3$–$\lambda_4$ to the filter 104b. Light source 108b transmits or emits $\lambda_2$ to the OAE 106b, which redirects $\lambda_2$ to the filter 104b. Filter 104b transmits $\lambda_2$ to the second mirror 306 also reflects $\lambda_3$–$\lambda_4$ to the second mirror 306. The second mirror 306 in turn reflects $\lambda_2$–$\lambda_4$ to the filter 104a. Light source 108a transmits or emits $\lambda_1$ to the OAE 106a, which redirects $\lambda_1$ to the filter 104a. Filter 104a transmits $\lambda_1$ to the second mirror 306 and also reflects $\lambda_2$–$\lambda_4$ to the second mirror 306. The second mirror 306 in turn reflects $\lambda_1$–$\lambda_4$ to the first mirror 302, which in turn reflects $\lambda_1$–$\lambda_4$ into the output element 304. In this embodiment, a portion of the core 200 is cut to create the cut face 212 with the appropriate angle to ensure that light reflects off of the first mirror 302 at the desired angle. In this manner, $\lambda_1$, $\lambda_2$, $\lambda_3$, and $\lambda_4$ are multiplexed into the same output element 304.

A similar structure may be used for a demultiplexing device. For a demultiplexing device, the light sources 108a–d and output element 304 in FIGS. 3A–D are replaced with four output elements and an input element, respectively. Multiplexed light with channels $\lambda_1$–$\lambda_4$ is provided by the input element (which may be located at the position indicated at 304 in FIGS. 3A–D) to the first mirror 302. The first mirror 302 reflects the light toward the second mirror 306, which in turn reflects the light to the filter 104a. In this embodiment, a portion of the core 200 is cut to create the cut face 212 with the appropriate angle to ensure that light hits the filters 104a–104d at the desired angles. Filter 104a transmits $\lambda_1$ to the OAE 106a while reflecting $\lambda_2$–$\lambda_4$ to the second mirror 306. The OAE 106a redirects $\lambda_1$ to the first output element (which may be located at the position indicated at 108a in FIGS. 3A–D), while the second mirror 306 reflects $\lambda_2$–$\lambda_4$ to the filter 104b. The filter 104b transmit $\lambda_2$ to the OAE 106b while reflecting $\lambda_3$–$\lambda_4$ to the second mirror 306. The OAE 106b redirects $\lambda_2$ to the second output element (which may be located at the position indicated at 108b in FIGS. 3A–D), while the second mirror 306 reflects $\lambda_3$–$\lambda_4$ to the filter 104c. The filter 104c transmits $\lambda_3$ to the OAE 106c while reflecting $\lambda_4$ to the second mirror 306. The OAE 106c redirects $\lambda_3$ to the third output element (which may be located at the position indicated at 108c in FIGS. 3A–D), while the second mirror 306 reflects $\lambda_4$ to the filter 104d. The filter 104d transmits $\lambda_4$ to the OAE 106d. The OAE 106d redirects $\lambda_4$ to the fourth output element (which may be located at the position indicated at 108d in FIGS. 3A–D). In this manner, a multiplexed light is separated into its component channels.

The OAE may comprise an optical component, or a plurality of coupled optical components, that is configured to allow at least two directional changes at different positions along a beam path. For instance, the OAE may comprise two coupled non-parallel and non-coplanar surfaces which provide reflective, refractive and/or diffractive elements for changing the direction of a beam path. A first directional change may occur at a first position when the beam hits a first reflective, refractive and/or diffractive surface. A second directional change may occur at a second position (spaced apart from the first position) when the beam hits a second reflective, refractive and/or diffractive surface. In particular, a prism may be used as an OAE in exemplary embodiments. The OAE may be configured to provide four degrees of freedom which affect the direction of the beam (out of six axes of movement—x, y and z axes and rotation around x, y and z axes) as described further below.

As a result, the OAE may be configured to provide an output beam path that is non-coplanar with the input beam path. As described below, the use of an OAE in various embodiments can provide important advantages in the process of aligning optical components. In alternate embodiments, however, other alignment systems could be used, such as a system with two non-coupled reflective surfaces or other separate individually aligned optical components.

FIGS. 4–10 illustrate an embodiment of the OAE as a prism. For illustrative purposes, the Cartesian x-axis, y-axis, and z-axis are defined as shown in FIGS. 4–10.

Figure 4:
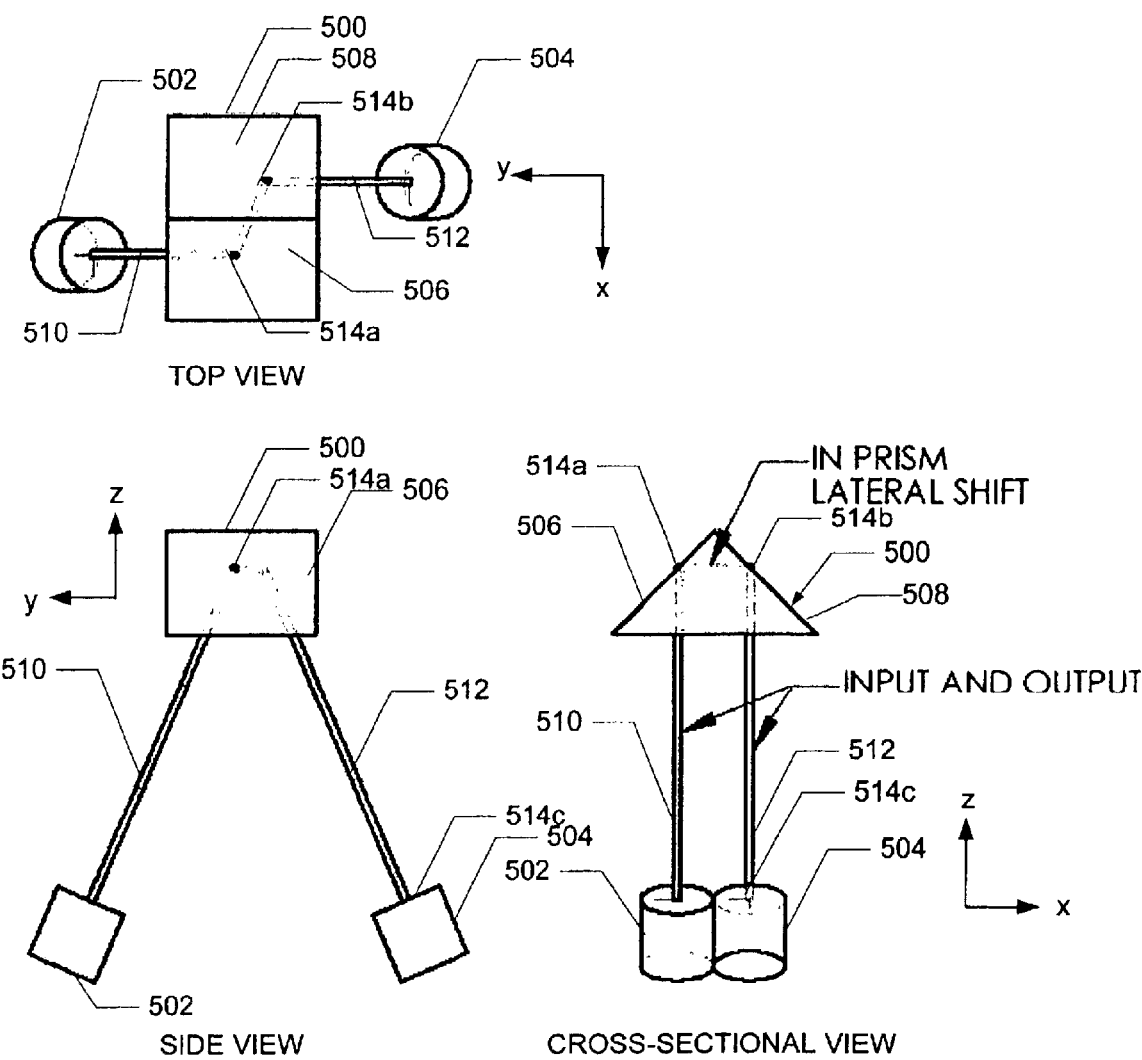
FIG. 4 illustrates a top, side, and cross-sectional orthogonal views of the prism as the OAE.
Figure 5:
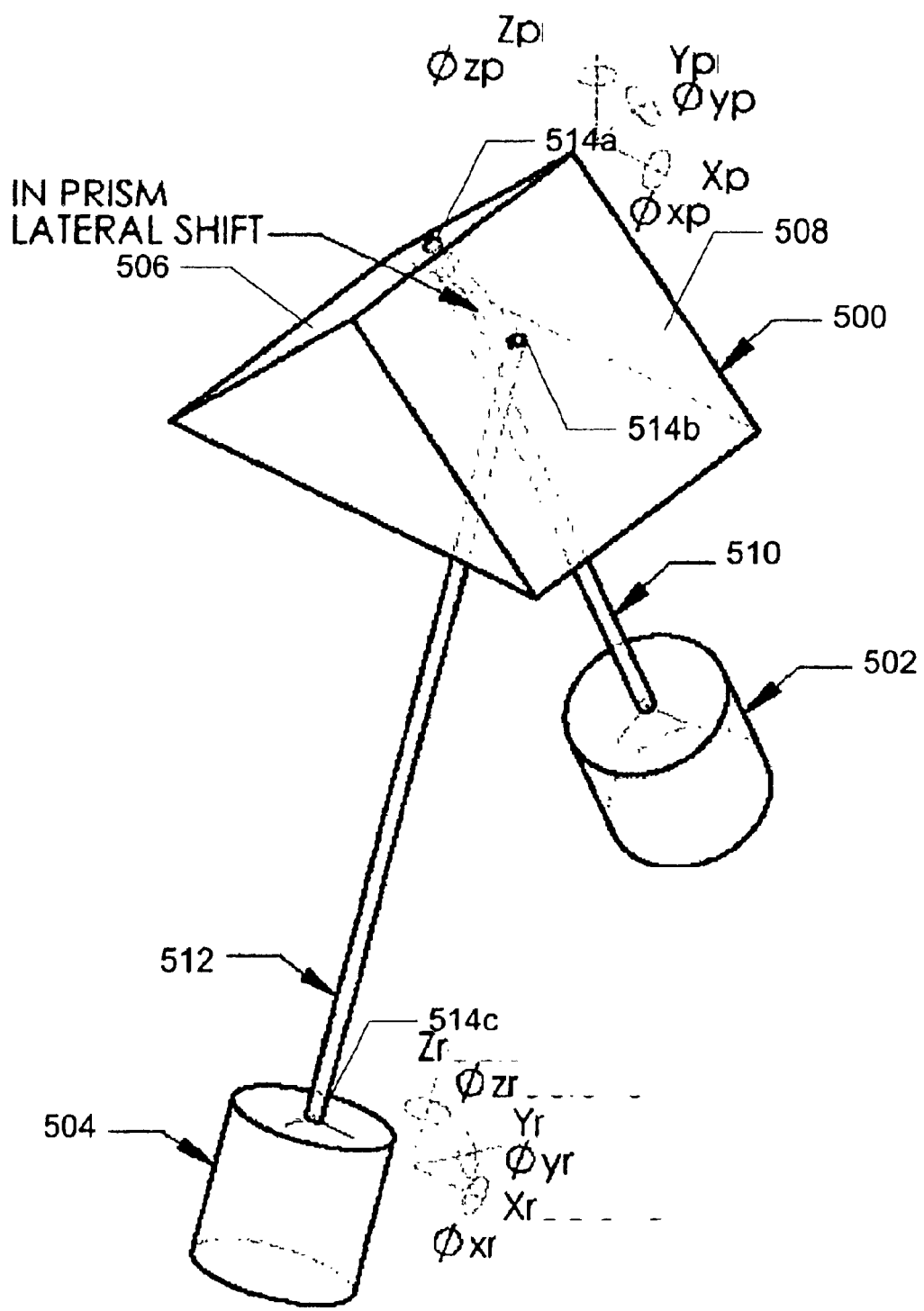
FIG. 5 illustrates an isometric view of the prism as the OAE.
Figure 6:
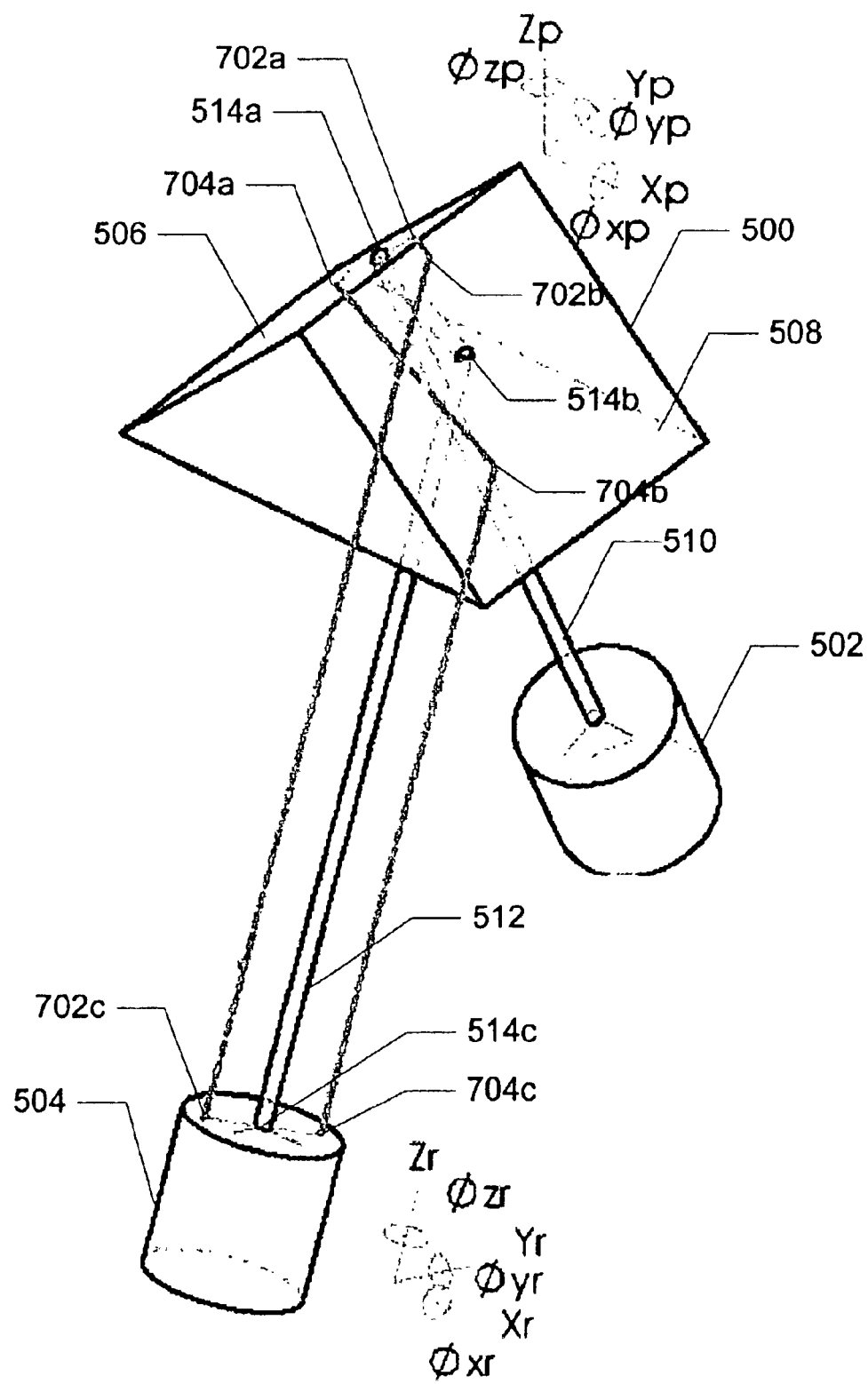
FIG. 6 illustrates the positioning of the beam with a prism movement in the x-direction.

FIG. 4 illustrates a top, side, and cross-sectional orthogonal views of the prism as the OAE. The top view illustrates the prism 500 along the z-axis; the side view illustrates the prism 500 along the x-axis; and the cross-sectional view illustrates the prism 500 along the y-axis. FIG. 5 illustrates an isometric view of the prism as the OAE. In FIGS. 4 and 5, an emitter 502 provides an emitted beam 510. The emitted beam 510 enters the prism 500 and reflects off a first surface 506 at point 514a to a second surface 508. The beam reflects off the second surface 508 at point 514b and exits the prism 500 as reflected beam 512. The reflected beam 512 travels to point 514c on a receiver 504. The first 506 and second 508 surfaces are non-parallel and non-co-planar. FIGS. 6–10 illustrate the positioning of a beam with various prism movements. The x-, y-, and z-axes at the prism 500 and receiver 504 are defined as shown in FIGS. 6–10. FIG. 6 illustrates the positioning of the beam with a prism movement in the x-direction. A movement of the prism 500 along the prism x-axis ($X_p$) produces a shift along the receiver x-axis ($X_r$) and a smaller shift along the receiver y-axis ($Y_r$). One of ordinary skill in the art will understand that with the axes as defined above, the shift of the reflected beam 512 along $Y_r$ results from some coupling along the prism z-axis ($Z_p$), where movement of prism 500 along $X_p$ results in additional path length for the beam. For example, the prism 500 can be moved such that the emitted beam 510 is reflected from the first surface 506 at point 702a, reflected from the second surface 508 at point 702b, and travels to point 702c on the receiver 504. For another example, the prism 500 can be moved such that the emitted beam 510 is reflected from the first surface 506 at point 704a, reflected from the second surface 508 at point 704b, and travels to point 704c on the receiver 504.

Figure 7:
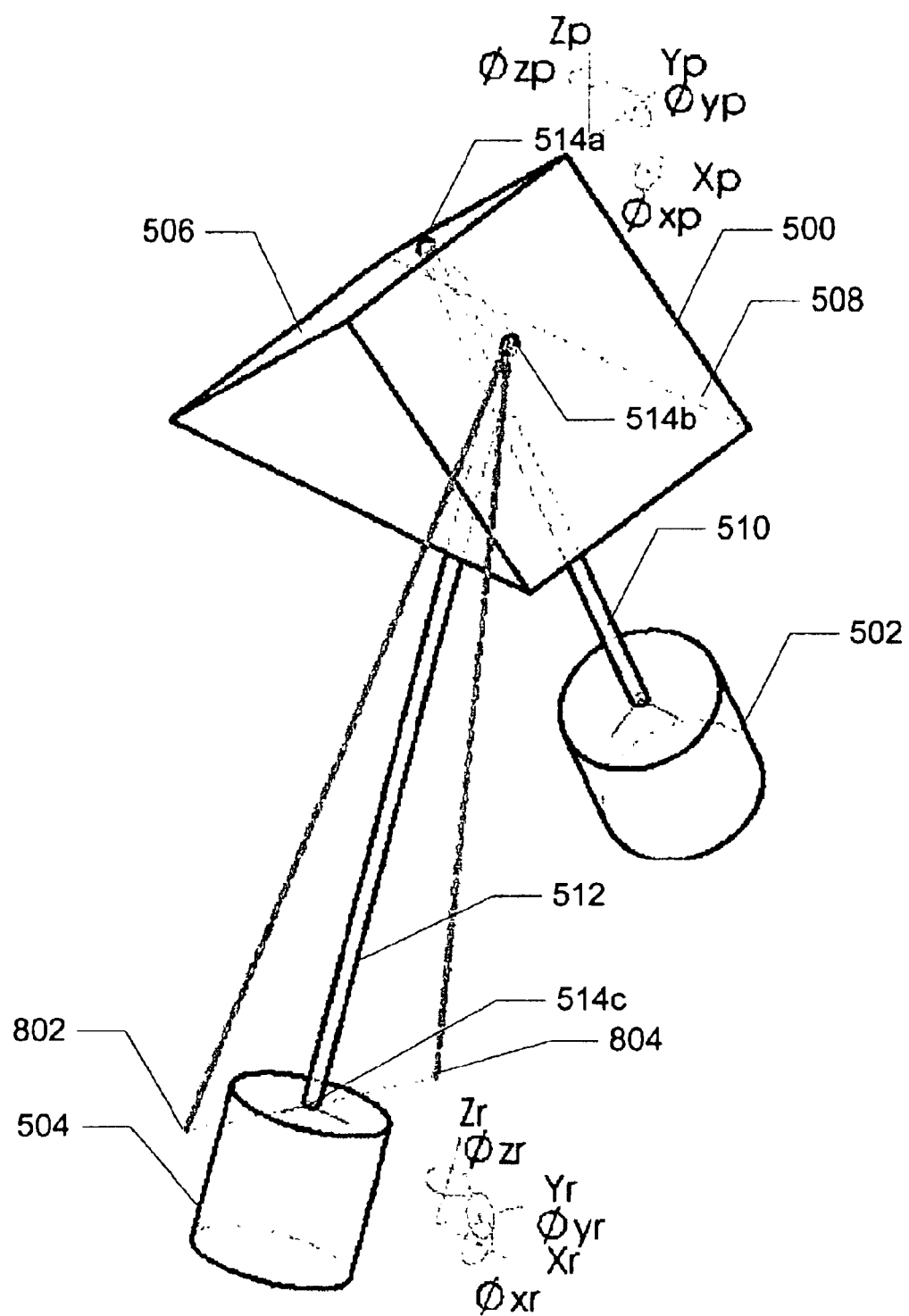
FIG. 7 illustrates the positioning of the beam with a prism movement in the $\theta_x$ direction.

FIG. 7 illustrates the positioning of the beam with a prism movement in the $\theta_x$ direction. A movement of the prism 500 in the prism $\theta_x$ direction results in a shift of the reflected beam 512 along $Y_r$ and rotated in the receiver $\theta_x$ ($\theta_{xr}$) direction. For example, the prism 500 can be moved such that the emitted beam 510 is reflected from the first surface 506 approximately at point 514a, reflected from the second surface 508 at approximately point 514b, and travels either to point 802 or 804 on the receiver 504. Since the point 514a on the first surface 506 is moved a small amount compared to the movement of the points 802 or 804 on the receiver 504, the angle of $\theta_{xr}$ is changed. Thus, there are small changes in the points 514a and 514b when rotating about the prism $\theta_x$ axis ($\theta_{xp}$).

Figure 8:
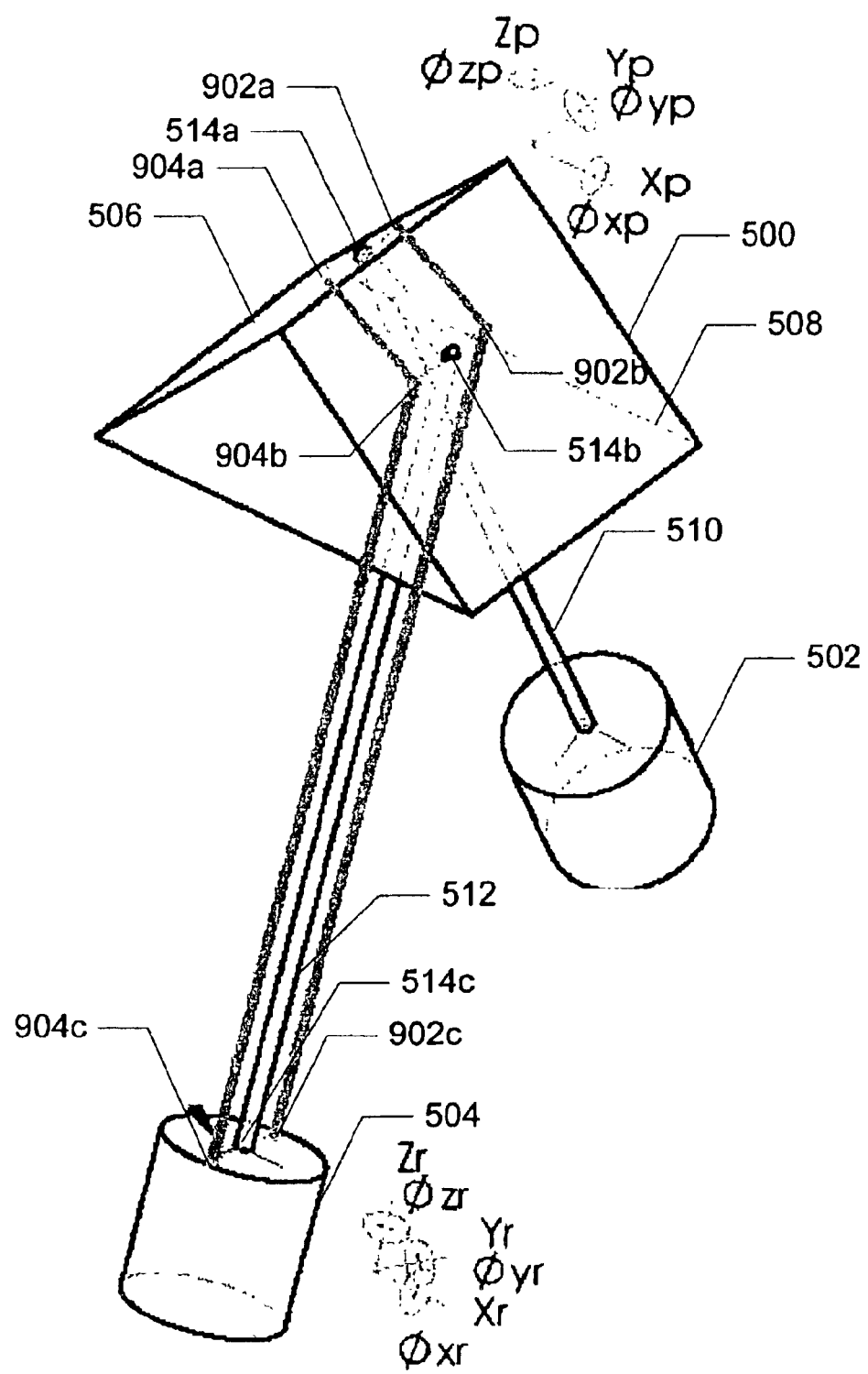
FIG. 8 illustrates the positioning of the beam with a prism movement in the z-direction.

FIG. 8 illustrates the positioning of the beam with a prism movement in the z-direction. A movement of the prism 500 along $Z_p$ results in a shift of the reflected beam 512 along $Y_r$. For example, the prism 500 can be moved such that the emitted beam 510 is reflected from the first surface 506 at point 902a, reflected from the second surface 508 at point 902b, and travels to point 902c on the receiver 504. For another example, the prism 500 can be moved such that the emitted beam 510 is reflected from the first surface 506 at point 904a, reflected from the second surface 508 at point 904b, and travels to point 904c on the receiver 504.

Figure 9:
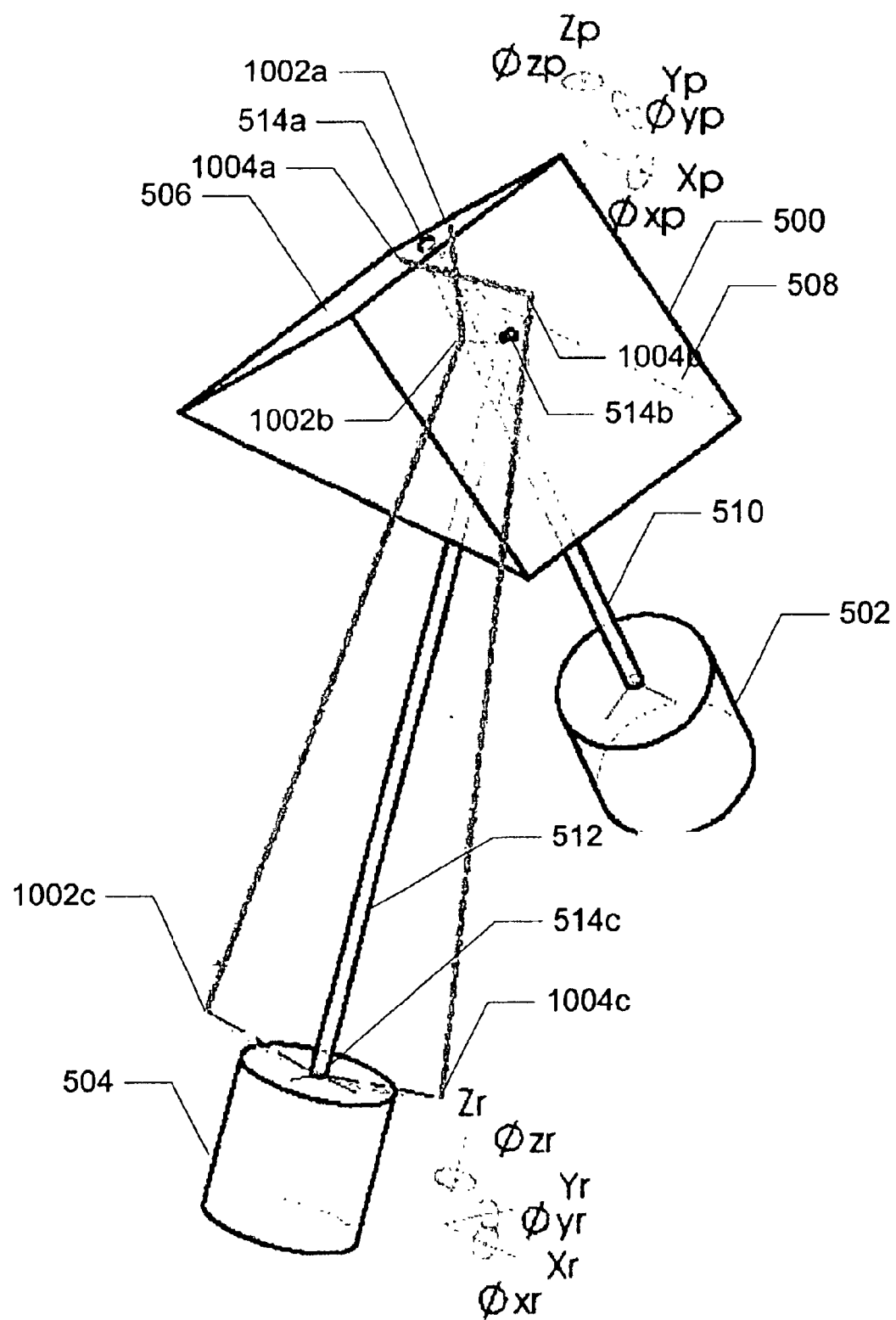
FIG. 9 illustrates the positioning of the beam with a prism movement in the $\theta_z$ direction.

FIG. 9 illustrates the positioning of the beam with a prism movement in the $\theta_z$ direction. A movement of the prism 500 in the prism $\theta_z$ direction ($\theta_{zp}$) results in a shift of the reflected beam 512 along the $X_r$, and about the receiver $\theta_y$ ($\theta_{yr}$) direction and a smaller shift along the $Y_r$ and about the $\theta_r$ direction. For example, the prism 500 can be moved such that the emitted beam 510 is reflected from the first surface 506 at point 1002a, reflected from the second surface 508 at point 1002b, and travels to point 1002c on the receiver 504. For another example, the prism 500 can be moved such that the emitted beam 510 is reflected from the first surface 506 at point 1004a, reflected from the second surface 508 at point 1004b, and travels to point 1004c on the receiver 504.

Figure 10:
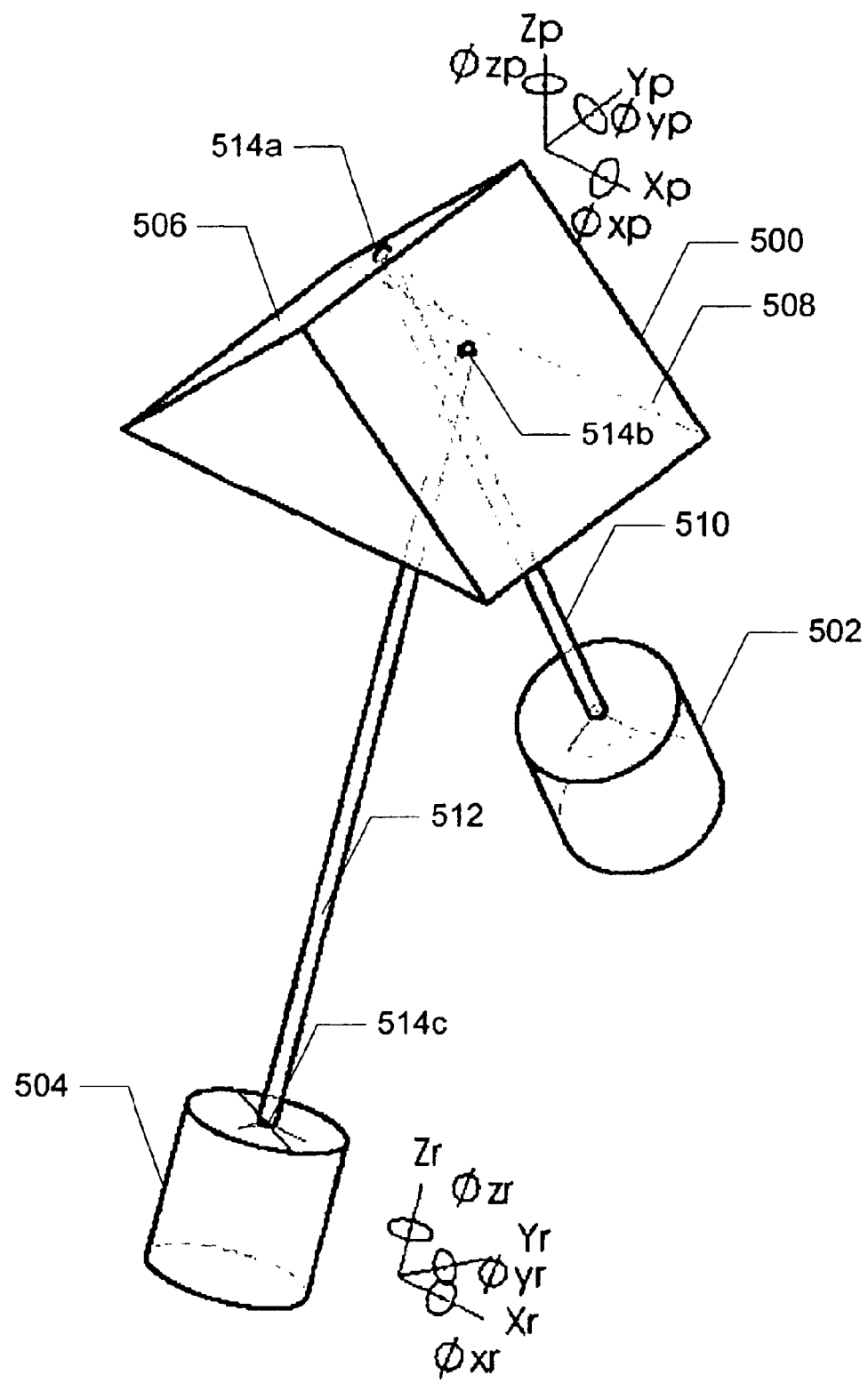
FIG. 10 illustrates the positioning of the beam with a prism movement in the prism y-direction and in the prism $\theta_y$ ($\theta_{yp}$) direction.
Figure 11A:
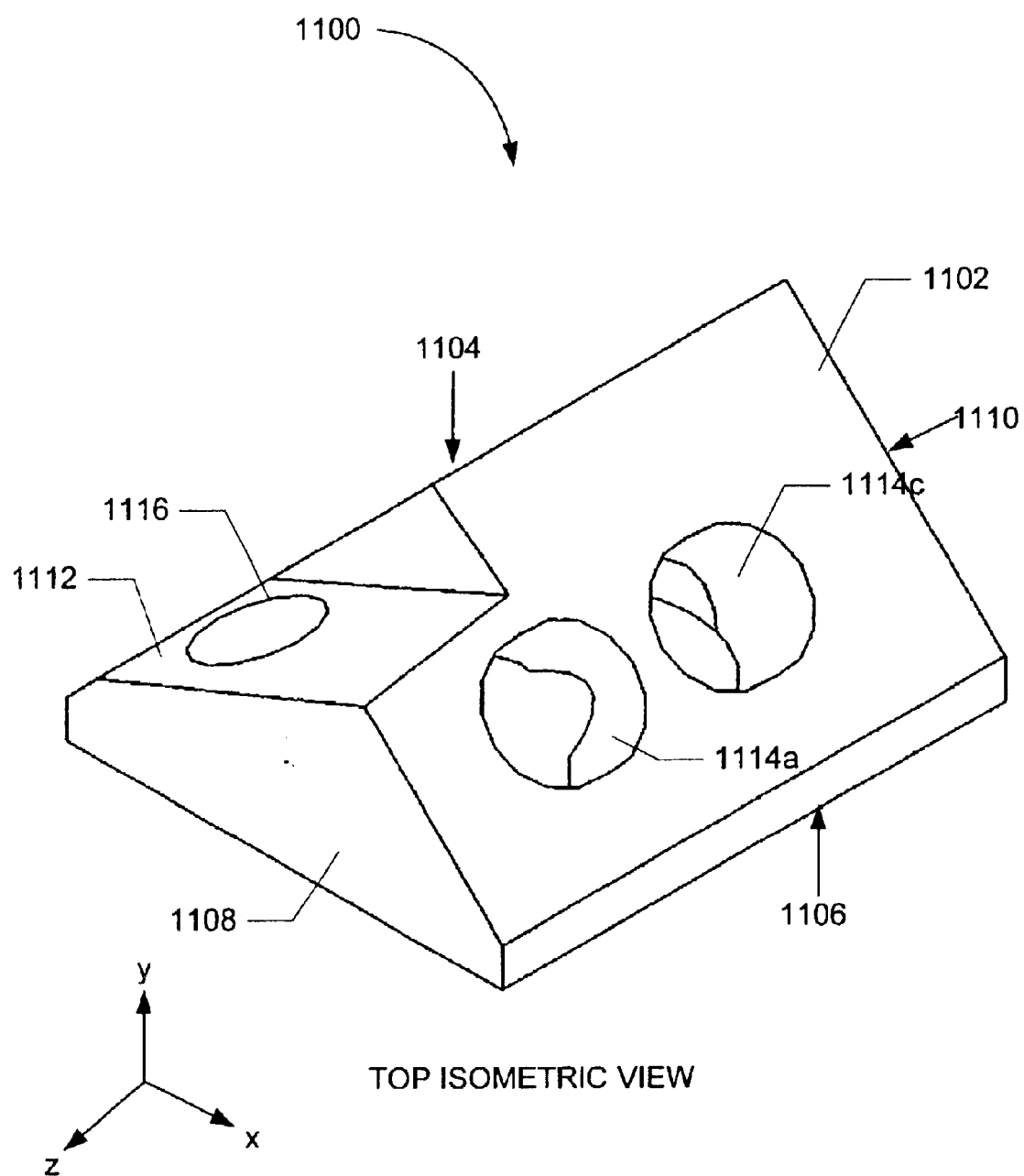
FIGS. 11A–11E illustrate a top isometric, bottom isometric, top, bottom, and side views, respectively, of another embodiment of a core of the device.
Figure 11B:
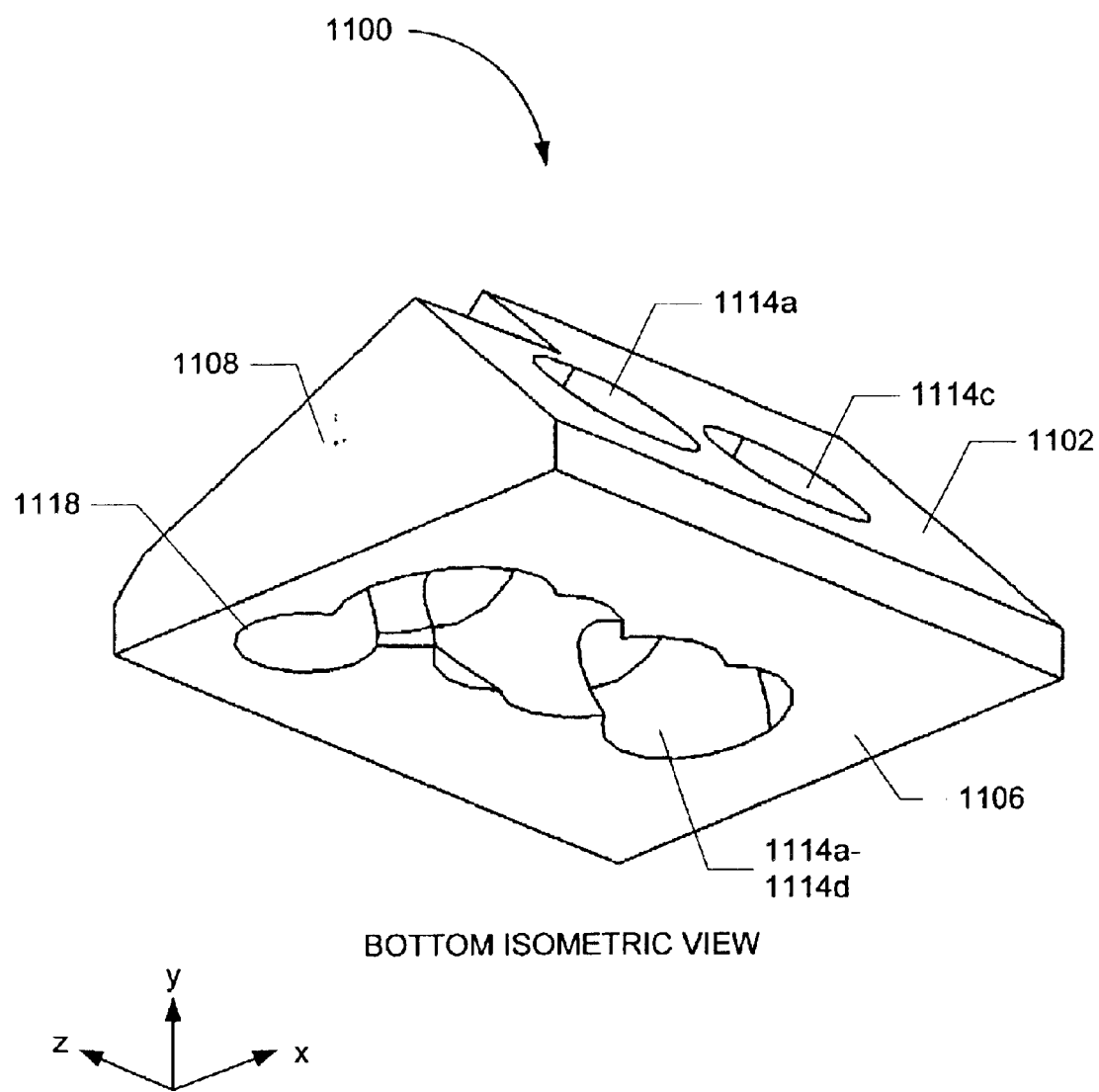
Figure 11C:
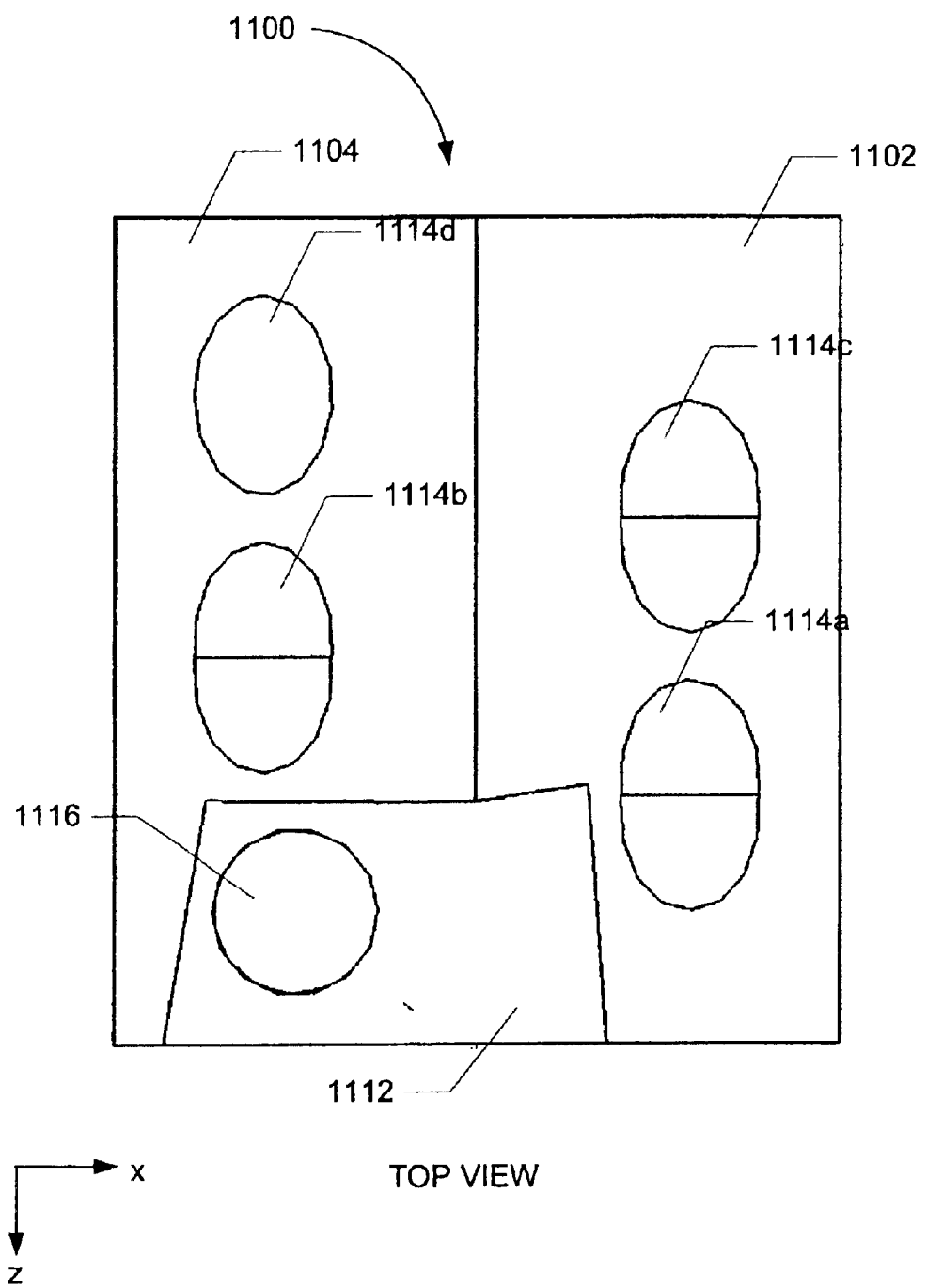
Figure 11D:
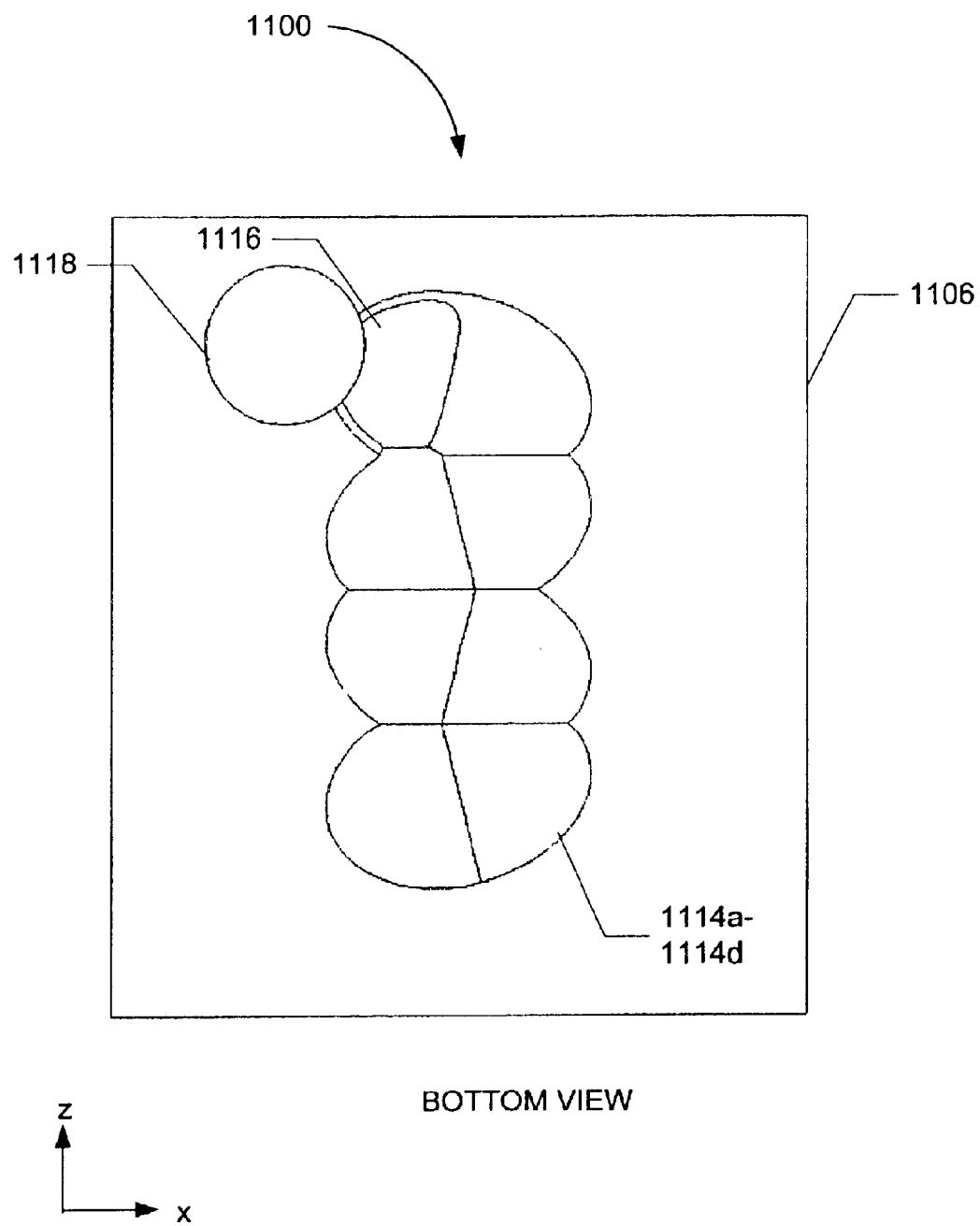
Figure 11E:
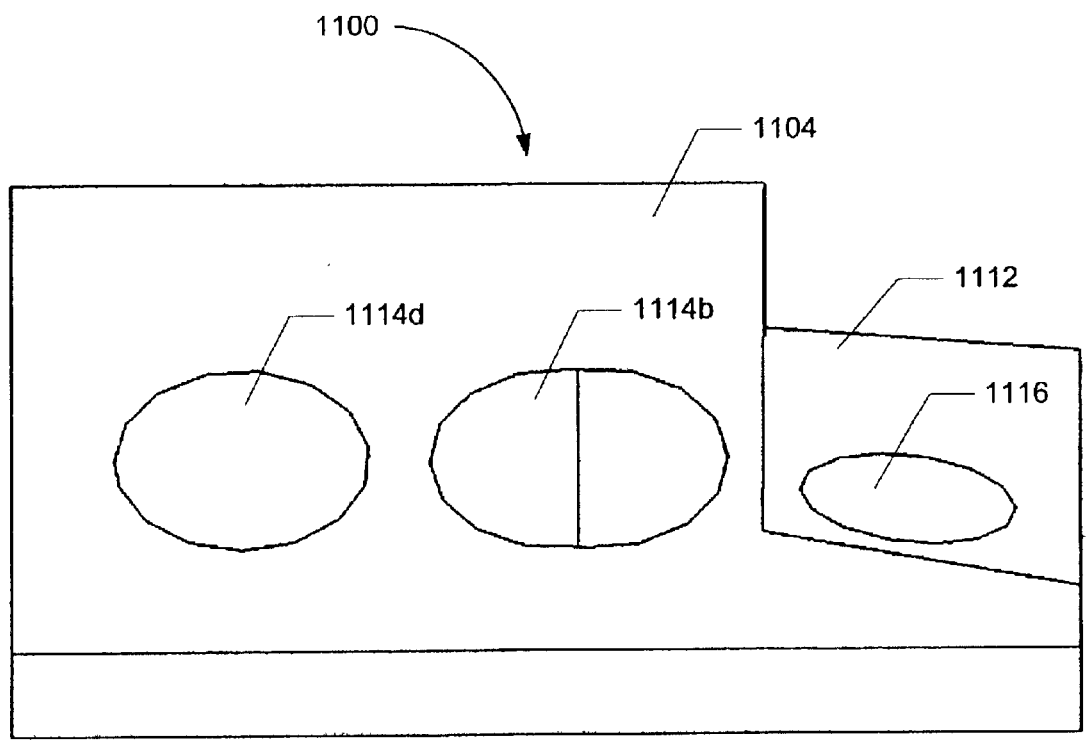
Figure 12A:
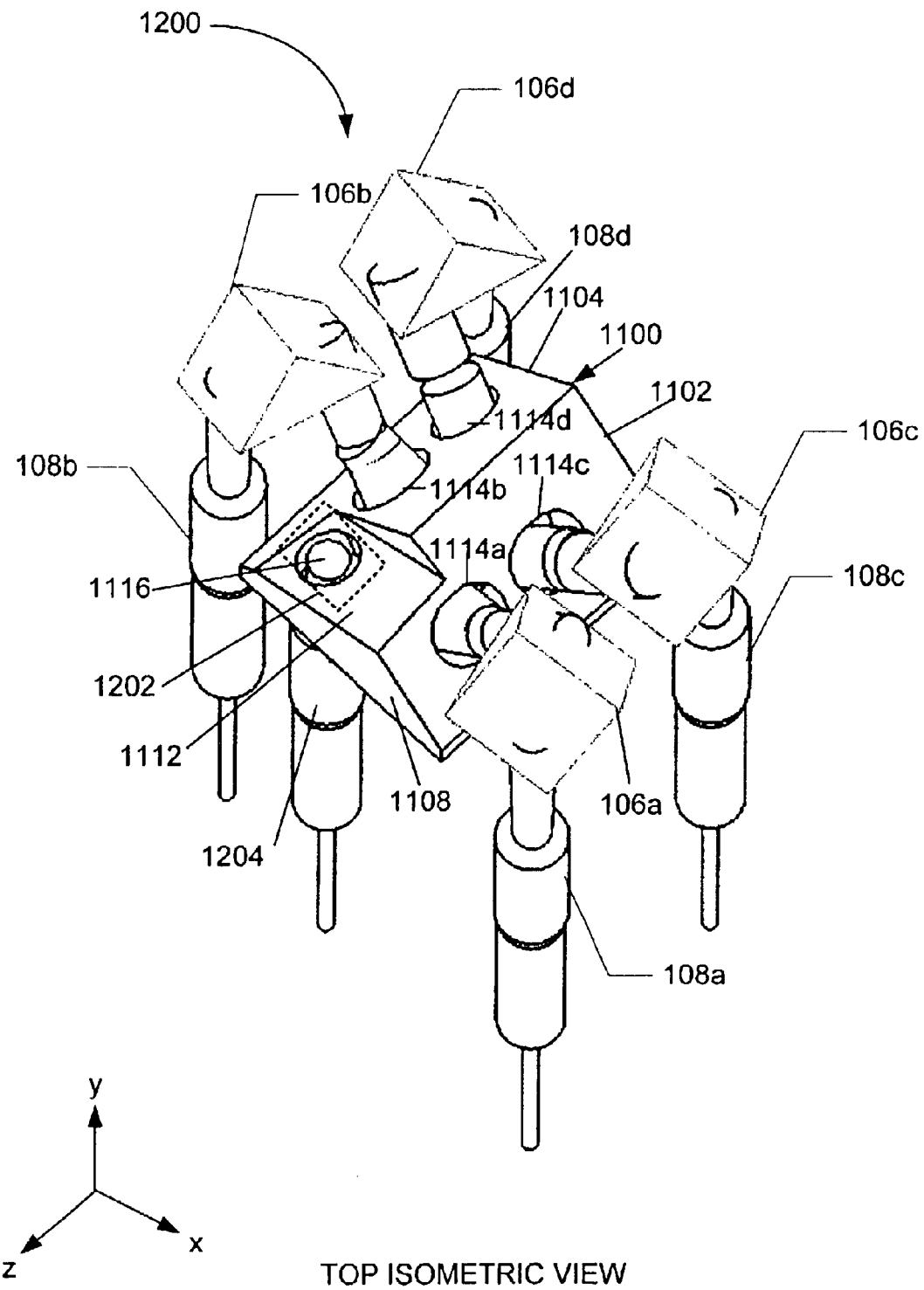
FIGS. 12A–12D illustrate a top isometric, bottom isometric, top, and bottom views, respectively, of an embodiment of the device with another embodiment of the core.
Figure 12B:
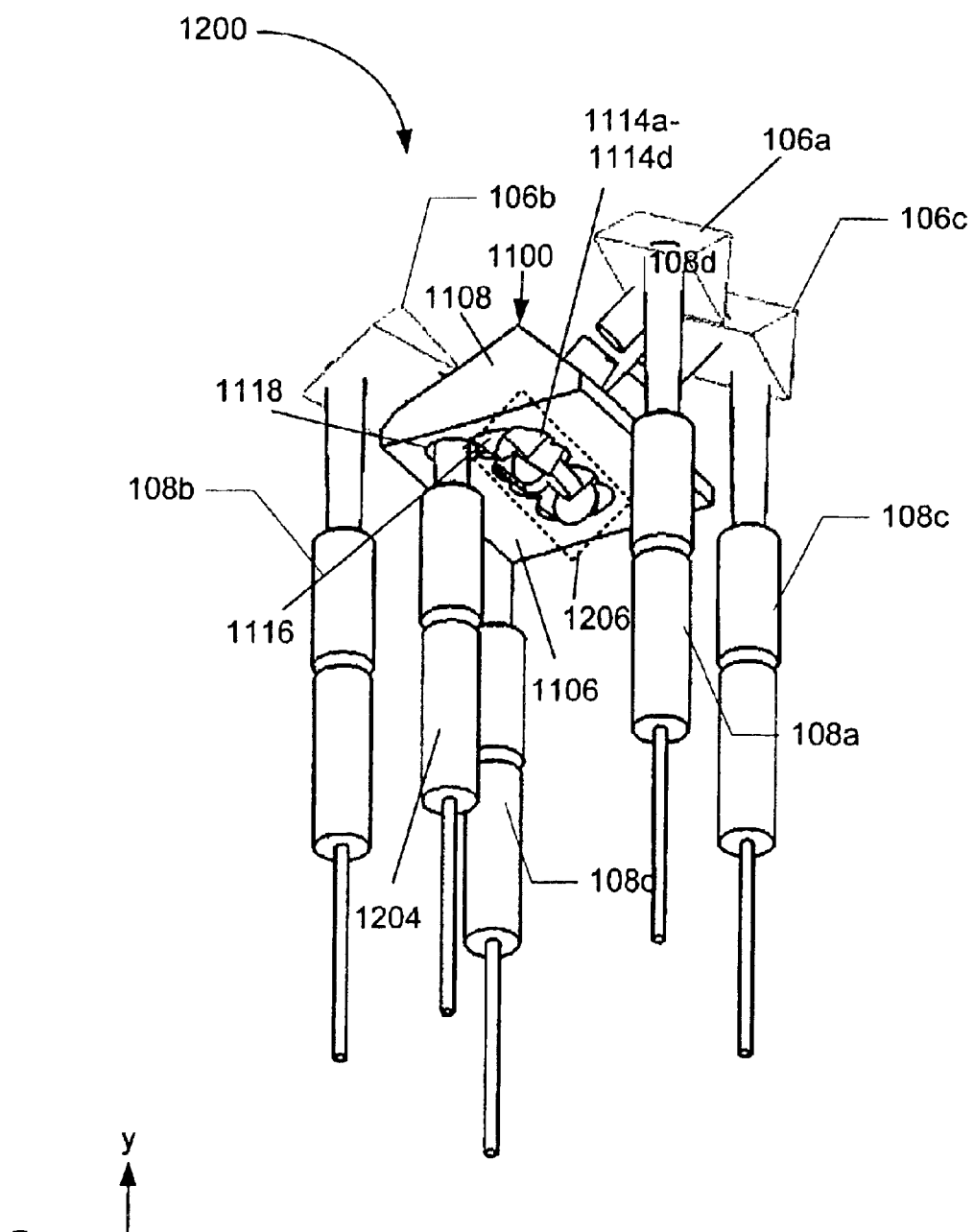
Figure 12C:
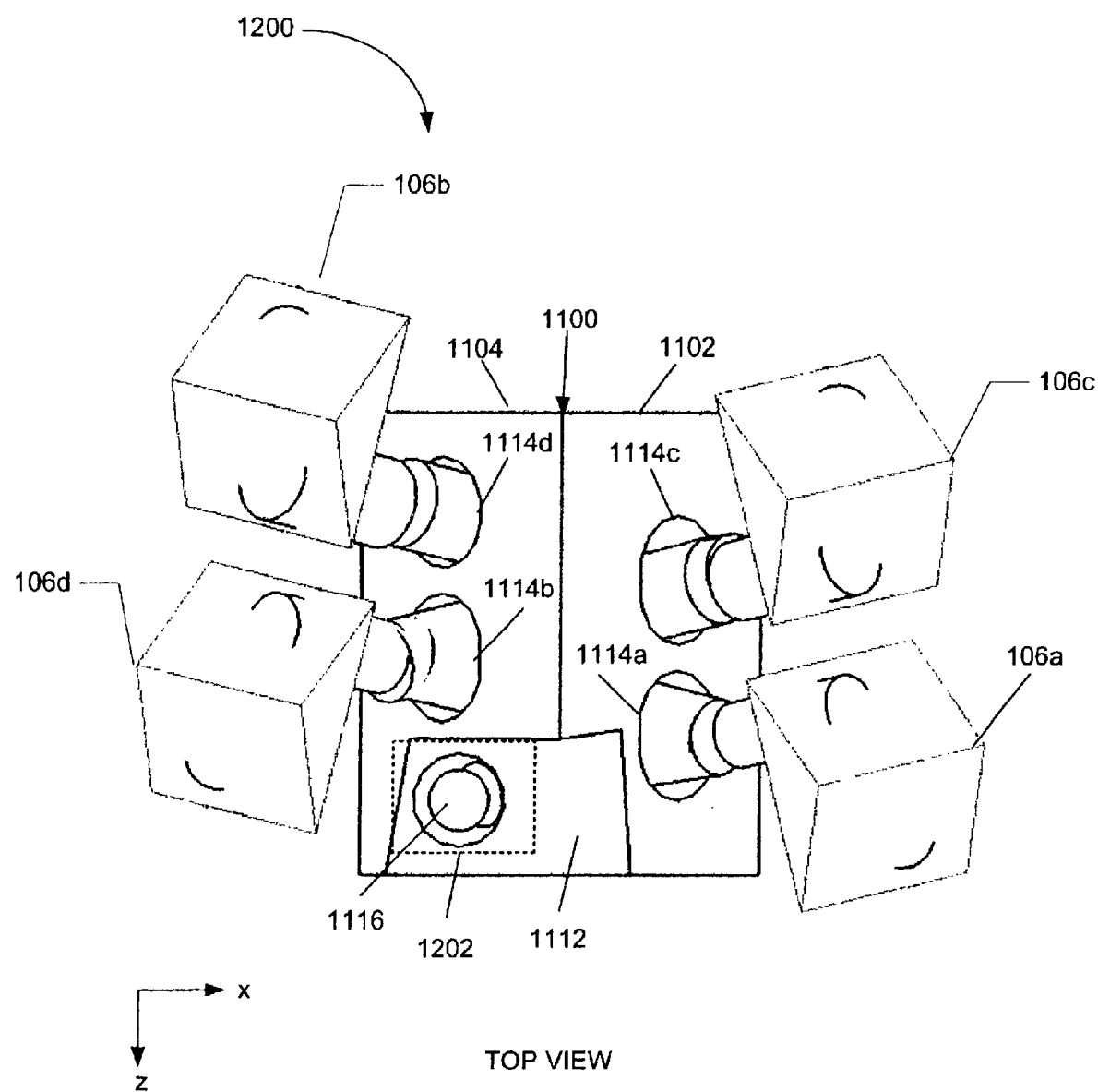
Figure 12D:
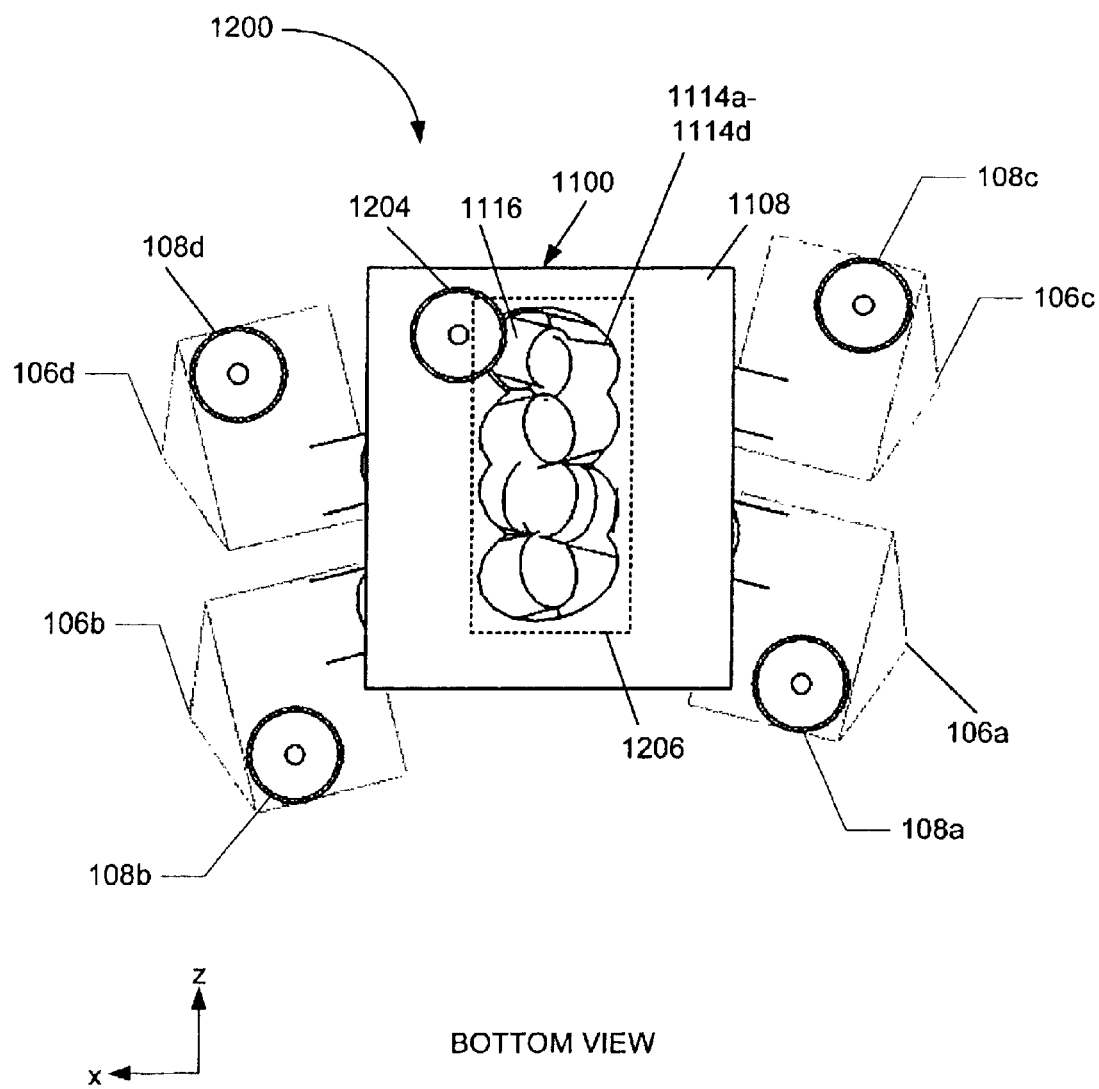

For the sake of completeness, FIG. 10 illustrates the positioning of the beam with a prism movement in the prism y-direction and in the prism $\theta_y$ ($\theta_{yp}$) direction. A movement of the prism 500 in the prism y-direction ($Y_p$) and the $\theta_{yp}$ direction results in a small shift in the reflected beam 512.

Thus, the prism 500 provides four degrees of freedom which affect the reflected beam 512: translation of the reflected beam 512 along $X_r$, translation of the reflected beam 512 along $Y_r$, rotation of the reflected beam 512 about $\theta_{xr}$, and rotation of the reflected beam 512 about $\theta_{yr}$. If the receiver 504 is an optical fiber, then the translations along $X_r$ and $Y_r$ center the reflected beam 512 on the face of the fiber, and the rotations about $\theta_{xr}$ and $\theta_{yr}$ ensures that the reflected beam 512 enters the fiber perpendicular to the fiber's face. With these four degrees of freedom which affect the receiver beam 512, the prism 500 can align light beams between two locations.

Although the axes are defined as illustrated in FIGS. 4–10, they can be defined in other ways.

The OAE 106 allows for significant advantages over conventional methods in the manufacturing of optical devices. It allows the optical elements in a device, other than the OAE 106, to be placed and fixed in place without substantially compensating for optical alignment errors, such as using a reference surface or a vision system, or some other system or method that does not substantially compensate for optical alignment errors. The OAE 106 is inserted into the beam path, and the beam is aligned to a desired beam path, where alignment of the beam path substantially compensates for cumulative alignment errors in the beam path. This greatly increases the ease in the manufacturing of optical devices, especially for devices with numerous optical elements, and lowers the cost of manufacturing. Because only the OAE 106 needs to be accessed and moved for alignment, the size of the device can be smaller. Also, the tolerances of the placement of optical elements are also increased, and the optical elements do not require special features for alignment.

The OAE 106 may be used to manufacture many different optical devices. For example, it can be used to manufacture a single or multi-channel multiplexer, demultiplexer, transmitter, receiver, or transceiver, or any combination thereof. The alignment and manufacturing method using the OAE 106 is further described in the above referenced co-pending U.S. patent application Ser. No. 09/916,624 incorporated herein by reference in its entirety.

FIGS. 11A–11E illustrate a top isometric, bottom isometric, top, bottom, and side views, respectively, of another embodiment of a core of the device. Core 1100 has a prismatic shape and is composed of metal, ceramic, plastic or any other material or combination of materials that provides a rigid frame with a coefficient of thermal expansion compatible with the desired specifications. The core 1100 comprises three side faces 1102, 1104, 1106, and two end faces 1108, 1110. The core 1100 also comprises a cut face 1112. The function of the cut face 1112 is the same as the cut face 212 of the core 200. Traversing from the cut face 1112 to a first location on the face 1106 is a first bore 1116. Traversing from the first bore 1116 to a second location on the face 1106 is a second bore 1118. The core 1100 also comprises additional bores 1114 that traverse from the faces 1102 and 1104 to the face 1106. The location of the bores 1114a–1114d, 1116, and 1118 match the path of a beam traversing through a multi-channel device. The bores 1114a–114d, 1116, 1118 will be further described below.

FIGS. 12A–12D illustrate a top isometric, bottom isometric, top, and bottom views, respectively, of an embodiment of a multiplexing device with an embodiment of the core. In this embodiment, the multiplexing device uses light sources 108a–d that are passive. The filters 104a and 104c (not shown) are coupled to the side face 1102 of the core 1100 at the location of the bores 1114a and 1114c, respectively. The filters 104b and 104d (not shown) are coupled to the side face 1104 of the core 1100 at the location of the bores 1114b and 1114d, respectively. The filters 104a–104d are not illustrated in FIGS. 12A–12D so that the bores 1114a–1114d can be seen. A first mirror 1202 is coupled to the cut face 1112 at the location of the first bore 1116, and a second mirror 1206 is coupled to the side face 1106 at the location of the bores 1114a–1114d on that face (see FIG. 12B). The OAE's 106a–106d are then placed proximate to the core 1100 so that they are optically coupled to their respective filters 104a–104d.

Light source 108d emits $\lambda_4$ to the OAE 106d, which redirects $\lambda_4$ to the filter 104d. Filter 104d transmits $\lambda_4$ through the bore 1114d to the second mirror 1206, which in turn reflects $\lambda_4$ through the bore 1114c to the filter 104c. Light source 108c emits $\lambda_3$ to the OAE 106c, which redirects $\lambda_3$ to the filter 104c. The filter 104c transmits $\lambda_3$ and reflects $\lambda_4$ through the bore 1114c to the second mirror 1206. The second mirror 1206 in turn reflects $\lambda_3$–$\lambda_4$ through the bore 1114b to the filter 104b. Light source 108b emits $\lambda_2$ to the OAE 106b, which redirects $\lambda_2$ to the filter 104b. Filter 104b transmits $\lambda_2$ and reflects $\lambda_3$–$\lambda_4$ through the bore 1114b to the second mirror 1206. The second mirror 306 in turn reflects $\lambda_2$–$\lambda_4$ through the bore 1114a to the filter 104a. Light source 108a emits $\lambda_1$ to the OAE 106a, which redirects $\lambda_1$ to the filter 104a. The filter 104a transmits $\lambda_1$ and reflects $\lambda_2$–$\lambda_4$ through the bore 1114a to the second mirror 1206. The second mirror 1206 in turn reflects $\lambda_1$–$\lambda_4$ through the first bore 1116 to the first mirror 1202, which in turn reflects $\lambda_1$–$\lambda_4$ through the second bore 1118 to the output element 1204. In this manner, $\lambda_1$, $\lambda_2$, $\lambda_3$, and $\lambda_4$ are multiplexed into the same output element 1204.

A demultiplexing device may use a similar structure by replacing light sources 108a–d with four output elements and by replacing the output element 1204 with an input element. A multiplexed light with $\lambda_1$–$\lambda_4$ may be provided by the input element (which may be located at the position indicated at 1204 in FIGS. 12A–D) to the first bore 1116 to the first mirror 1202. The first mirror 1202 reflects the light through the second bore 1118 to the second mirror 1206, which in turn reflects the light through the bore 1114a to the filter 104a. Filter 104a transmits $\lambda_1$ to the OAE 106a while reflecting $\lambda_2$–$\lambda_4$ through the bore 1114a to the second mirror 1206. The OAE 106a redirects $\lambda_1$ toward the first output element (which may be located at the position indicated at 108a in FIGS. 12A–D), while the second mirror 1206 reflects $\lambda_2$–$\lambda_4$ to the filter 104b through the bore 1114b. The filter 104b transmit $\lambda_2$ to the OAE 106b while reflecting $\lambda_3$–$\lambda_4$ through the bore 1114b to the second mirror 1206. The OAE 106b redirects $\lambda_2$ to second output element (which may be located at the position indicated at 108b in FIGS. 12A–D), while the second mirror 1206 reflects $\lambda_3$–$\lambda_4$ through the bore 1114c to the filter 104c. The filter 104c transmits $\lambda_3$ to the OAE 106c while reflecting $\lambda_4$ through the bore 1114c to the second mirror 1206. The OAE 106c redirects $\lambda_3$ to the third output element (which may be located at the position indicated at 108c in FIGS. 12A–D), while the second mirror 1206 reflects $\lambda_4$ through the bore 1114d to the filter 104d. The filter 104d transmits $\lambda_4$ to the OAE 106d. The OAE 106d redirects $\lambda_4$ to the fourth output element (which may be located at the position indicated at 108d in FIGS. 12A–D). In this manner, a multiplexed light is separated into its component channels. The locations of the bores 1114a–1114d, 1116, and 1118 thus match the path of a beam traversing through the demultiplexing device.

In an exemplary embodiment, the filters 104a–104d and mirrors 1202 and 1206 are coupled to the core 1100 by first deburring the core 1100 and cleaning it in a solvent. The core 1110 is then placed in a jig that holds the appropriate face approximately horizontally. This jig is placed on a hot plate. One of the components, such as filter 104a, is placed in the appropriate location on the core 1100. A spring clip may be used to hold the filter 104a against the surface of the core 1100. Preferably, the filter 104a mates closely to the surface of the core 1100. With the filter 104a held in place, a fiber tool is dipped into an epoxy to obtain a droplet of epoxy on the tip of the fiber tool. This droplet of epoxy is then touched to the contact between the filter 104a and the core 1100. The epoxy then "hot wicks" into the contiguous area of the contact. Due to the viscous properties of the epoxy at the heated temperature, the epoxy travels, or "wicks", throughout the contact area and fills in the gaps between the filter 104a and the core 1100. About the optimal amount of epoxy will fill the contact area without excessively extruding from the contact area. By hot wicking, inadvertent tilting of the filter 104a due to the uneven thickness of the applied epoxy is reduced. A feature of hot wicking is that the epoxy does not cover the area of the filter 104a over its bore 1114a. The epoxy is then allowed to cool, and the process is repeated for the remaining components. In this embodiment, the first mirror 1202 is first epoxied to the core 1100, then each filter 104a–104d, and then the second mirror 1206.

In an exemplary embodiment, an epoxy such as Zymet F-711 is used to couple the filters 104a–104d and mirrors 1202 and 1206 to the core 1100. However, other epoxies can also be used. Preferably, the epoxy has high temperature stability, low viscosity, high strength, and high moisture absorption.

Figure 13A:
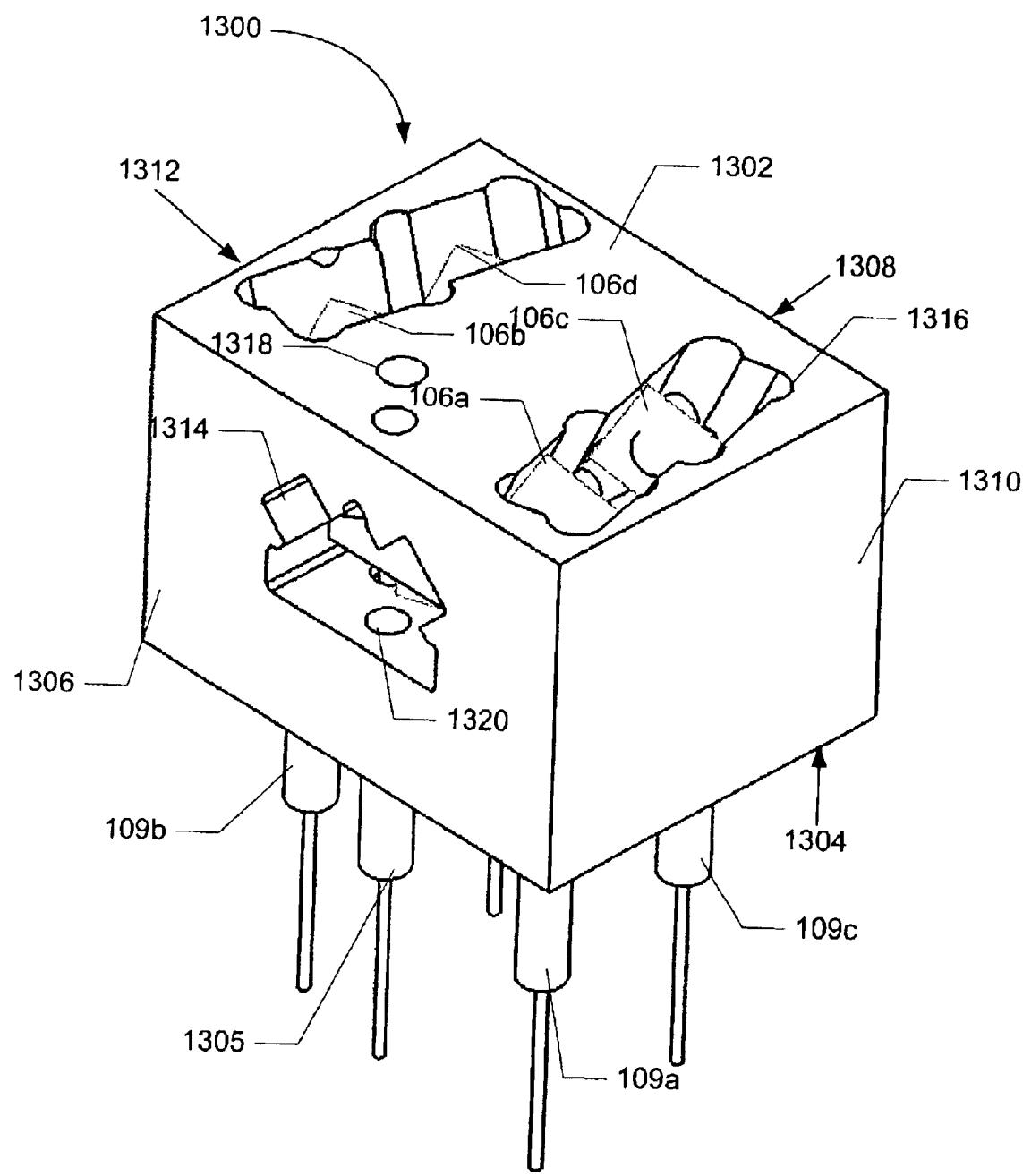
FIGS. 13A–13C illustrate an isometric, top, and front views, respectively, of an embodiment of a chassis for the device.
Figure 13A:
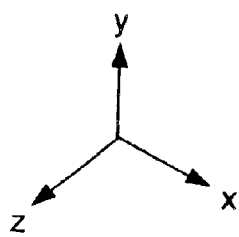
Figure 13B:
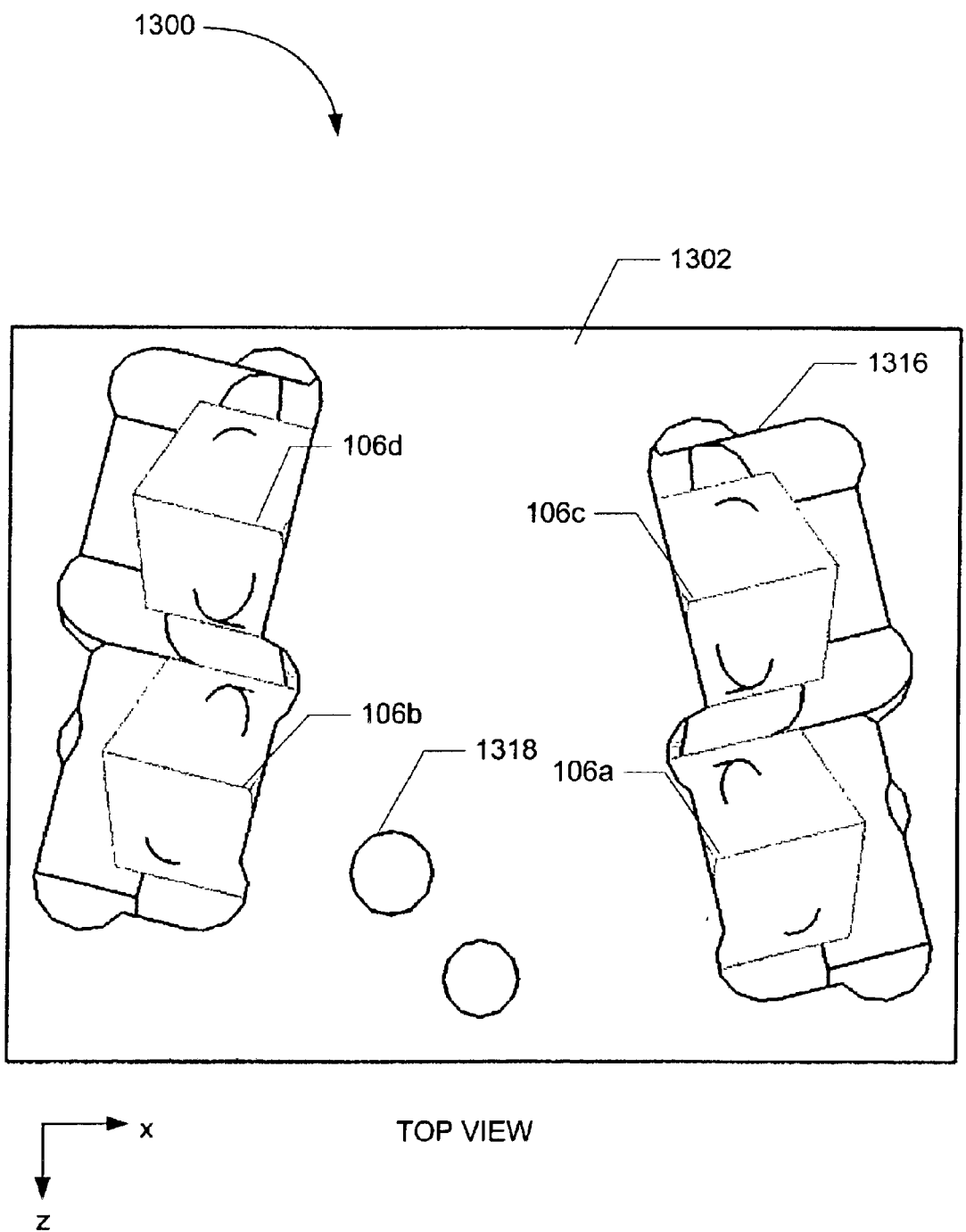
Figure 13C:
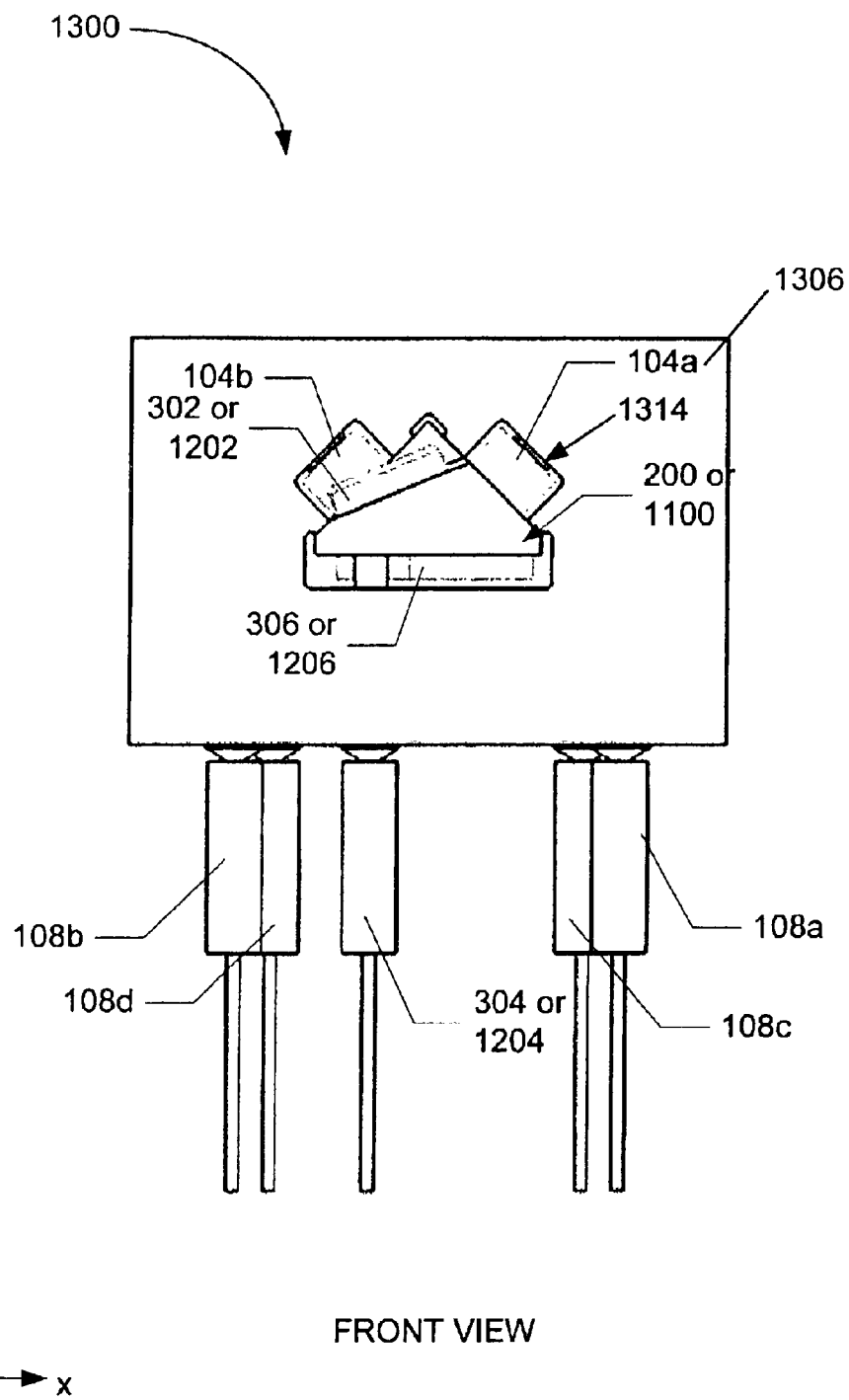

FIGS. 13A–13C illustrate an isometric, top, and front views, respectively, of an embodiment of a chassis for the multi-channel device. The chassis 1300, (which together with the core provides a "frame" for the device in this embodiment), comprises a top face 1302, bottom face 1304, first side face 1310, second side face 1312, a first end face 1306, and a second end face 1308. The chassis 1300 comprises a hole 1314 that traverses from the first end face 1306 to the second send face 1308. The core 200 or 1100 resides within the hole 1314 (shown in FIGS. 13A–C with demultiplexer components which include output elements 109a–d and an input element 1305; for a multiplexer device, light sources 108a–d and output element 304 or 1204 may be substituted). The chassis 1300 also comprises holes 1316 in the top face 1302 that traverse to the hole 1314. The bottom face 1304 also comprises holes 1320 that traverse to the hole 1314. The OAE's 106a–106d reside within the holes 1316, and the output elements 109a–109d reside within the holes 1320. In addition, the chassis 1300 comprises holes 1318 for alignment of pins (not shown), used to help position the core. In this embodiment, if core 200 is used, the filters 104a–104d and mirrors 302 and 306 are first coupled to the core 200, as illustrated in FIGS. 3A–3D, using the hot wicking method described above. If core 1100 is used, the filters 104a–104d and mirrors 1202 and 1206 are first coupled to the core 1100, as illustrated in FIGS. 12A–12D, using the hot wicking method. Then, the core/filter/mirror assembly is placed within the hole 1314. The output elements 109a–109d are also placed in their respective holes 1320. The output elements 109a–109d can be press fitted, interference fitted, thermal fitted, epoxied or soldered within the hole 1320, or held in place using any other type of fastening or fixing method.

In an exemplary embodiment, assume that the components 109a–109d are collimators. The collimators should be placed as close as possible, while allowing for the tolerances of each component. This will minimize the amount of epoxy required to affix them to the chassis 1300. Preferably, the length of engagement of the collimators into the chassis 1300 should be maximized to reduce the angular effects of changes in epoxy geometry. A symmetrical end stop can be provided to ensure consistent depth of insertion without causing any asymmetrical forces. The collimators 109a–109d are inserted into its respective hole up to the end stop.

The collimators 109a–109d are then held in place as co-linearly to its hole as possible to help with symmetry of adhesive. Once inserted, the collimator/chassis assembly should be heated smoothly and evenly. The higher the temperature, the lower the viscosity, the faster the wicking, and the faster the curing. However, if the temperature is too high, it may cause curing before the epoxy wicks or the epoxy will break down.

Once the assembly is heated, a very small amount of epoxy is applied to the contact between the collimators 109a–109d and the chassis 1300. The epoxy will naturally wick to fill the spaces of the contact. A glass fiber or very thin needle can be used to apply the epoxy. The epoxy is then cured at the applicable temperature for the appropriate amount of time, as determined by the epoxy used. The assembly is then cooled. Next, the OAE's 106a–106d are placed within the holes 1316. Each OAE 106a–106d is adjusted, as described above with FIGS. 4–10, to achieve alignment for its respective channel. Once alignment is achieved, each OAE 106a 106d is coupled to the chassis 1300. Each OAE can be coupled to the chassis 1300 using any method of fastening or fixing including but not limited to soldering or gluing.

In an exemplary embodiment, the fit between the OAE 106a–106d should be as close as possible, while allowing for the tolerances of each component. This will minimize the amount of epoxy required to affix them to the chassis 1300. For the OAE 106a–106d, space for movement of the OAE 106a–106d during the alignment process is also required. This will require additional epoxy. Once an OAE, such as OAE 106a, is aligned for optimum performance, a fixture holds the OAE 106a in place as securely as possible. The OAE 106a/chassis 1300 assembly is heated, preferably smoothly and evenly. A very small amount of epoxy is applied to the contact between the OAE 106a and the chassis 1300. The epoxy will naturally wick to fill the tight spaces of the contact. Since the amount of space between the OAE 106a and the chassis 1300 is relatively large, a higher viscosity or filled epoxy may be needed. The epoxy is cured at the applicable temperature for the appropriate amount of time. The fixture can then be removed since the epoxy is cured. The assembly is then cooled.

In an exemplary embodiment, to couple the core 1100 to the chassis 1300, the fit between the core 1100 and chassis 1300 should be as stable as possible. For example, the core 1100 can be held in a v-groove with epoxy. A stable fixture, which holds the core 1100 in place with a spring, can be used. This maintains a consistent pressure on the constraining geometry while reducing other forces. The core/chassis assembly is then heated, preferably smoothly and evenly. A very small amount of epoxy is applied to the contact between the core 1100 and the chassis 1300. The epoxy naturally wicks to fill the spaces of the contact. The epoxy is cured at the applicable temperature for the appropriate amount of time. The assembly is then cooled.

The chassis 1300 may be sealed with covers (not shown) on the end faces 1306 and 1308 and on the top 1302 and bottom faces 1304. These covers can be affixed to the chassis 1300 with epoxy, solder, or some other method.

Figure 14A:
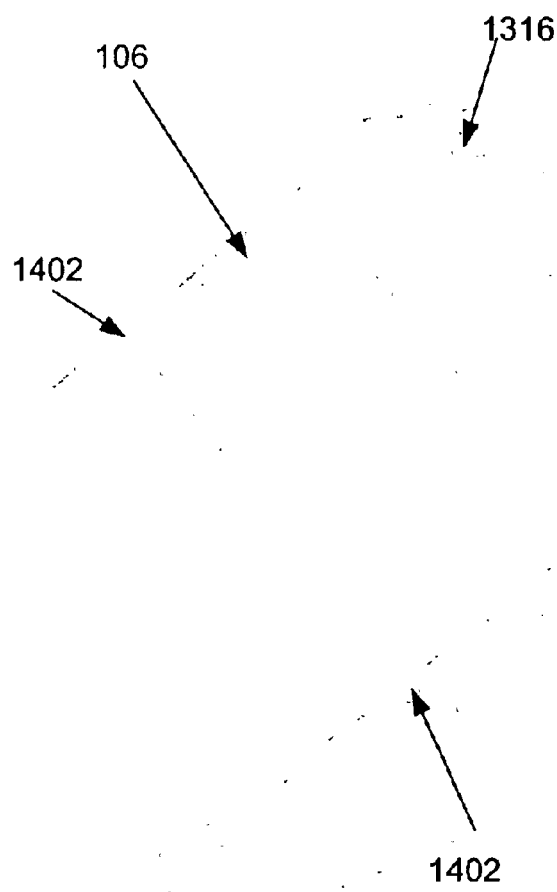
FIGS. 14A–14C illustrate an isometric, top, and side view of a bowtie configuration of a hole for adjusting the OAE in the chassis for the device.
Figure 14A:
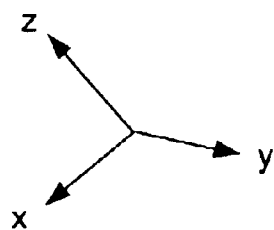
Figure 14B:
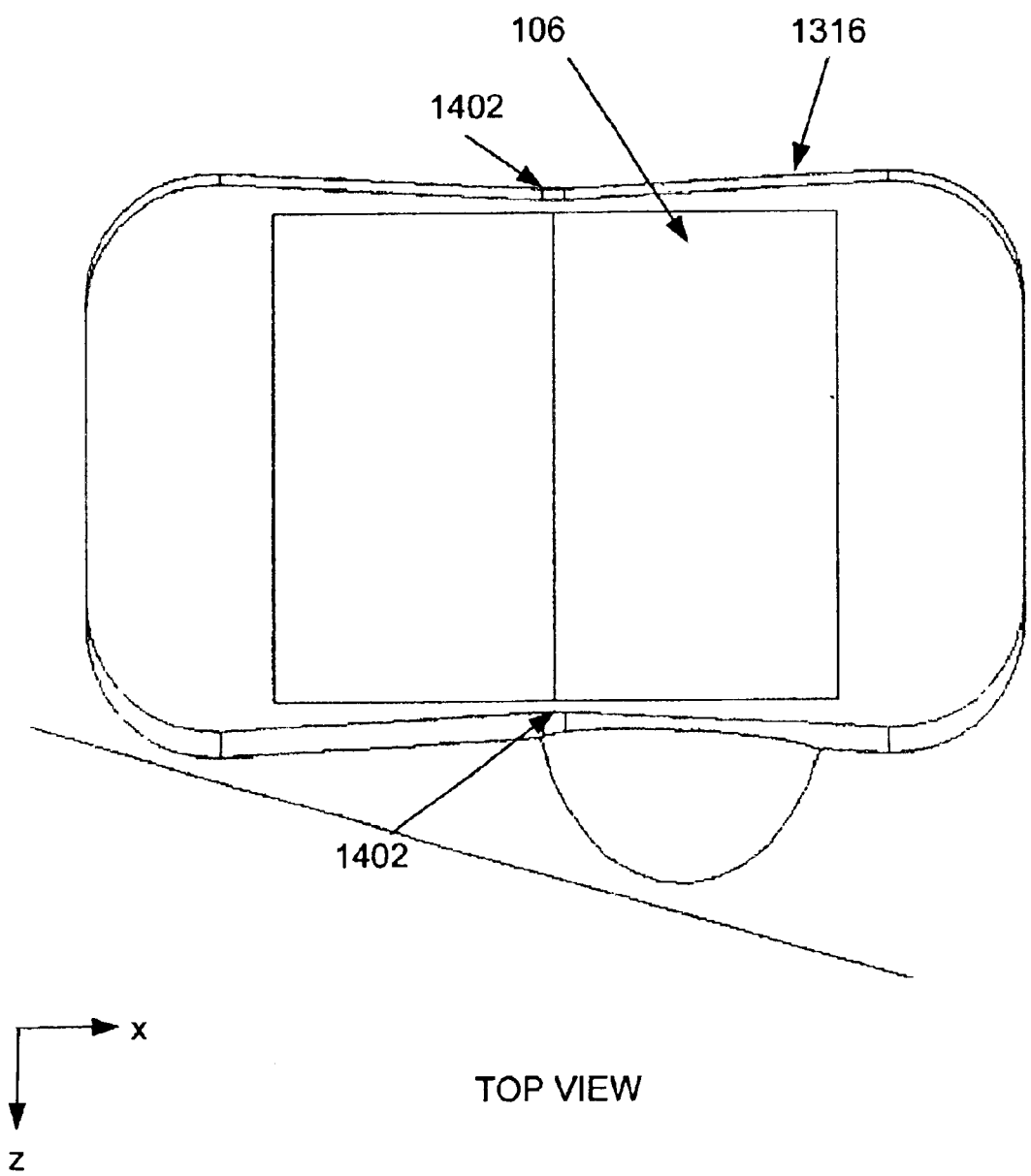
Figure 14C:
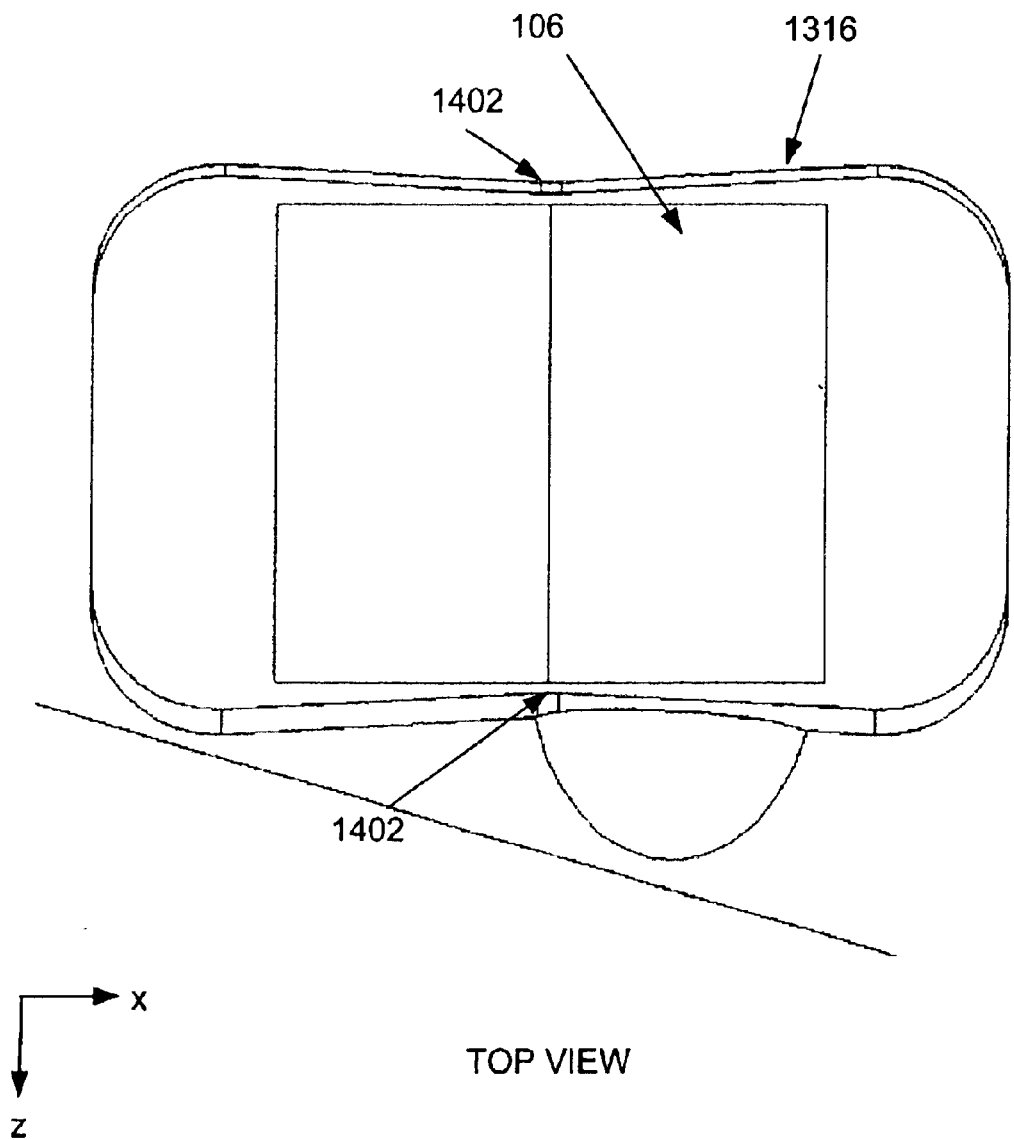

Several configurations may be used to couple an OAE 106a–106d to the chassis 1300 while within the holes 1316 of the chassis 1300. FIGS. 14A–14C illustrate an isometric, top, and side view of a bowtie configuration of hole 1316 in the chassis, which allows OAE 106 to rotate and translate within the hole 1316. The OAE 106 is aligned into position and fixed or fastened to the chassis 1300 at two locations 1402.

Figure 15A:
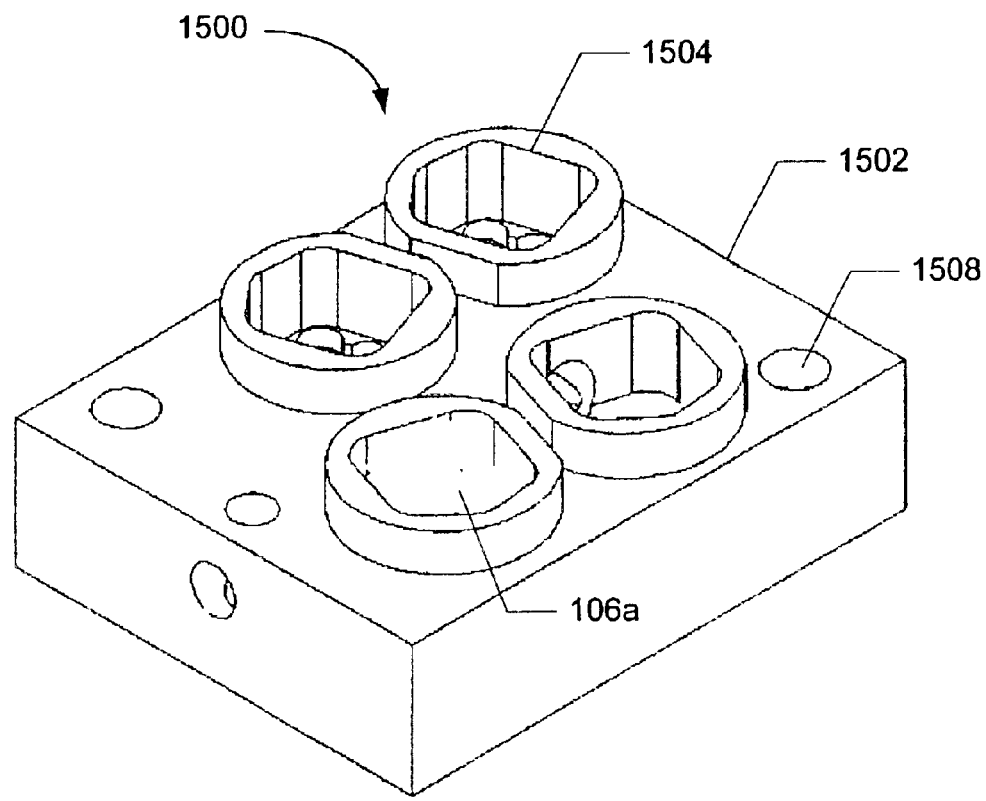
FIGS. 15A–15E illustrate two top isometric views, two bottom isometric views, and a side view, respectively, of a graduation cap for adjusting the OAE in the chassis for the device.
Figure 15A:
Figure 15B:
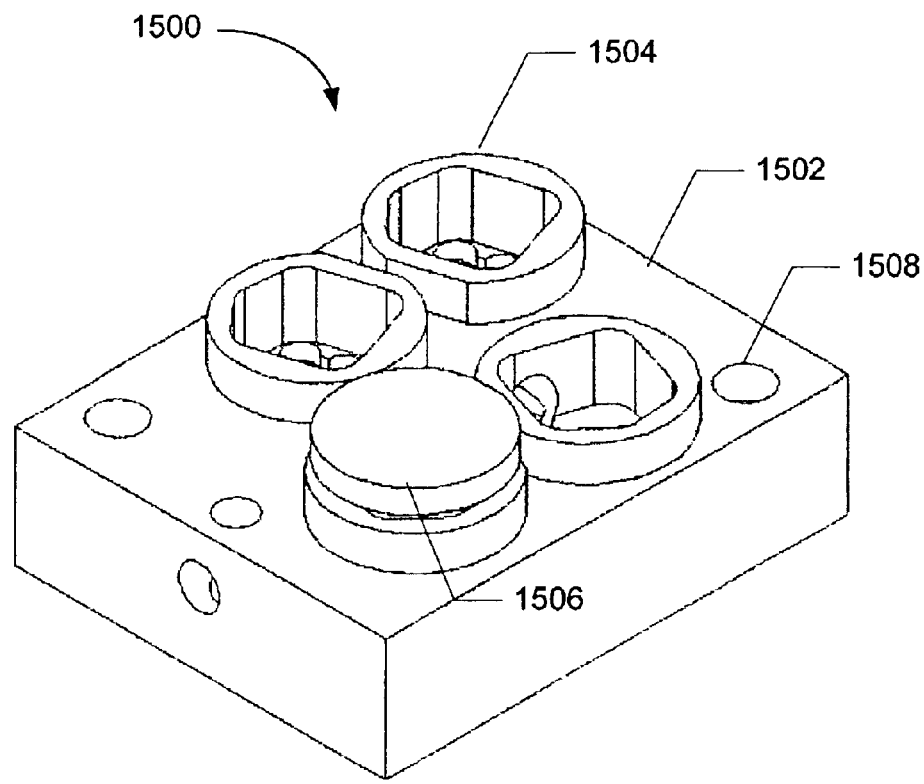
Figure 15B:
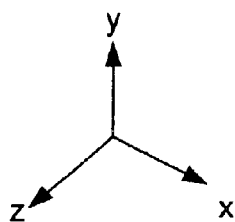
Figure 15C:
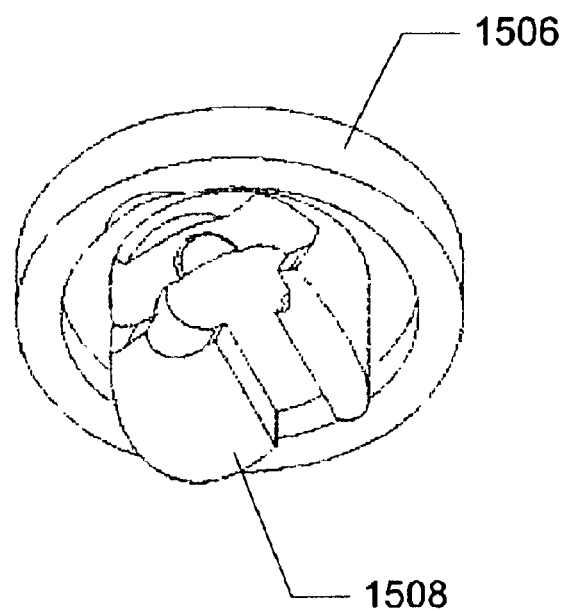
Figure 15C:
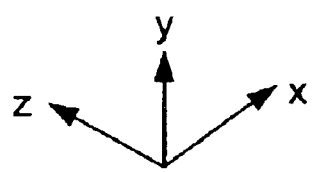
Figure 15D:
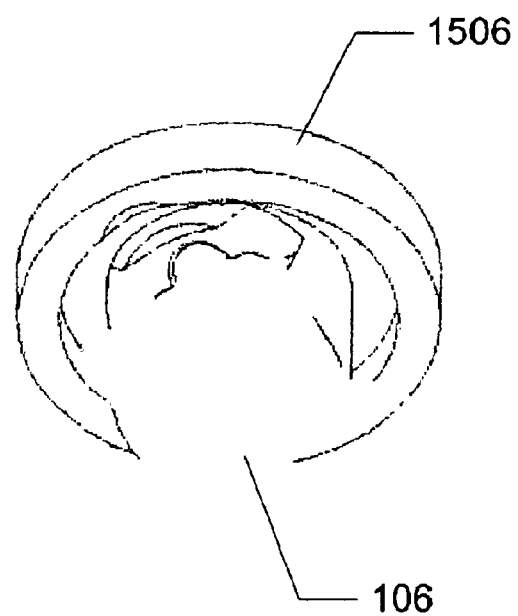
Figure 15D:
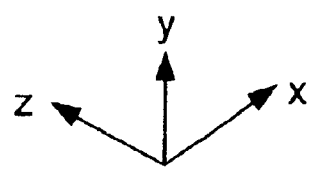
Figure 15E:
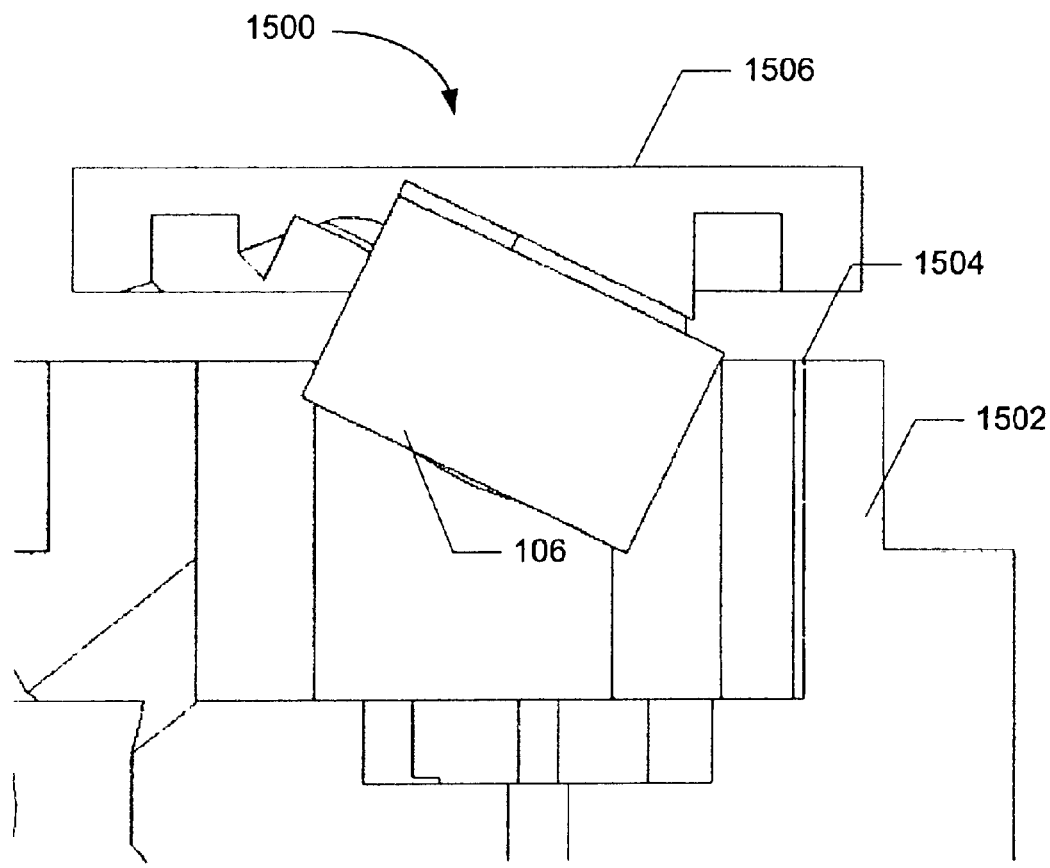
Figure 15E:
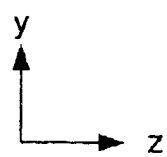

FIGS. 15A–15E illustrate two top isometric views, two bottom isometric views, and a side view, respectively, of a graduation cap method for adjusting the OAE in the chassis for the device. In this method, the holes 1316 in the chassis 1300 comprise walls 1504 (FIG. 15A) to which a cap 1506 (FIG. 15B) may couple. FIG. 15C illustrates the cap 1506 in more detail. The bottom of the cap 1506 comprises tabs 1508 which can hold onto an OAE 106. FIG. 15D illustrates the cap 1506 with an OAE 106. The cap 1506 with the OAE 106 is rotated during the alignment process. The OAE 106 may also be translated between the tabs 1508. Once alignment is achieved, the OAE 106 is coupled to the cap 1506, and the cap 1506 is coupled to the wall 1504.

Figure 15F:
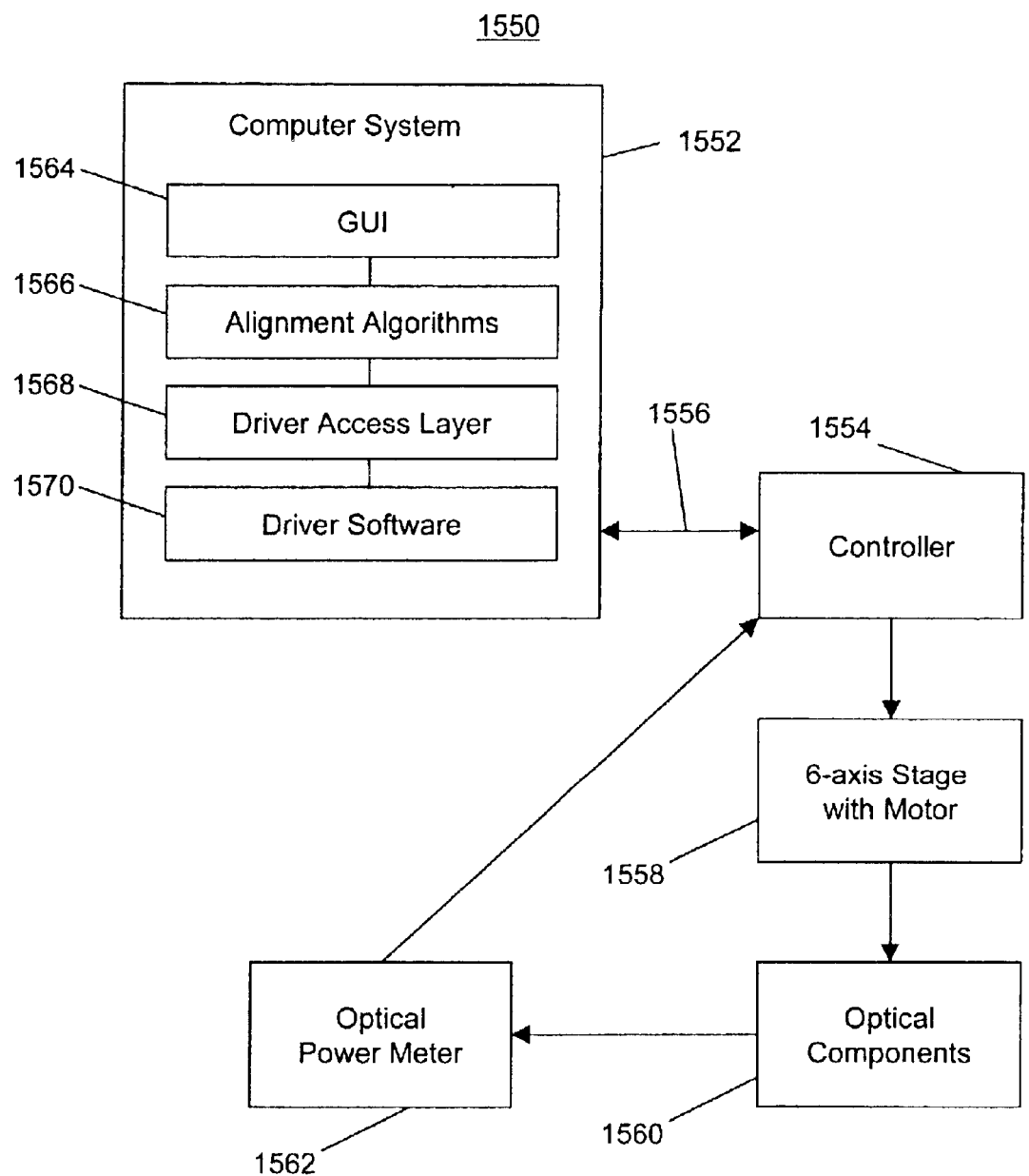
FIG. 15F is a block diagram of an exemplary system for aligning an OAE or other optical components in accordance with embodiments of the present invention.

FIG. 15F is a block diagram of an exemplary system 1550 for aligning the OAE in an optical device in accordance with an embodiment of the present invention. The exemplary system includes a computer system 1552, a controller 1554, an RS-232 cable 1556 or other communications interface between the controller and the computer system, a 6-axis stage with motor 1556, optical components to be aligned 1558, and an optical power meter 1560. The controller, 6-axis stage with motor and optical power meter may be provided as an integrated system or as separate components and may be operatively connected using a system bus, cables or other communications interface. The 6-axis stage with motor 1556 may be mechanically coupled to the cap 1506 for moving the OAE 106 for alignment (or another device for manipulating the OAE such as those described in FIGS. 16A–C, 17A–D and 18A–B below). The computer system 1552 provides commands and alignment algorithms to the controller 1554 across cable 1556. The controller 1554 controls the axis stage with motor 1556 to move one of the optical components for alignment in accordance with the algorithm from the computer system 1552. For instance, the OAE 106 may be moved relative to the chassis and core for alignment or the chassis could be moved relative to an OAE. In addition, the system 1550 may be used to align mirrors, filters, lens, collimators and other components by moving them or moving the chassis in accordance with an alignment algorithm. In an exemplary embodiment, various components may be grossly aligned and fixed in position and then the OAE may be aligned to correct for any errors.

The computer system 1552 executes software which includes a graphical user interface (GUI) 1562 which allows the user to select algorithms and commands to send to the controller, alignment algorithms 1564, a driver access layer 1566 and driver software 1568. In an exemplary embodiment, the controller may be a Polytec PI F206 system and the driver software may be HEXDLL software available from Polytec. Other controllers may be used in alternate embodiments, such as other controllers available from Polytech, Burleigh, AutoOptics, Newport and GOC. As the optical component is moved, the optical power meter 1560 detects the optical power and provides feedback to the controller 1554. The controller moves the optical component across a range of positions in accordance with the alignment algorithms in order to detect changes in the optical power.

The alignment algorithms may include a spiral search algorithm to find an initial start position for alignment with power above a certain threshold and a hill climb algorithm for finding a position with optimized lighting. A surface fitting approach, raster scan or other algorithms may also be provided. Exemplary alignment methods used for the OAE 106 further described in the above referenced co-pending U.S. patent application Ser. No. 09/916,624 incorporated herein by reference in its entirety.

The alignment algorithms may be used to incrementally step through different positions along an axis of motion. The axis expected to have the greatest impact on alignment may be used first, followed by movement along less significant axes. The process may be iterated until a desired alignment has been achieved. The following are examples of definitions for the axes that be used for the alignment system: the X-axis moves horizontally left to right along the center line of the stage; the Y-axis moves horizontally front to back; the Z-axis moves vertically up and down; the Pitch-axis or U-axis rotates about the X-axis; the Yaw-axis or V-axis rotates about the Y-axis; and the Roll-axis or W-axis rotates about the Z-axis.

In the following, the algorithm to align the XYZ position of an optical component is described. The UVZ position may be similarly adjusted. First, a scan search algorithm is used to find initial light coupling position for alignment. A spiral scan or raster scan in X and Y may be used to find a power reading above some threshold. The search continues until the threshold is reached or the maximum radius has been searched. The threshold value may be specified from the GUI. If the threshold could not be reached, Z-axis gets stepped and the XY scan search runs again. This process repeats until the threshold is reached. After the threshold is reached, a 2-dimension auto alignment algorithm is run to align XY position to the maximum power. The 2-dimension auto alignment algorithm may be specified from the GUI. The choices may include: Spiral Scan, Raster Scan, XYX Hill Climb, and YXY Hill Climb.

For the Hill Climb algorithm, the following three parameters are specified from the GUI: initial step size, number of check points, and number of iterations. The "step size" is a parameter that determines the magnitude of motion along each axis. "Check points" is the parameter that specifies the number of steps the algorithm takes past each maximum point in order to check to see if the hill would begin to rise again or not. After locating the absolute peak of the hill, the Hill Climber reduces the size of its step size by a factor of two and goes climbing in the reverse direction. The Hill Climber repeats the process and passes over the hill as many times as indicated by a parameter referred to as "iterations". This is done in order to fine tune the alignment. Upon arrival to the top of the peak the next time, the Hill Climber no longer crosses over it and rests at the top. Once the Hill Climb process is completed along one axis, it is repeated along the other axis and after that once again along the first axis.

Figure 15G:
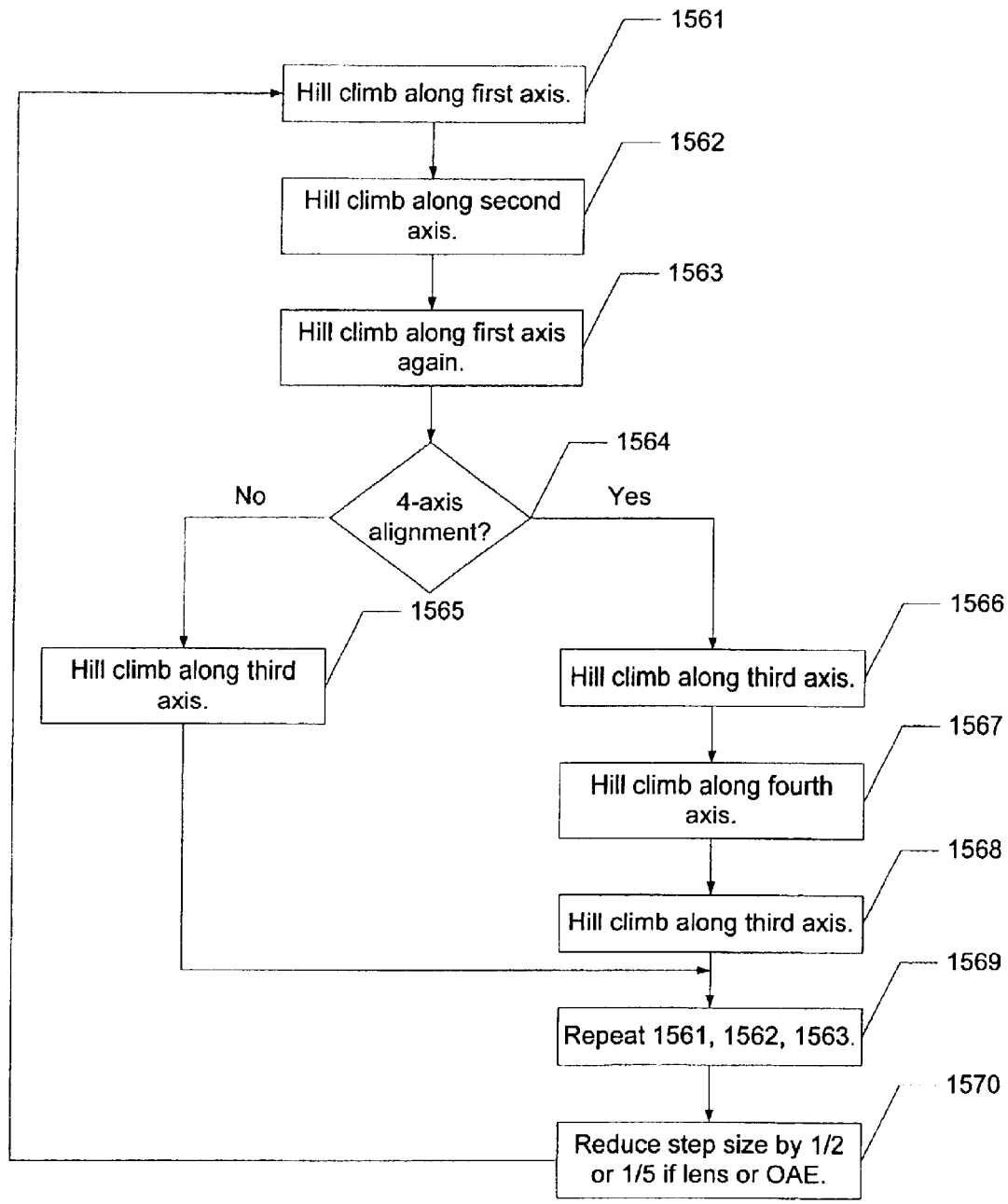
FIG. 15G is a flow chart of an exemplary hill climb alignment method in accordance with an embodiment of the present invention.

FIG. 15G is a flow chart illustrating an exemplary Hill Climb algorithm that may be used in connection with embodiments of the present invention. The axes may be ordered based on the amount of impact movement along the axis has on the beam position (with the first axis having the greatest impact). At steps 1561, 1562 and 1563, a Hill Climb algorithm is performed for the first axis, second axis and then the first axis again. The Hill Climb alignment for each axis determines the position along the axis with the optimum power. This position is then used as the starting position for the Hill Climb alignment along the next axis. Only three axes may be adjusted for alignment of components with limited degrees of freedom, such as a mirror. For these components a Hill Climb algorithm is performed for the third axis at step 1565 and then steps 1561, 1562 and 1563 are repeated (as indicated at step 1569).

Other components, such as an OAE, may use a four axis alignment. If a four axis alignment is to be performed (as indicated at step 1564), the third and fourth axes are aligned using a Hill Climb algorithm as indicated at steps 1566 and 1567. The Hill Climb for the third axis is then performed again at step 1568. Steps 1561, 1562 and 1563 are then repeated (as indicated at step 1569).

At step 1570, the step size is reduced. In one exemplary method, the step size is reduced by one half for components other than lenses or OAEs (such as mirrors and collimators). The step size for alignment of a lens or OAE is reduced by one fifth. The process then iterates based on the "iterations" parameter.

In an exemplary embodiment of a Hill Climb alignment method for an OAE, the first axis is the U axis, the second axis is the V axis, the third axis is the X axis and the fourth axis is the Z axis. The step size for the translational axes (X and Z) is 0.1 mm. The step size for the rotational axes (U and V) is 0.1 degrees. In this embodiment, a single iteration is used and the step size is not reduced. In another embodiment, the initial step sizes are 1 mm and 1 degree and the step sizes are reduced over several iterations.

Figure 15H:
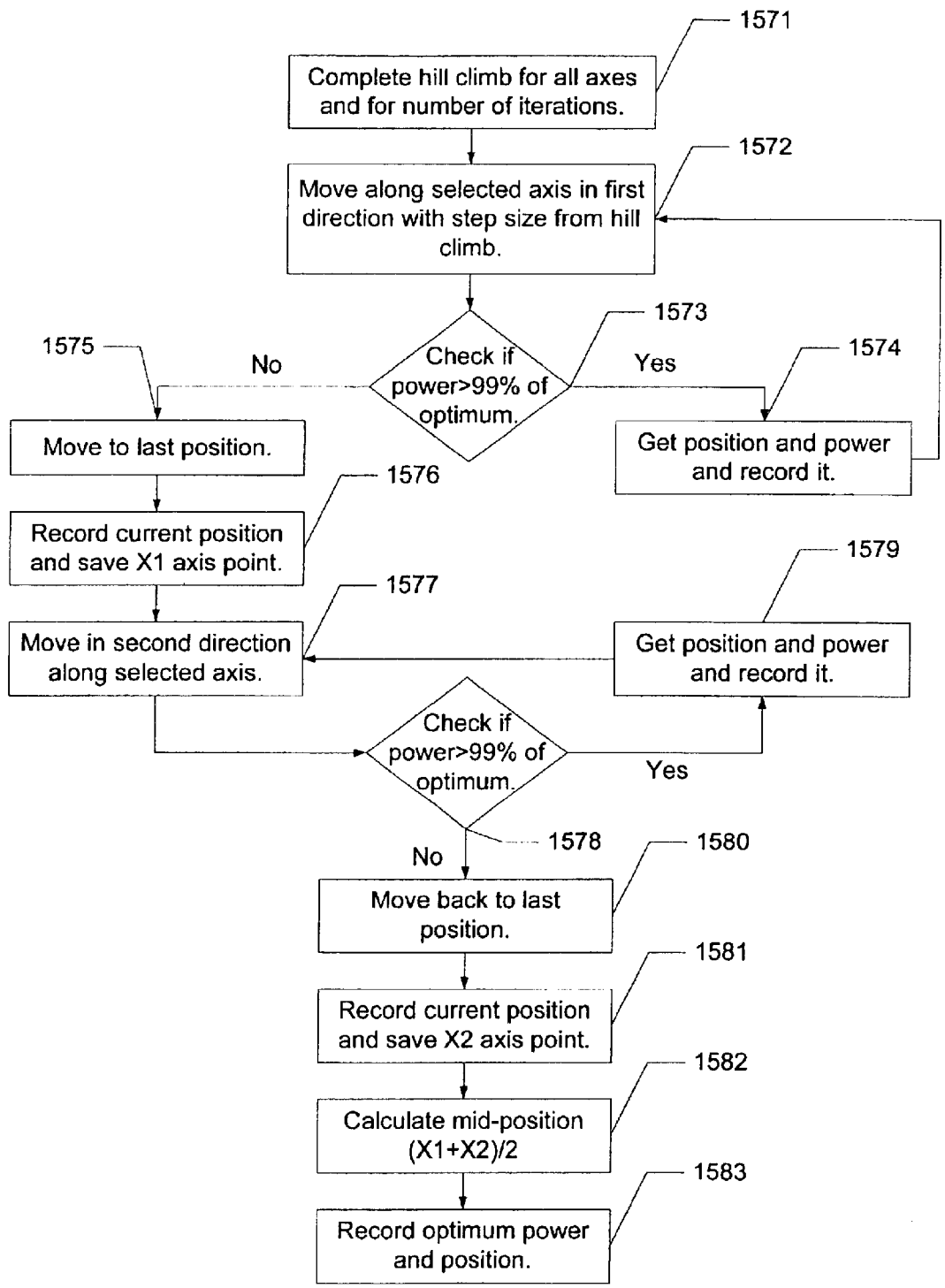
FIG. 15H is a flow chart of an exemplary fine alignment method in accordance with an embodiment of the present invention.

After the above Hill Climb method is performed, a fine alignment may be performed as illustrated in FIG. 15H. While the Hill Climb finds a position with optimal power, the power may drop off much more rapidly by movement in one direction along the axis rather than the other direction. In such cases, it may be desirable to center the alignment point in between points along the axis where the power starts to drop below a desired threshold (such as 99% of the optimum power found using the Hill Climb method). As shown at step 1571 in FIG. 15H, the Hill Climb method is first completed to determine an initial optimum alignment position. At step 1572, the component is then moved in a first direction along the first axis. At step 1573, a check is made to see if the power is still above 99% of the initial optimum. If so, the position is recorded at 1574 and another step is taken along the axis is taken as shown at 1572. This continues until the power drops below 99% of optimum. Once the power drops below 99%, the method moves back to the last position that was above 99% as shown at 1575. This is recorded as an axis point (X1) at step 1576. This marks the last position before the power drops below the 99% threshold due to movements in the first direction along the first axis.

Then, the algorithm steps along the axis in the second direction as shown at 1577 which may be opposite the first direction. A check is made at step 1578 to see if the power remains above 99% of optimum. If so, the position is recorded at 1579 and another step is taken along the axis in the second direction. This is repeated until the power falls below 99% of optimum. Once the power drops below 99%, the method moves back to the last position that was above 99% as shown at 1580. This is recorded as an axis point (X2) at step 1581. This marks the last position before the power drops below the 99% threshold due to movements in the second direction along the first axis. At step 1582, the mid point between X1 and X2 is calculated (i.e., the mid point between the positions along the axis where the power falls below 99% of optimum). This allows for the same alignment error in either direction before the power drops below the threshold. The fine alignment is then repeated for the other axes. The fine alignment repeats in the same manner as the Hill Climb algorithm. The first axis and second axis are aligned and then the first axis is aligned again. For a three axis alignment, the third axis is then aligned and alignment of the first axis, second axis and first axis are then repeated again. For a four axis alignment, the third axis and fourth axis are aligned. Then the third axis is aligned again. Alignment of the first axis, second axis and first axis are then repeated again. The mid-point position determined in each alignment step is used as the starting position for fine alignment along the next axis.

In one embodiment of a fine alignment method, the step size is the same as the final step size used for the Hill Climb method. For instance, the step size may be 0.1 mm for translational axes (X, Y and/or Z) and 0.1 degrees for rotational axes (U, V and/or W). In an exemplary embodiment of a fine alignment method for an OAE, the first axis is the U axis, the second axis is the V axis, the third axis is the X axis and the fourth axis is the Z axis.

For the Raster Scan algorithm, the following three parameters may be specified from the user interface: initial step size, number of scan points, and number of iterations. The "step size" determines the magnitude of motion along each axis. "Scan points" is the parameter that specifies the number of steps the algorithm takes along each axis, which defines the area of scan. The Raster Scanner first does a raster scan using the initial step size and scan points and moves to the position of maximum power. Then it may optionally reduce the step size by half or some other desired amount and repeat the raster scan using the new step size and the original scan points over the square area centered at the position of maximum power. The process is repeated as many times as indicated by a parameter referred to as "iterations".

For the Spiral Scan algorithm, the following three parameters may be specified from the user interface: initial spiral radius, angle separation, number of scan points, and number of iterations. The "spiral radius" determines the magnitude of the radius for the spiral function. The "angle separation" determines the increment of angle from one scan point to the next. "Scan points" is the parameter that specifies the number of steps the algorithm takes along the spiral curve. The "angle separation" and "scan points" together define the area of scan. The Spiral Scanner will first do a spiral scan using the initial step size and scan points and move to the position of maximum power. Then it may optionally reduce the step size by half or some other desired amount and repeat the spiral scan using the new step size and the original scan points over the circular area centered at the position of maximum power. The angle separation remains the same for each iteration. The process is repeated as many times as indicated by a parameter referred to as "iterations".

After 2-dimensional auto alignment is done at one position along Z-axis, the Z-axis is single stepped followed by another run of 2-dimensional auto alignment to maximize the optical power. Both directions in Z-axis will be checked to determine the direction of further movement along Z-axis. This is repeated until power would not maximized by any further movement along the Z-axis. The following two parameters may be specified from the user interface for Z-axis movement: initial step size and number of iterations. The "step size" determines the magnitude of motion along Z-axis. "Iterations" is the number of iterations to be repeated for Z-axis alignment described above. The step size will be reduced by half for each iteration.

In an exemplary spiral search, the step size is 0.1 mm for movement along the X, Y and Z axes. The X and Y axes are each stepped 25 times in a spiral fashion for a given plane along the Z axis. The Z axis is then stepped and the process is repeated. The process is continued for the desired number of iterations along the Z axis. In this exemplary embodiment, only one iteration is performed and the step size is not reduced. In another exemplary embodiment, the initial step size is 1 mm and is reduced over several iterations. In another exemplary embodiment, the U, V and/or W axes may be stepped angularly with a step size of 0.1 degrees or other desired step size.

A surface fitting approach may also be used. Emerging light coming out of the optical components 1558 form a surface with a particular area in the surface having maximum intensity. The surface fitting approach first does a spiral scan search to collect all the points traversed to find the threshold light area. The collected point are fit into a surface with the generic equation as follows: $Z=f(X,Y)$ where Z axis co-ordinates are function of X (coordinates in x-axis) and Y (coordinates in y-axis). The function can be polynomial. Once the function has been obtained by doing surface fitting, the maxima for the surface can be obtained by applying the maxima-minina theorem on the function and by obtaining the first and second partial derivative.

Figure 16A:
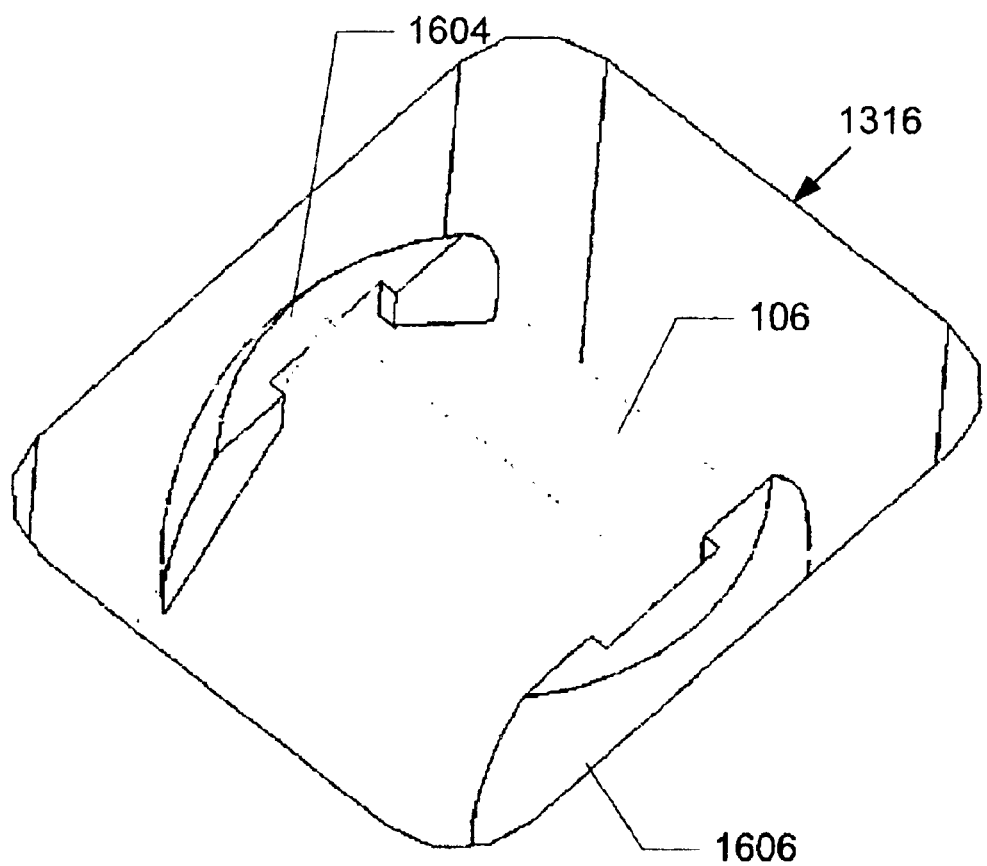
FIGS. 16A–16C illustrate an isometric, side, and top views, respectively, of a system for allowing the adjustment of the OAE and coupling to the chassis for the device.
Figure 16A:
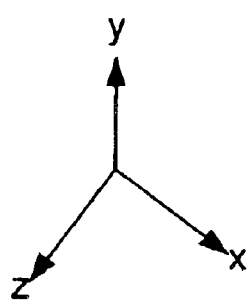
Figure 16B:
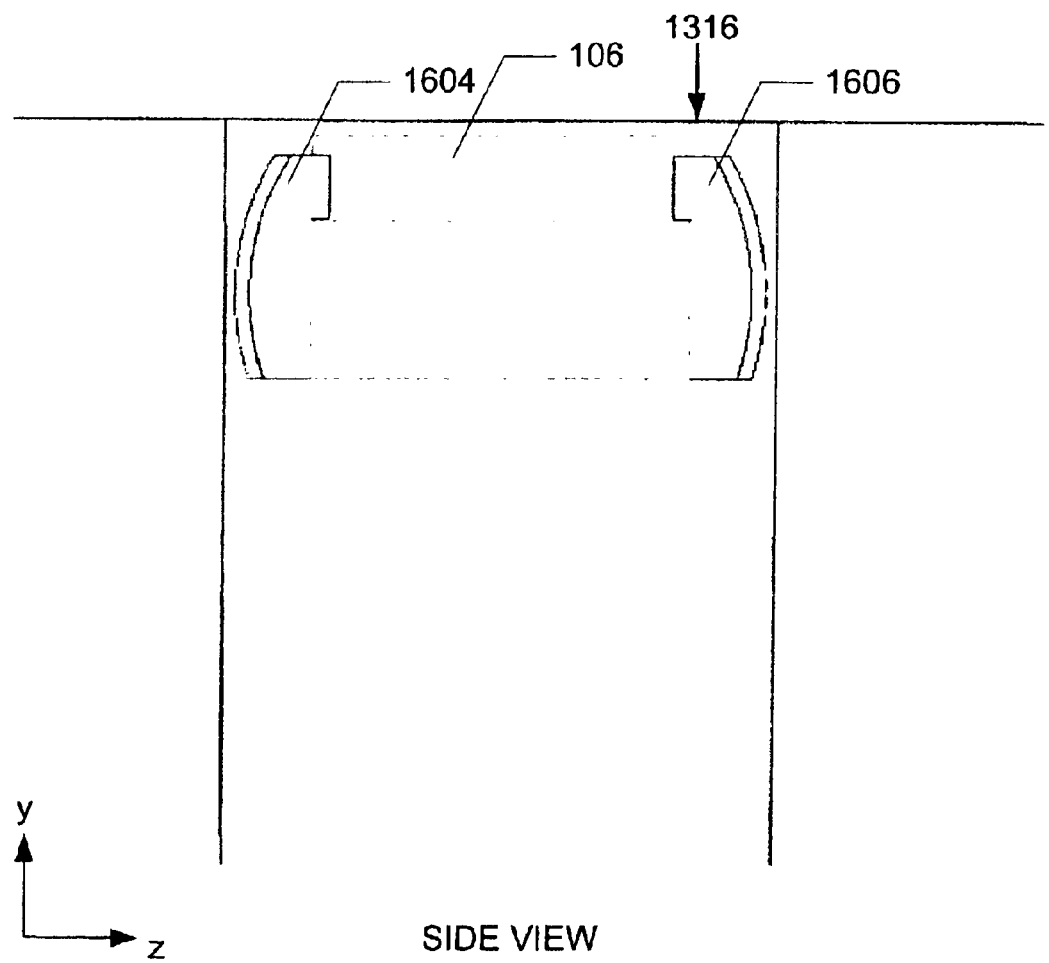
Figure 16C:
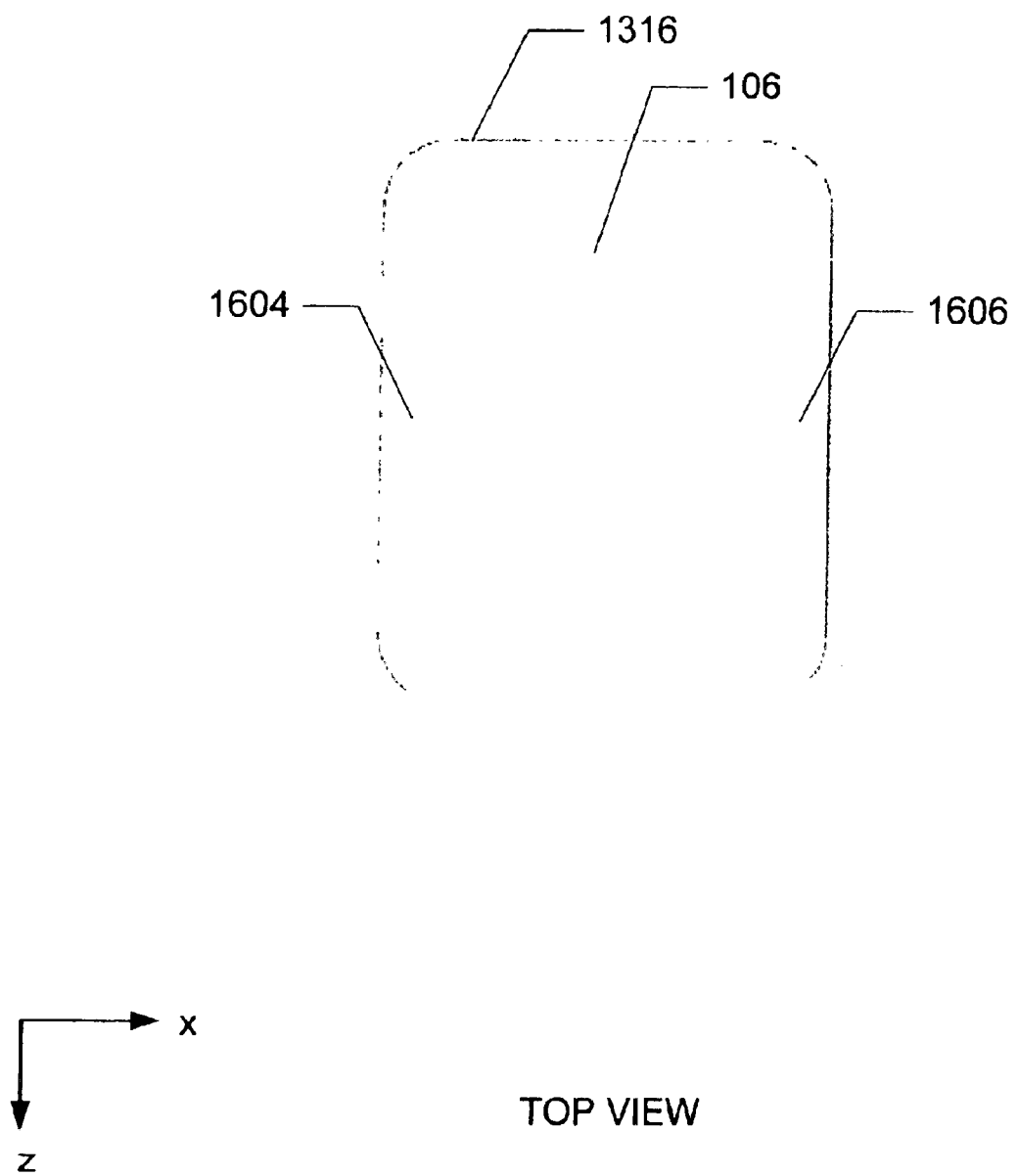

FIGS. 16A–16C illustrate an isometric, side, and top views, respectively, of yet another embodiment of a system for allowing adjustment of OAE and coupling to the chassis. The system may be used to adjust the OAE in the alignment system described above. In this system, the OAE 106 is held by two partially spherical parts 1604 and 1606. The partially spherical parts 1604 and 1606 abut against the chassis 1300 within the hole 1316 at the curved surfaces of the partial spheres. The partially spherical shapes of the parts 1604 and 1606 allow the OAE 106 to be rotated and translated during the alignment process. Once alignment is achieved, the OAE 106 is coupled to the parts 1604 and 1606, and the parts 1604 and 1606 are coupled to the chassis 1300. Alternatively parts 1604 and 1606 can be coupled to the OAE prior to alignment of the OAE 106.

FIGS. 17A–17D illustrate a top, top isometric, top cross-sectional, and side cross-sectional views, respectively, still another embodiment of a system for allowing adjustment of an OAE and coupling to the chassis. The system may be used to adjust the OAE in the alignment system described above. In this system, the OAE 106 abuts against a partially spherical part 1704, which abuts against the chassis 1300 within the hole 1316. The OAE 106 may be made to abut the partially spherical part 1704 by another part such as a spring (not shown). The partially spherical part 1704 allows the OAE 106 to be rotated and translated during the alignment process. Once alignment is achieved, the spherical part 1704 is coupled to the chassis 1300, and the OAE 106 is coupled to the spherical part 1704. Alternatively spherical part 1704 can be coupled to the OAE prior to alignment of the OAE 106.

Figure 17A:
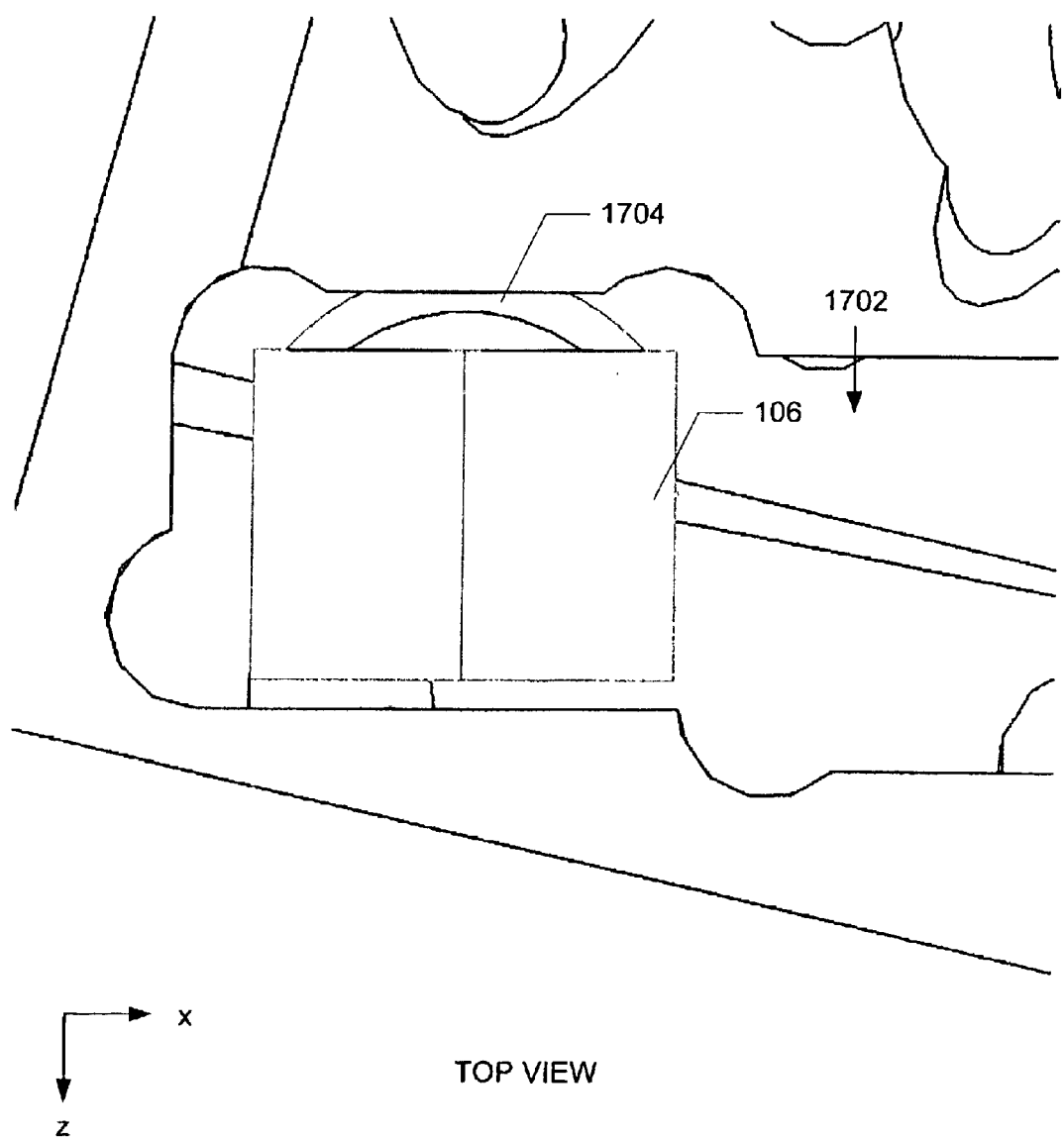
FIGS. 17A–17D illustrate a top, top isometric, top cross-sectional, and side cross-sectional views, respectively, of another system for allowing the adjustment of the OAE and coupling to the chassis for the device.
Figure 17B:
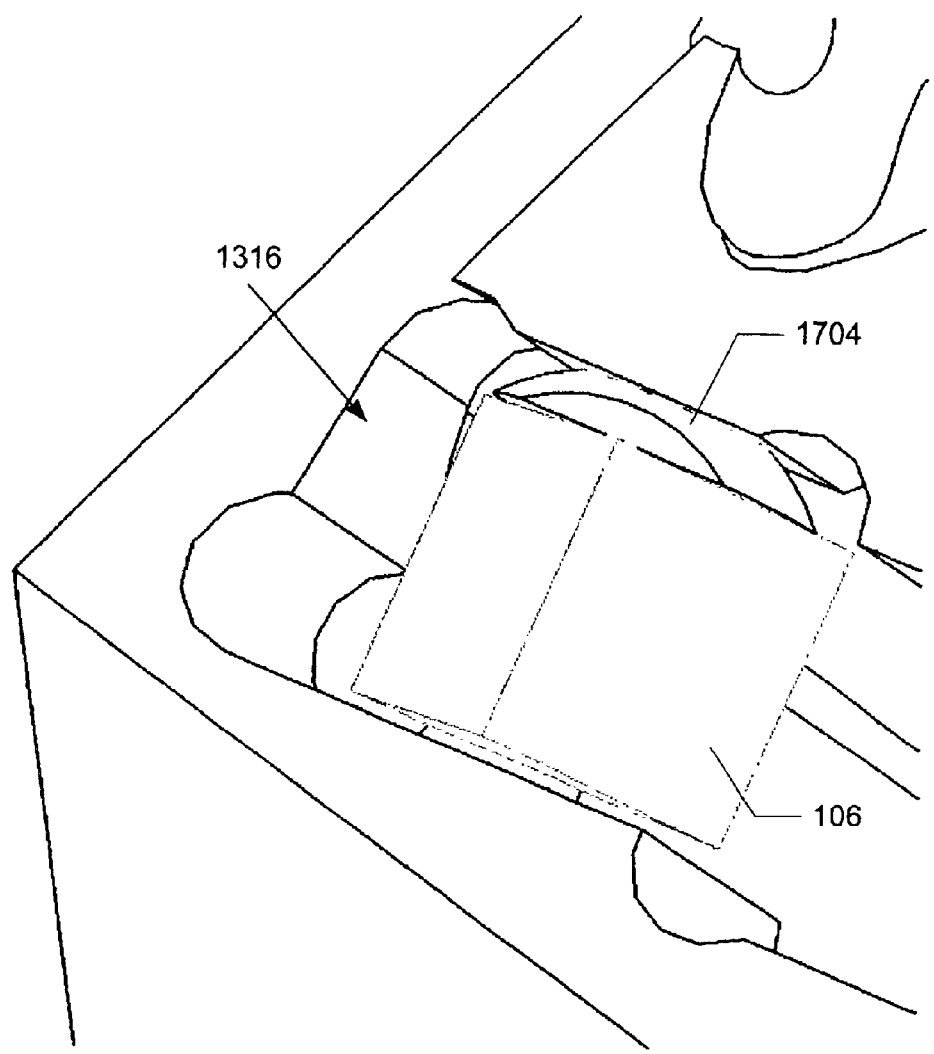
Figure 17B:
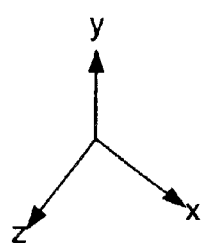
Figure 17C:
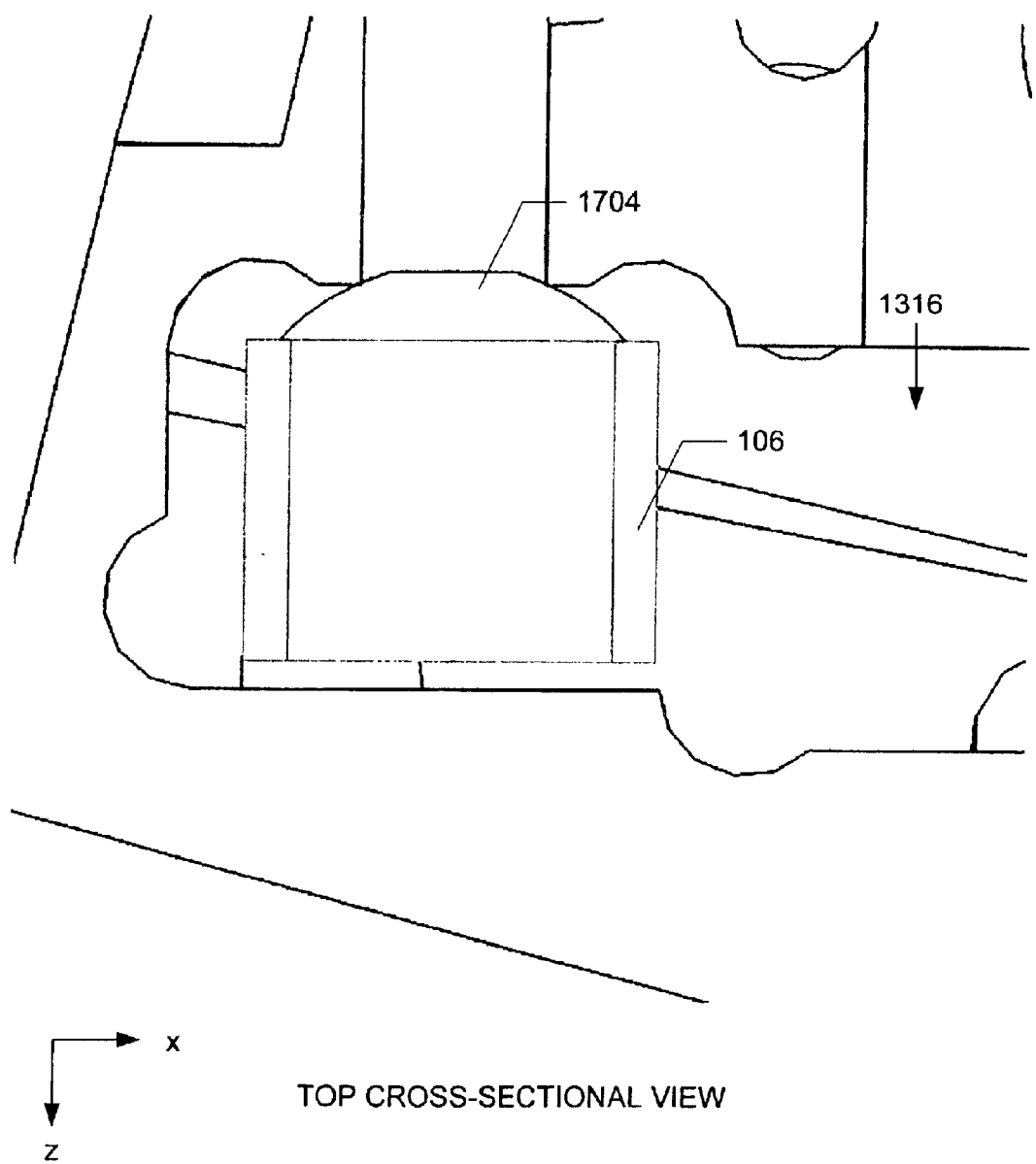
Figure 17D:
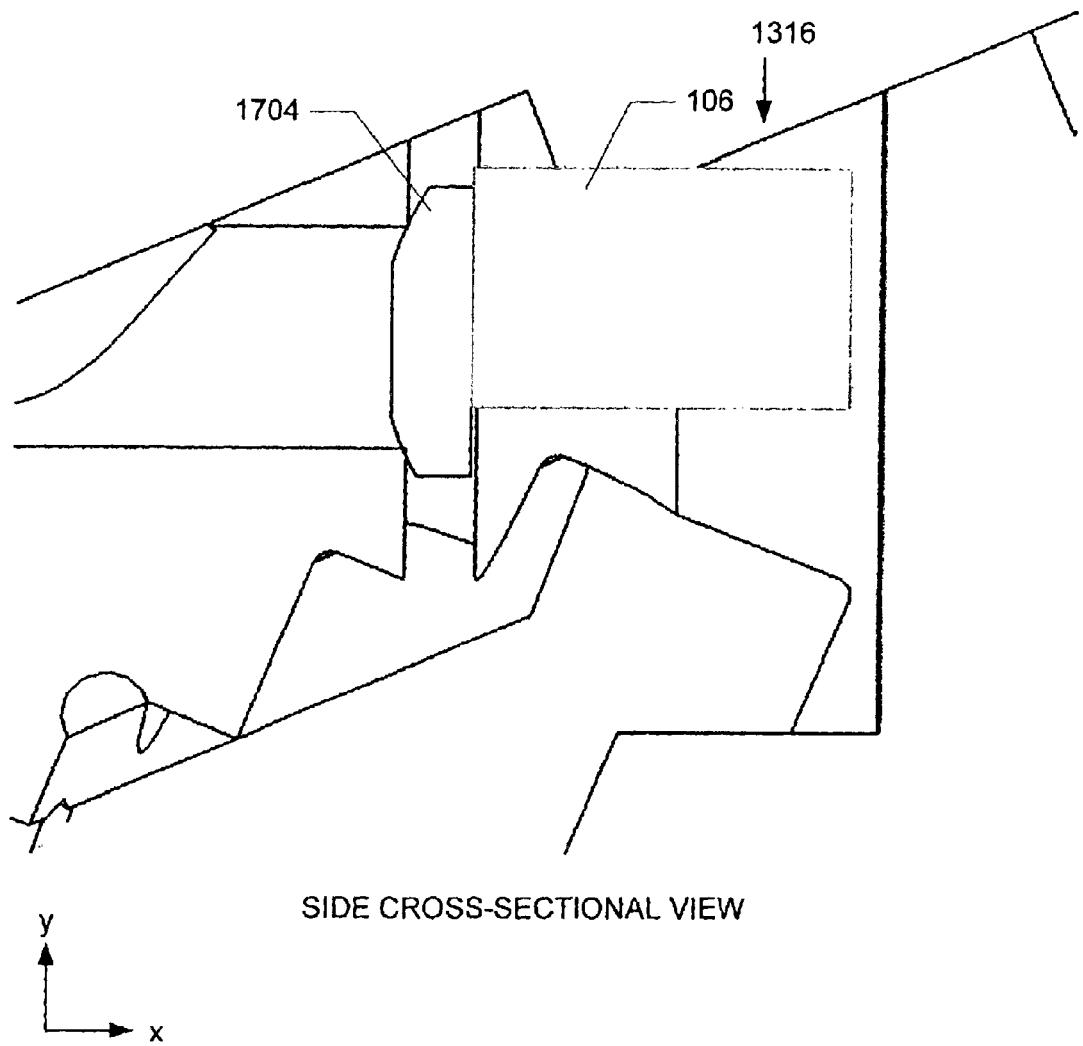
Figure 17E:
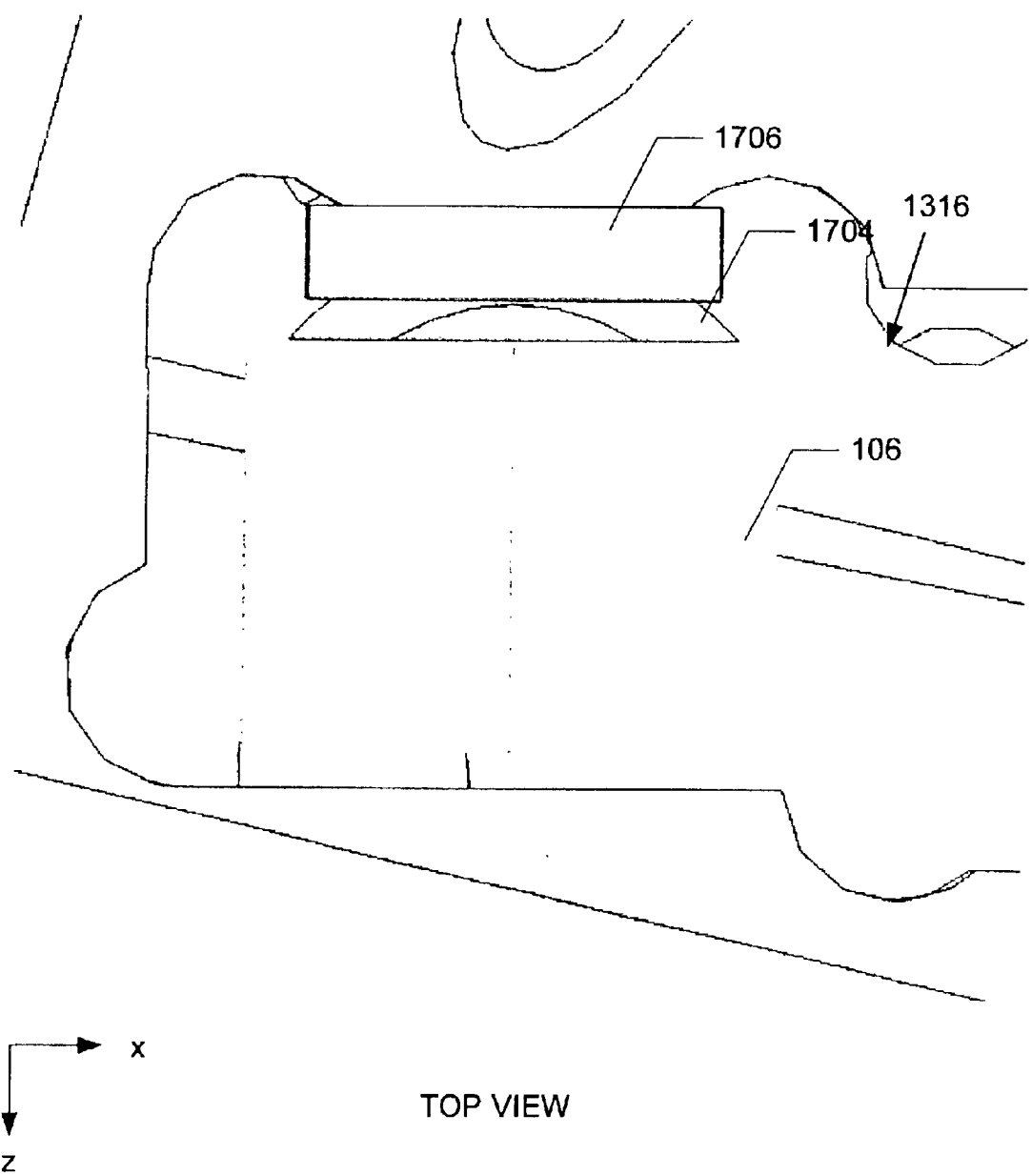
FIGS. 17E–17F illustrate a top and side cross-sectional view, respectively, of yet another system for allowing the adjustment of the OAE and coupling to the chassis for the device.
Figure 17F:
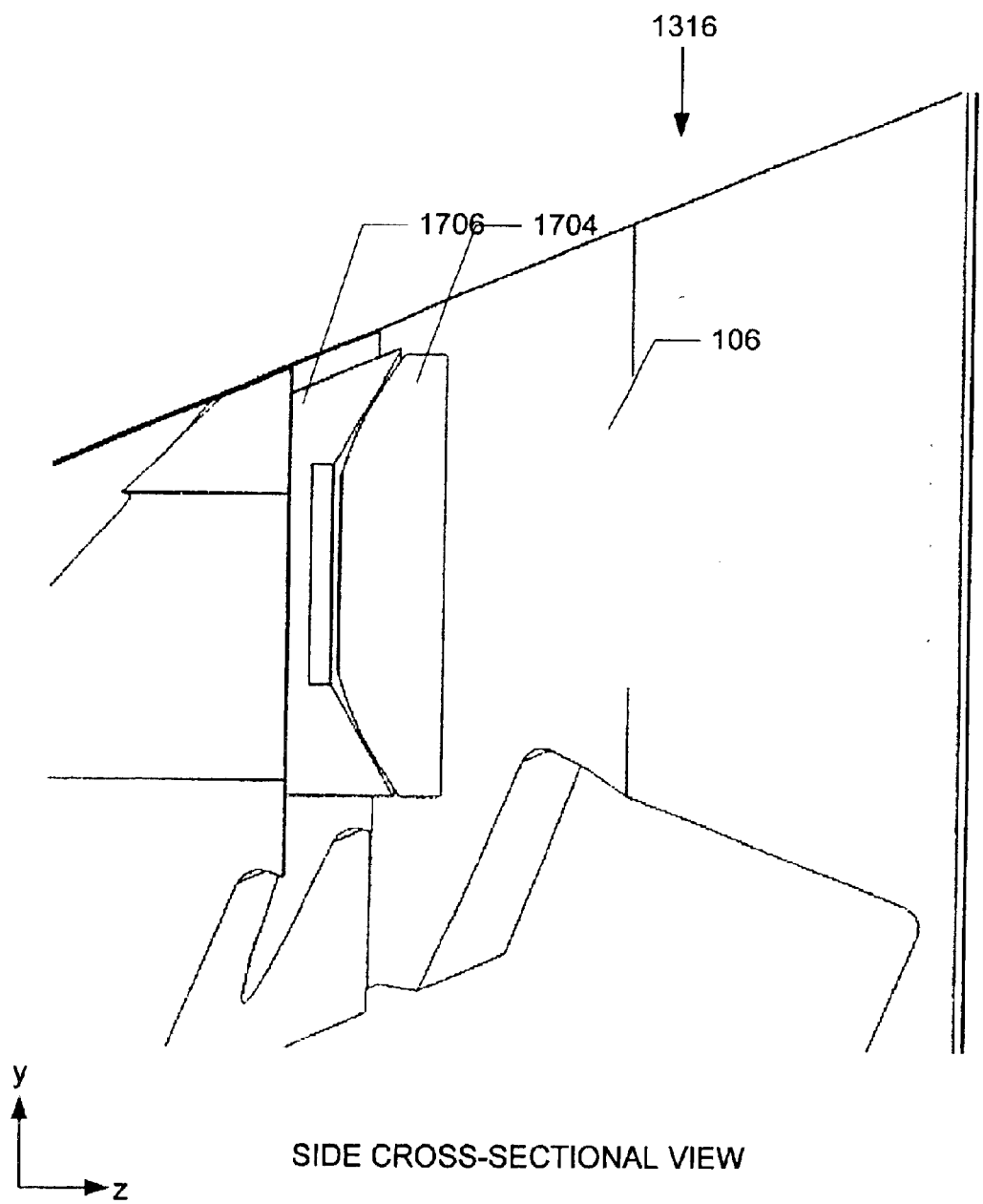

FIGS. 17E–17F illustrate a top and side cross-sectional view, respectively, of another embodiment of a system for allowing adjustment of an OAE and coupling to a chassis. The system may be used to adjust the OAE in the alignment system described above. In this system, a metal plate 1706 abuts against the chassis 1300 within the hole 1316. The OAE 106 is coupled to the partially spherical part 1704. The plate 1706 and/or part 1704 are coated with a magnetizable material, such as gold, or be composed of magnetizable material. The part 1704 is then held against the metal plate 1706 by a magnet (not shown). The OAE 106 can then be rotated and translated during the alignment process. Once alignment is achieved, the partially spherical part 1704 is coupled to the metal plate 1706.

Figure 17G:
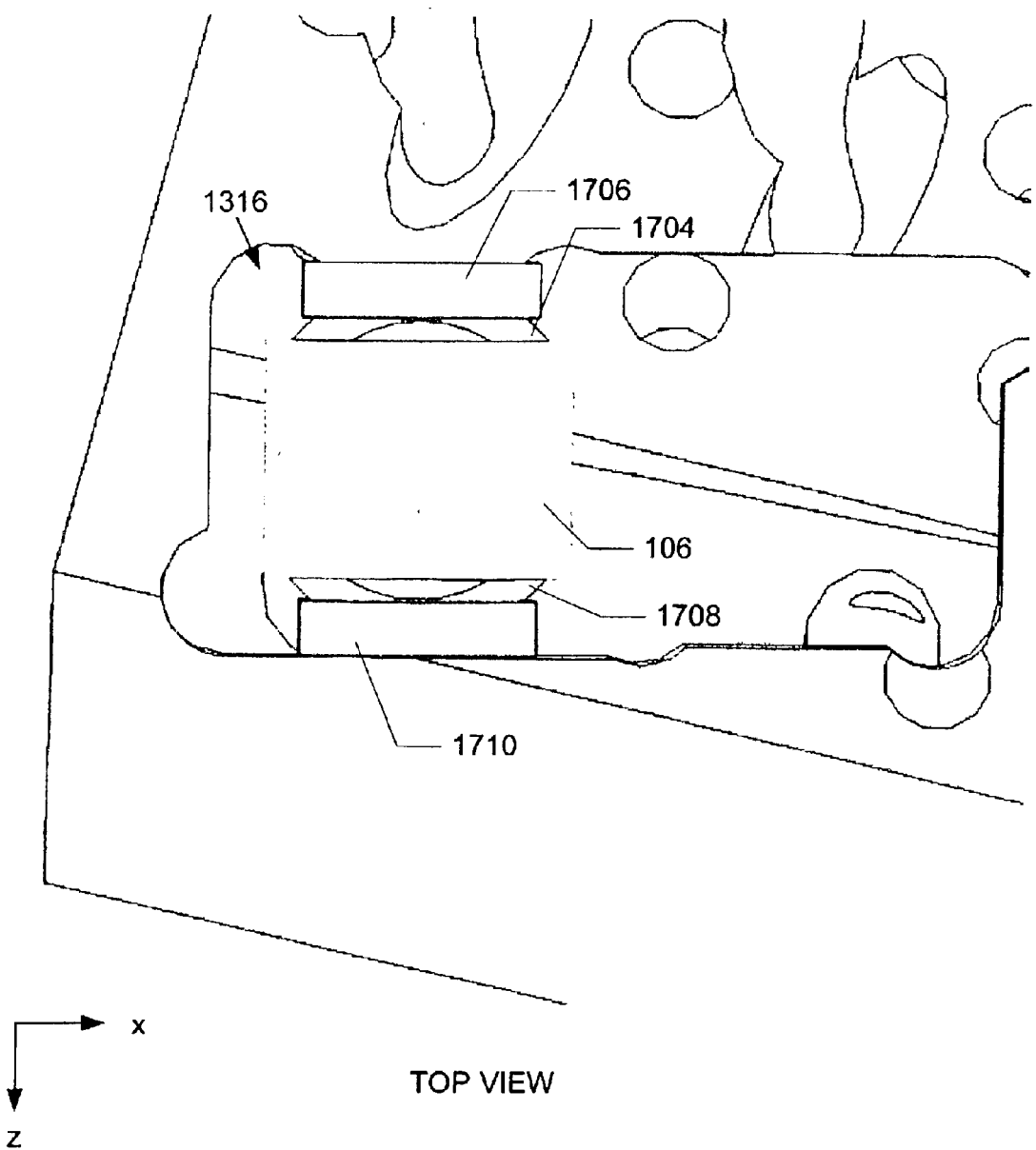
FIGS. 17G–17H illustrate a top and side cross-sectional view, respectively, of yet another system for allowing the adjustment of the OAE and coupling to the chassis for the device.
Figure 17H:
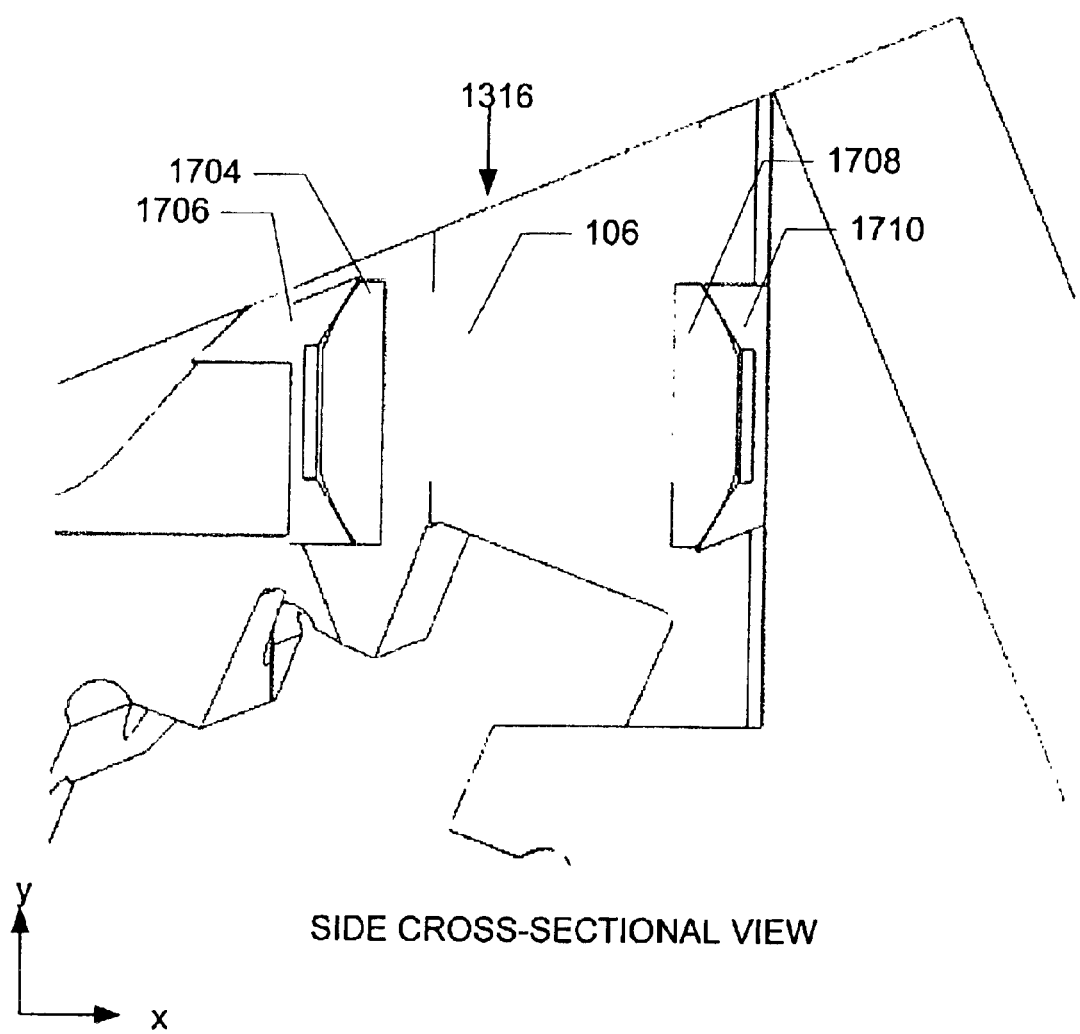

FIGS. 17G–17H illustrate a top and side cross-sectional view, respectively, of still another embodiment of a system for allowing adjustment of an OAE and coupling to a chassis. The system may be used to adjust the OAE in the alignment system described above. In this system, two metal plates 1706 and 1710 abut against the chassis 1300 within the hole 1316. The OAE 106 is coupled to two partially spherical parts 1704 and 1708. The two parts 1704 and 1708 are then held against the metal plates 1706 and 1710 by a magnet (not shown), as described above with FIGS. 17E and 17F, or by interference. The OAE 106 can then be rotated and translated during the alignment process. Once alignment is achieved, the partially spherical parts 1704 and 1708 are coupled to the metal plates 1706 and 1710, respectively.

Figure 18A:
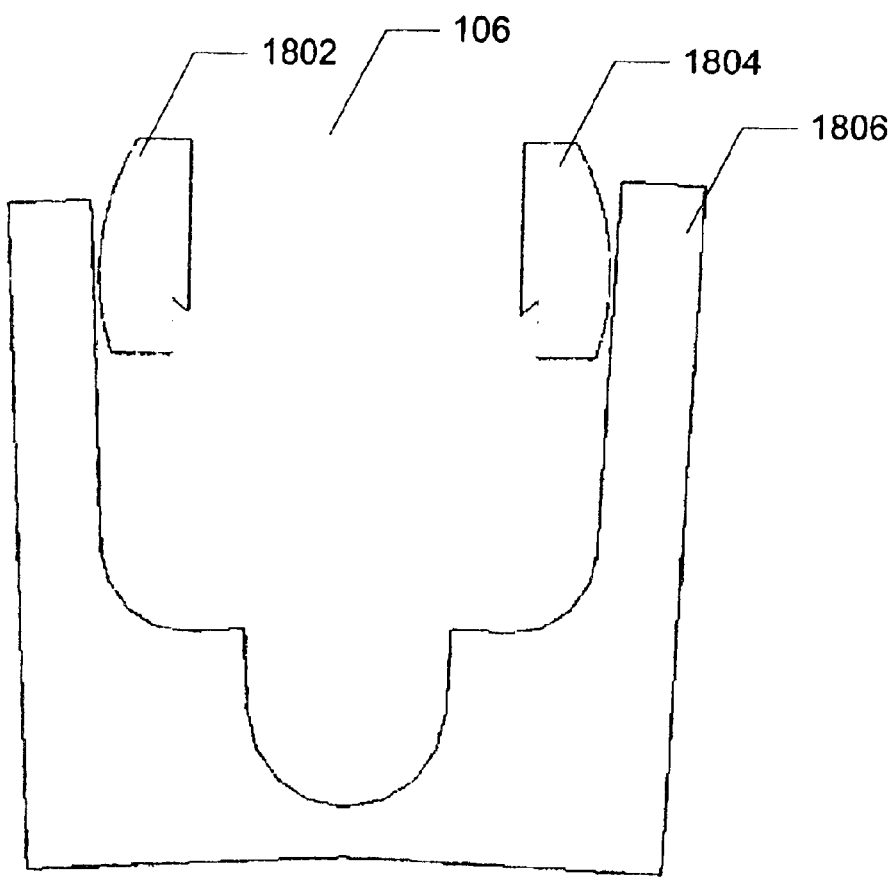
FIGS. 18A–18B illustrate side views of yet another system for allowing the adjustment of the OAE and coupling to the chassis for the device.
Figure 18B:
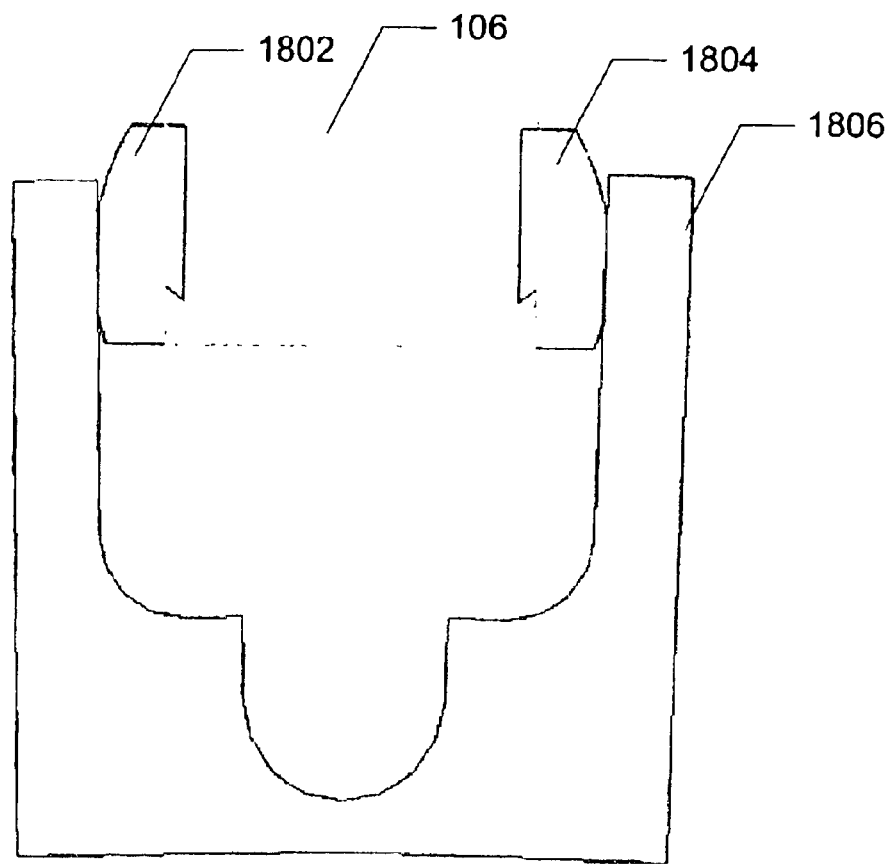

FIGS. 18A–18B illustrate side views of yet another embodiment of a system for allowing adjustment of an OAE and coupling to a chassis. The system may be used to adjust the OAE in the alignment system described above. In this system, the OAE 106 is coupled to two partially spherical parts 1802 and 1804. The OAE 106 is then rotated and translated during the alignment process. During alignment, a two-pronged spring 1806 is held open so that the parts 1802 and 1804 are unclamped. (FIG. 18A) Once alignment is achieved, the spring 1806, which is coupled to or formed from the chassis 1300 with the chassis hole 1306, is released to clamp the parts 1802 and 1804, and the OAE 106. (FIG. 18B)

In other embodiments, the optical components 108a–108d include but are not limited to one or more, or a combination of a fiber or fiber collimator laser, a TO-38 laser package, a TO-56 laser package, a laser can package, a detector, a TO-42 detector package, a TO-56 detector package, a waveguide input or output from or to another embodiment of the device or any other optical system or subsystem. The device comprises light sources, such as lasers, as the optical components 108a–108d.

Figure 18C:
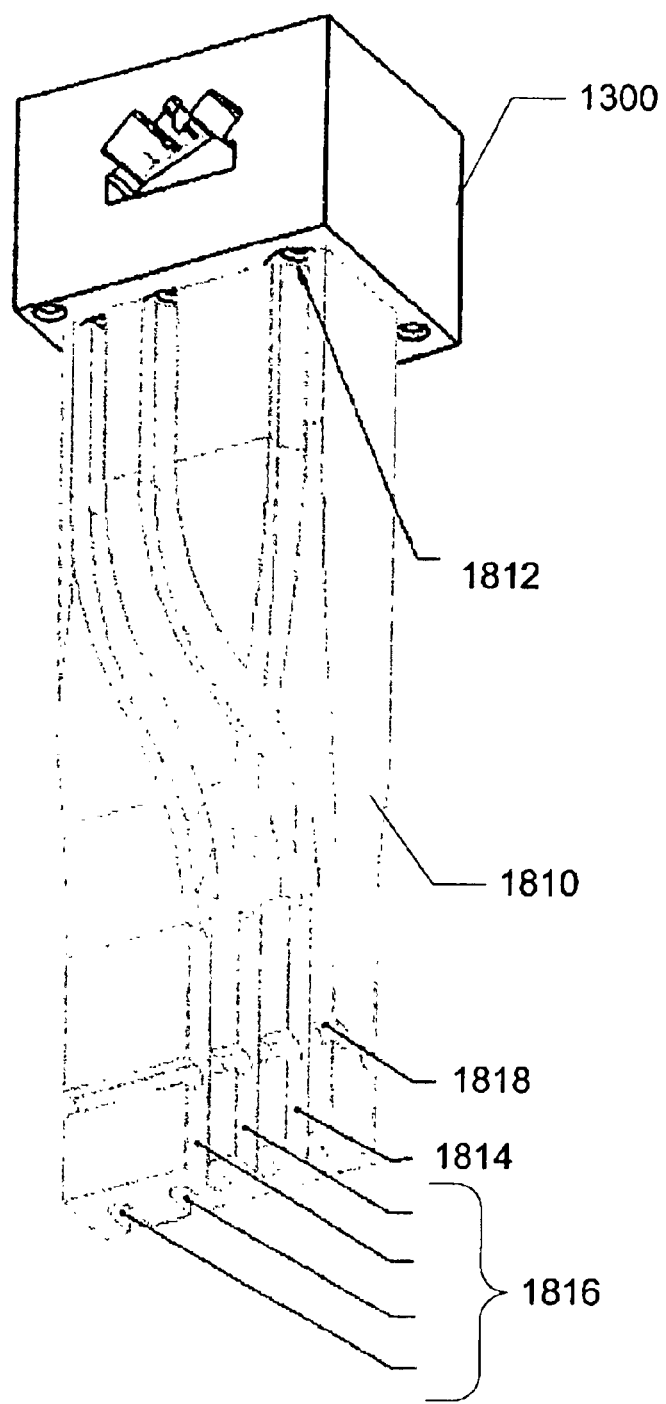
FIG. 18C illustrates an embodiment of the device with fiber support.

FIG. 18C illustrates an embodiment of the device with a fiber support. The components 108a–108d are each optically coupled to an optical fiber (not shown), typically via a lens (not shown). The connection point 1812 between the lens and the fiber may be subject to strains due to the handling of the fibers. To reduce this strain, a fiber support 1810 is coupled to the chassis 1300. The support 1810 holds the fibers rigidly with respect to the chassis 1300. The support 1810 comprises a groove 1814 for the input/output fiber and grooves 1816 for the fibers output/input channel fibers. The support 1810 routes the fibers into an appropriate order at the exit of the module 150 (See FIG. 1). The fibers are held in place by a clip (not shown) that resides within a fiber clip slot 1818.

In addition to reducing strain at the fiber/lens joint, the fiber support 1810 uses a reasonable bend radius in routing the fibers, is easy to assemble, allows for the snapping of the fibers into the grooves 1814 and 1816, and allows for a small overall package while allowing a significant straight length of fiber exiting the device.

The use of OAEs, different core configurations and folded beam paths may be used in alternate embodiments of a multiplexing device or demultiplexing device to allow advantageous positioning of active and passive elements in the devices. In addition, in some embodiments, the beams between the components are transmitted in free space (instead of using a fiber or optical guide) which allows a compact design to be used for a wide variety of configurations. For example, it may be desirable to use active light sources (for a multiplexer device) or output elements (for a demultiplexer device) that have electrical leads which need to be mounted on a printed circuit board or other surface or interface. It is desirable in some embodiments to configure the active elements so all of the leads exit the frame in the same direction (such as out of the bottom of the device). This facilitates mounting the electrical leads of the active devices. An active output element for the a composite multiplexed beam (for a multiplexer device) or active input element (for a demultiplexer device) may be configured in the same direction. If the output element for the a composite multiplexed beam (for a multiplexer device) or the input element (for a demultiplexer device) is passive (such as an optical fiber), it may be desirable to have the elements exit the frame out of the sides perpendicular to the active leads. The folded beam paths, cores and OAEs may be used to position the various elements so that electrical leads, inputs and outputs can pass through any desired side of the device as required for the particular application. The additional embodiments described below illustrate alternative configurations, including configurations with active leads aligned with the bottom of the device and an output or input optical fiber interfacing through a perpendicular side of the device.

Figure 19A:
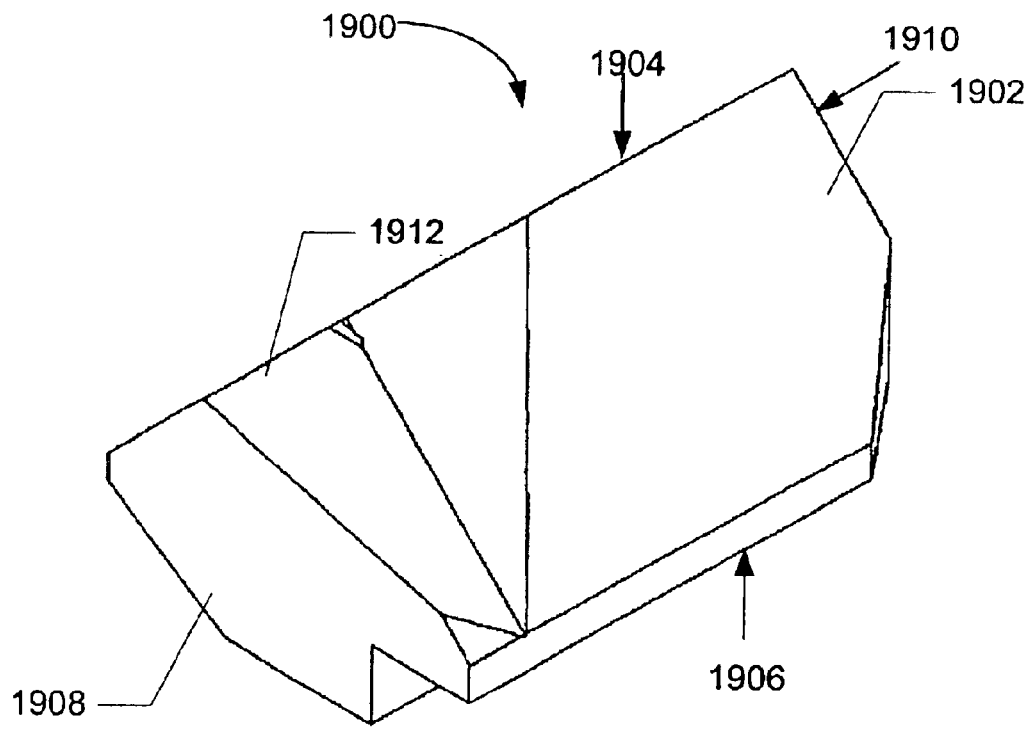
FIGS. 19A–19C illustrate a top isometric, bottom isometric, and top views, respectively, of yet another embodiment of a core for a device.
Figure 19A:
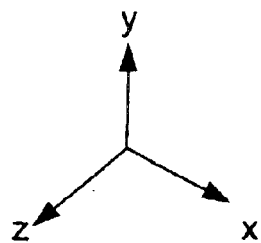
Figure 19B:
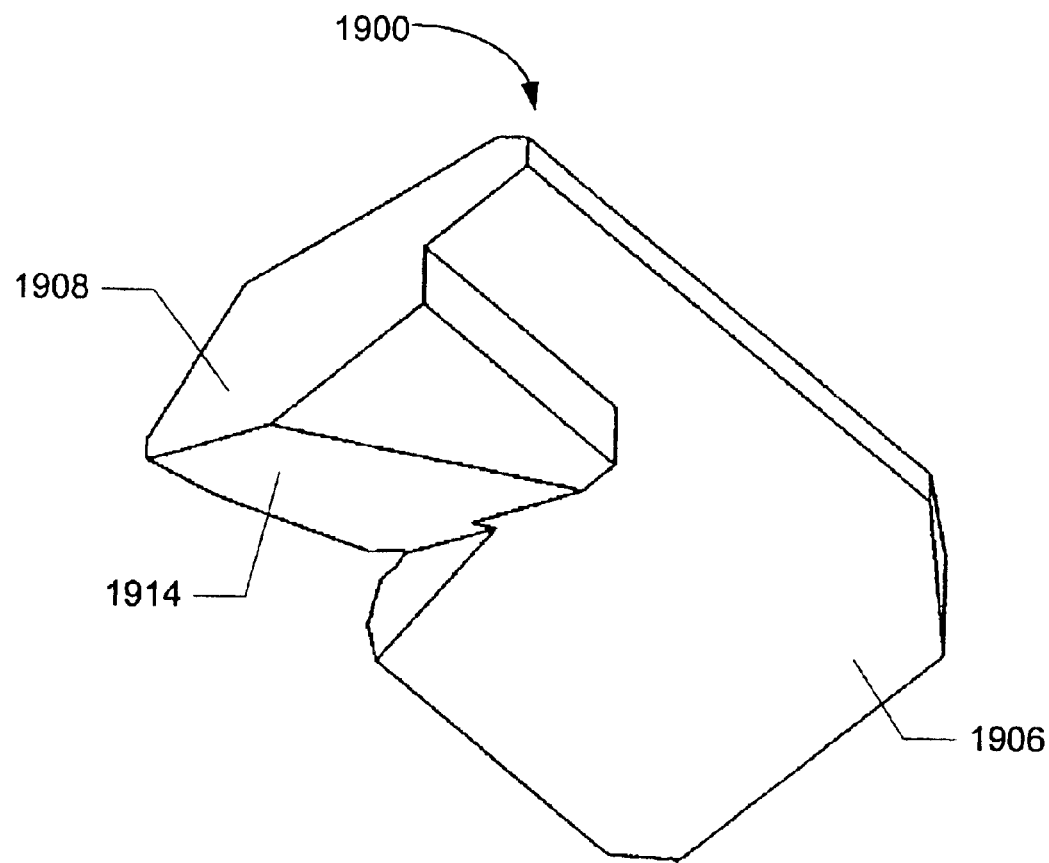
Figure 19B:
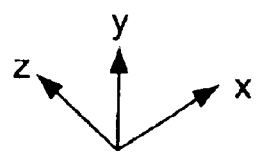
Figure 19C:
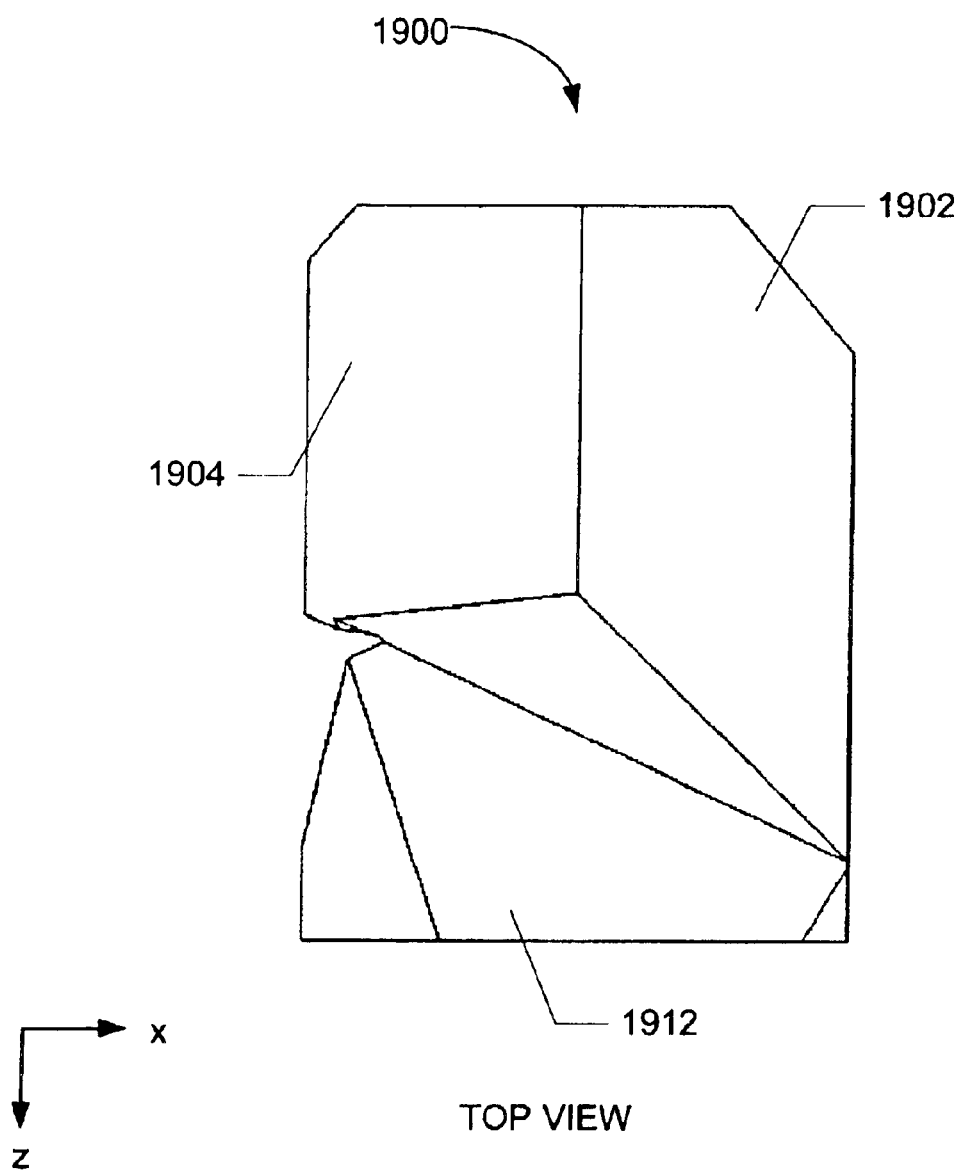
Figure 20A:
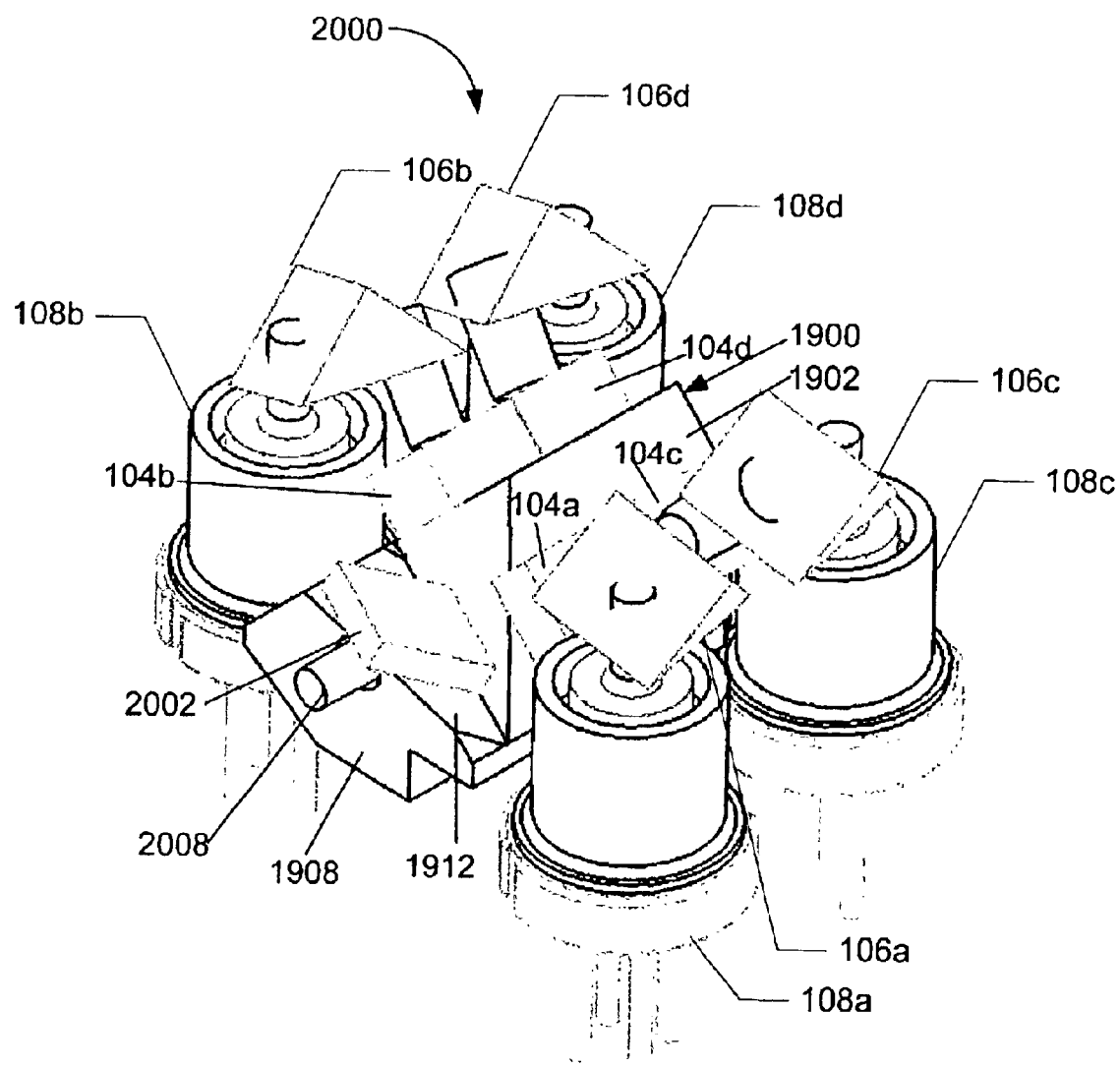
FIGS. 20A–20E illustrate a top isometric, bottom isometric, top, front, and side views, respectively, of an embodiment of the device with yet another embodiment of the core.
Figure 20A:
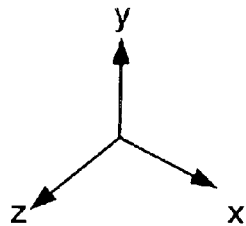
Figure 20B:
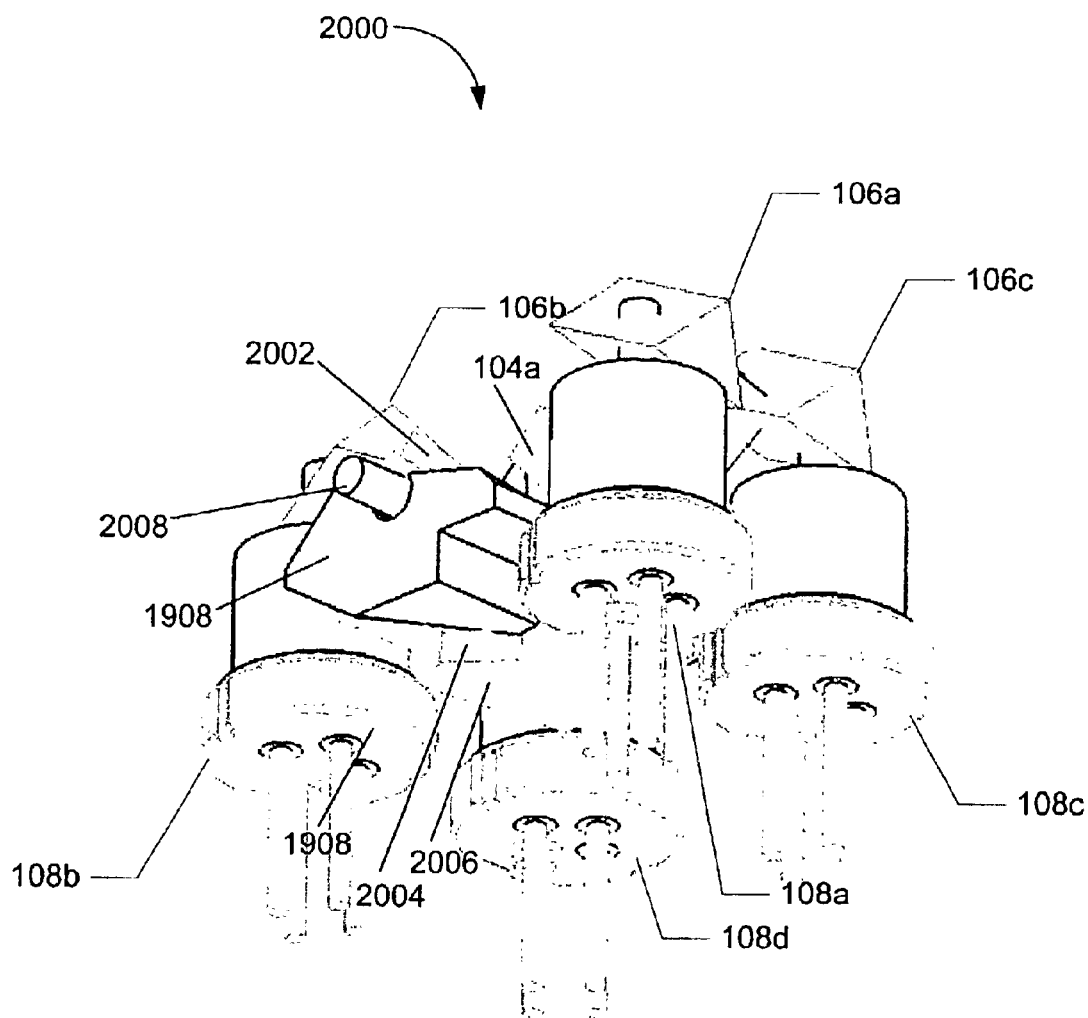
Figure 20C:
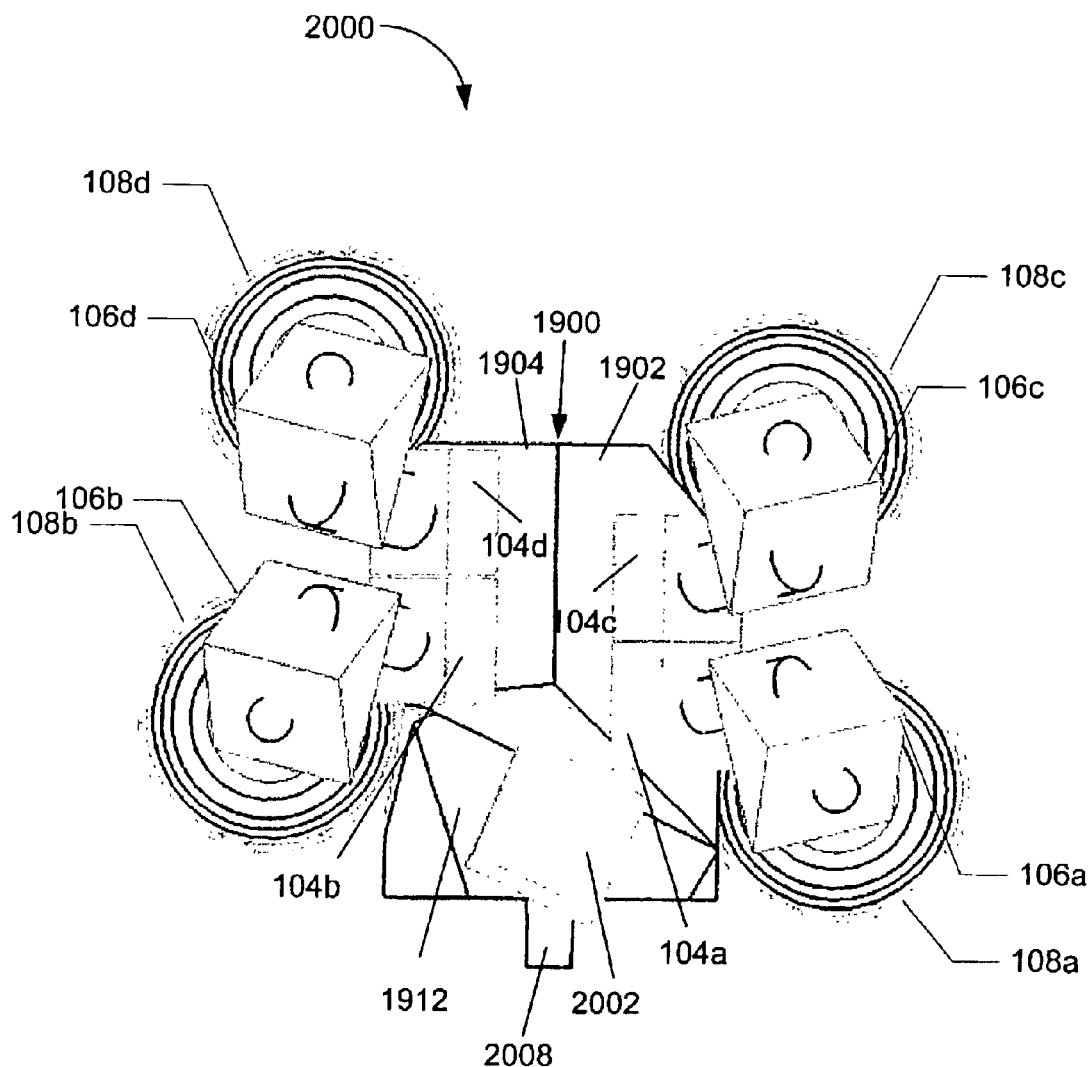
Figure 20D:
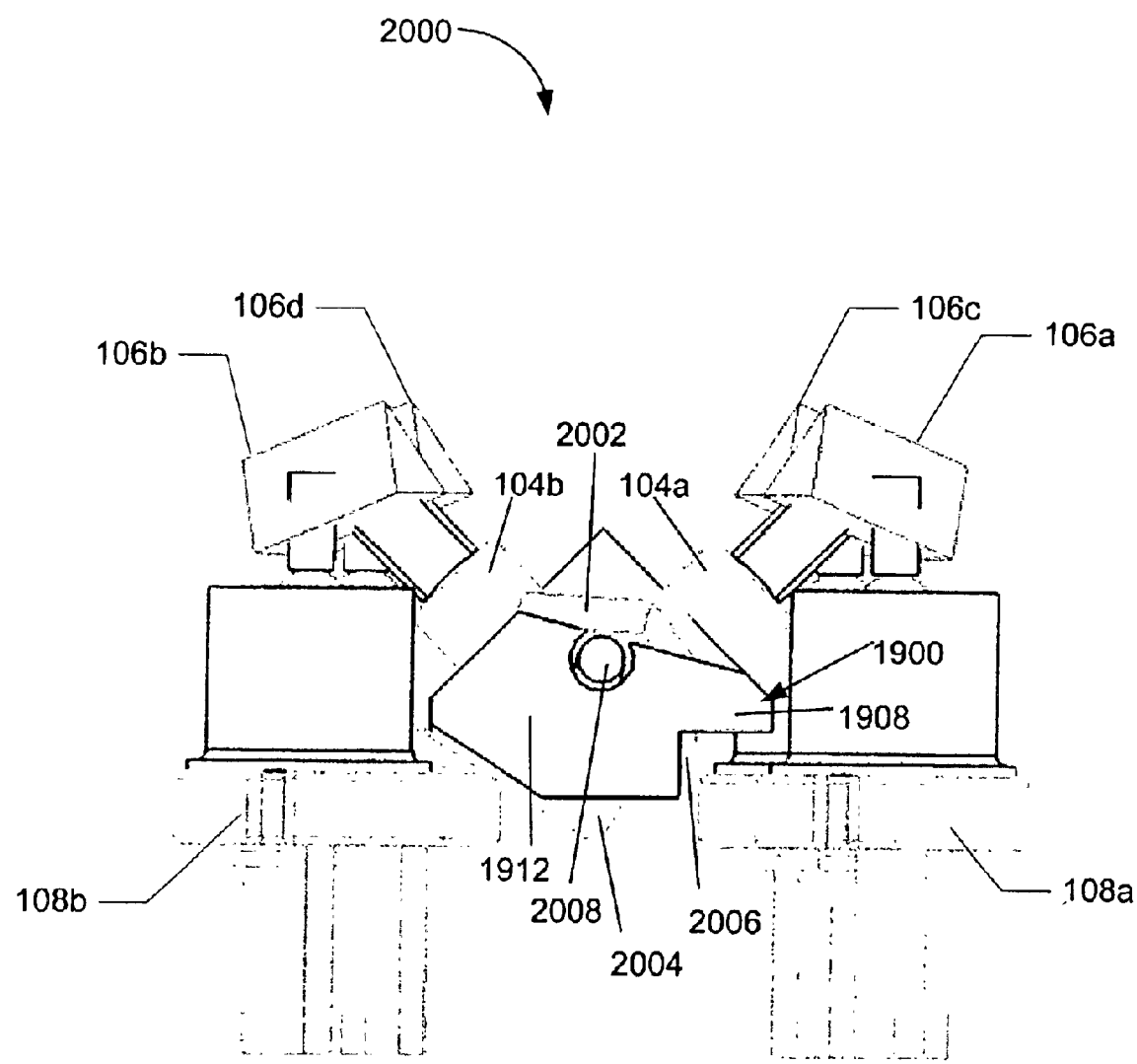
Figure 20D:
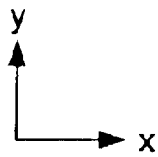
Figure 20E:
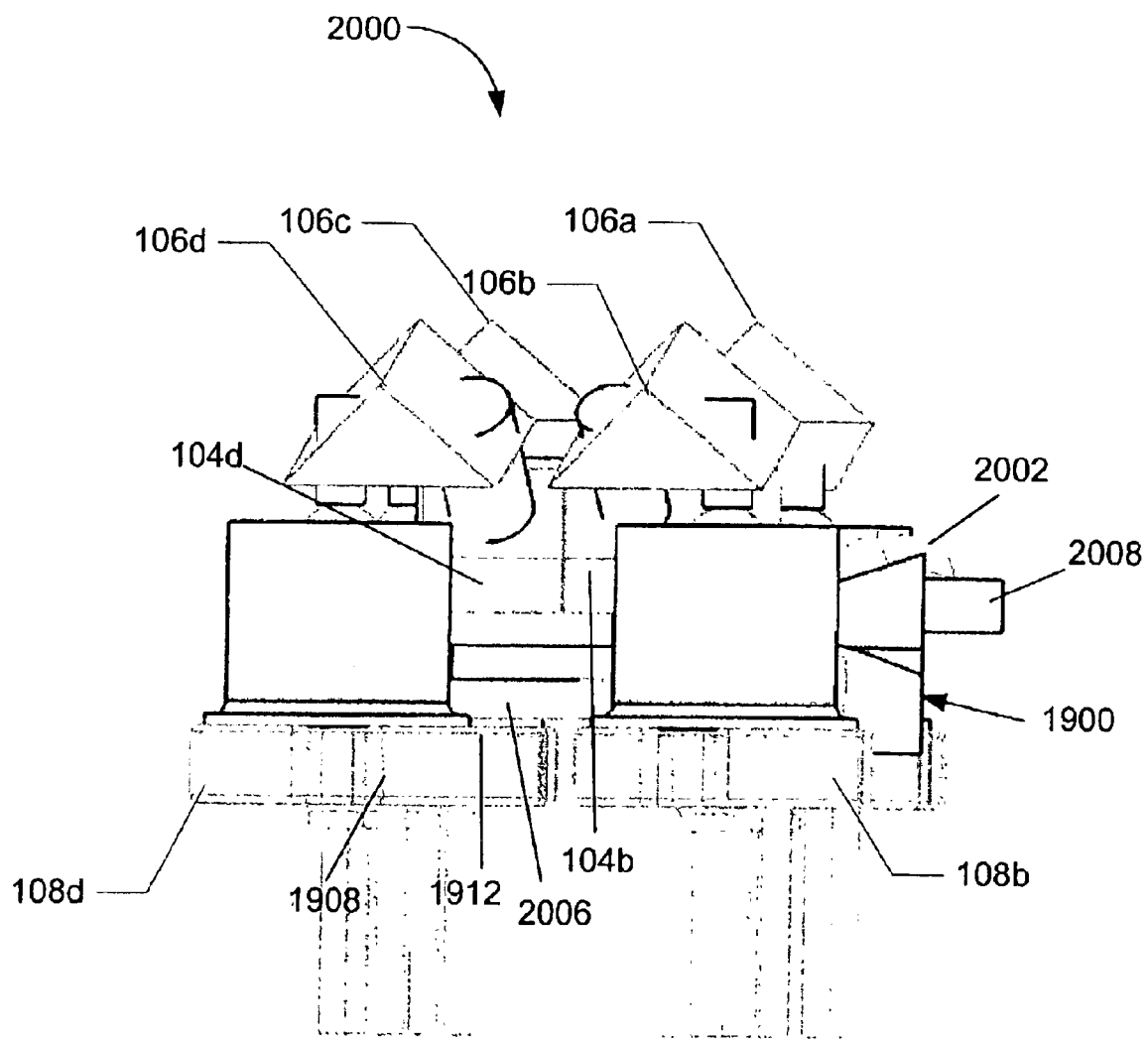
Figure 21A:
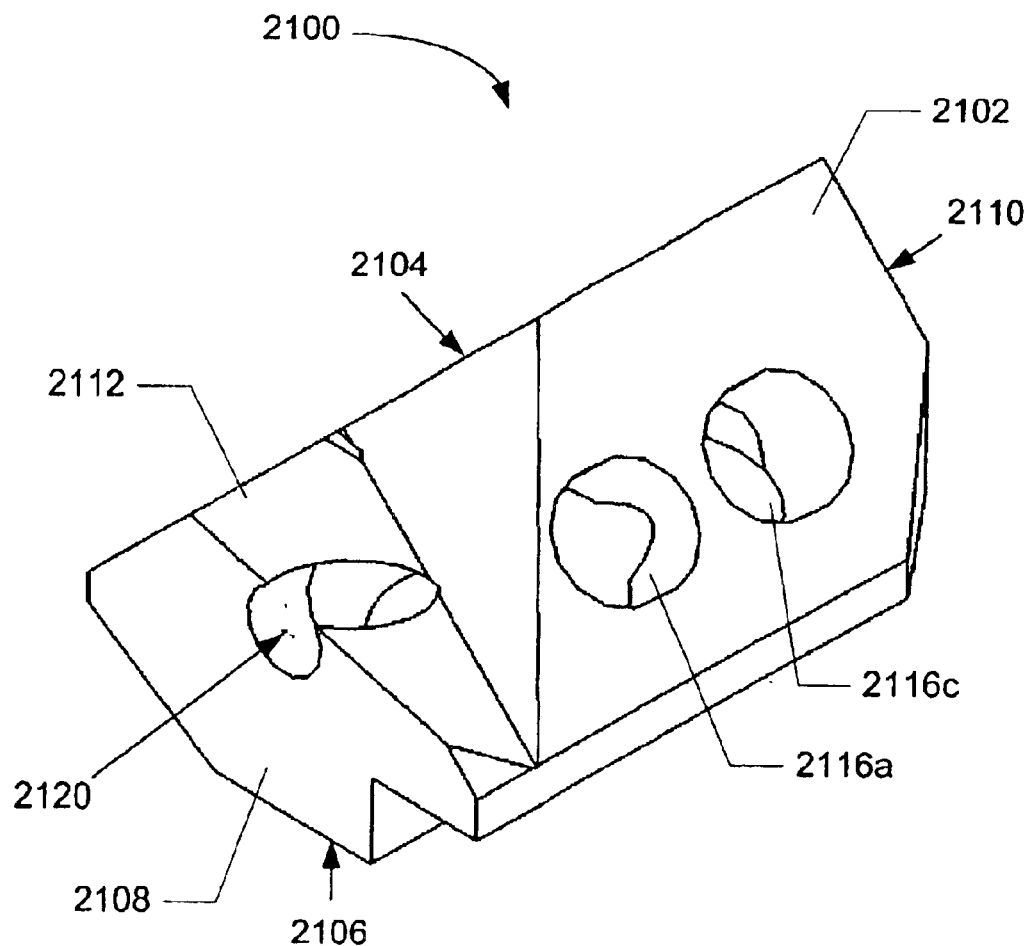
FIGS. 21A–21E illustrate a top isometric, bottom isometric, top, front, and side views, respectively, of yet another embodiment of a core for a device.
Figure 21A:
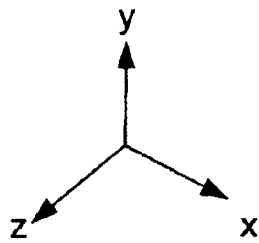
Figure 21B:
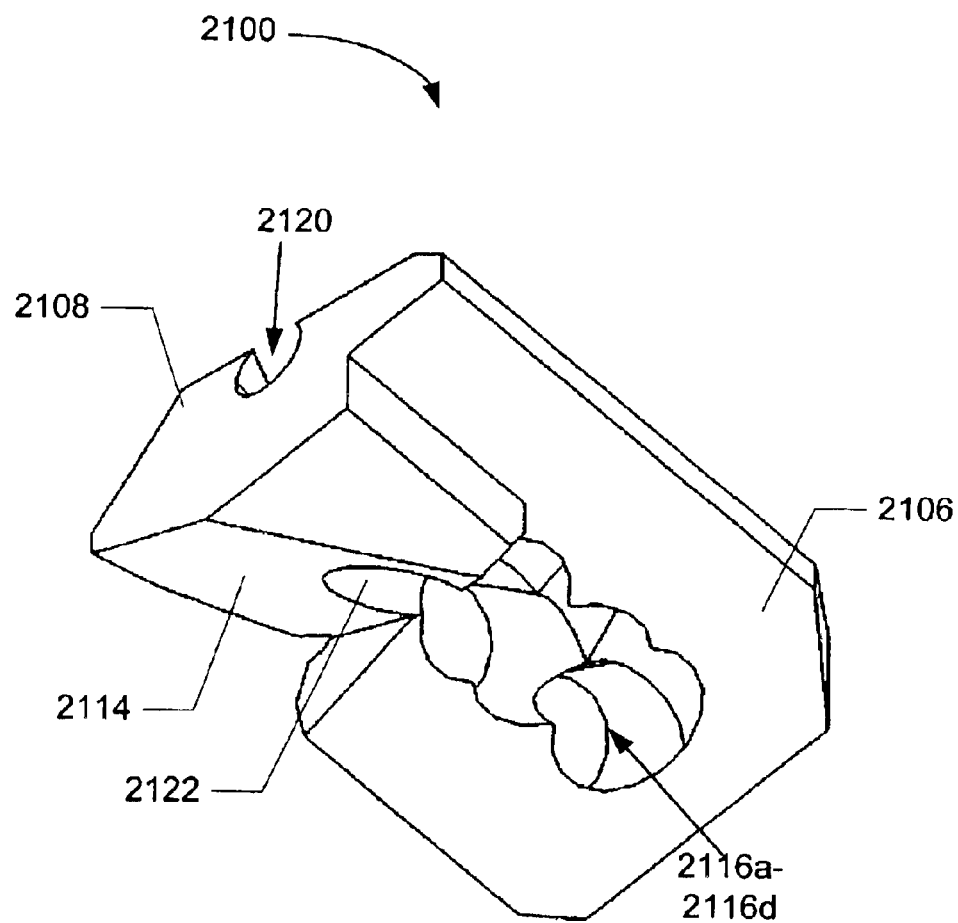
Figure 21B:
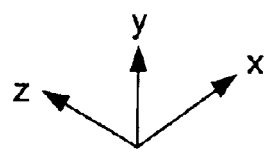
Figure 21C:
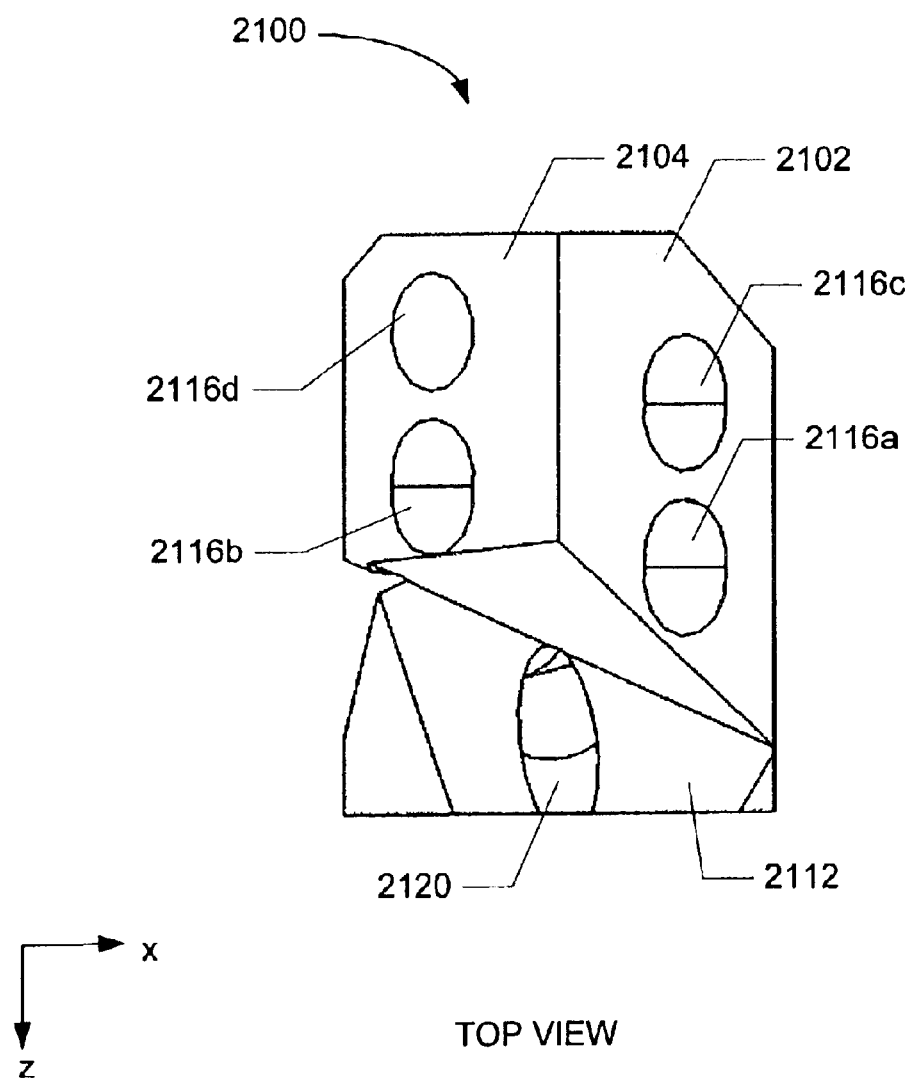
Figure 21D:
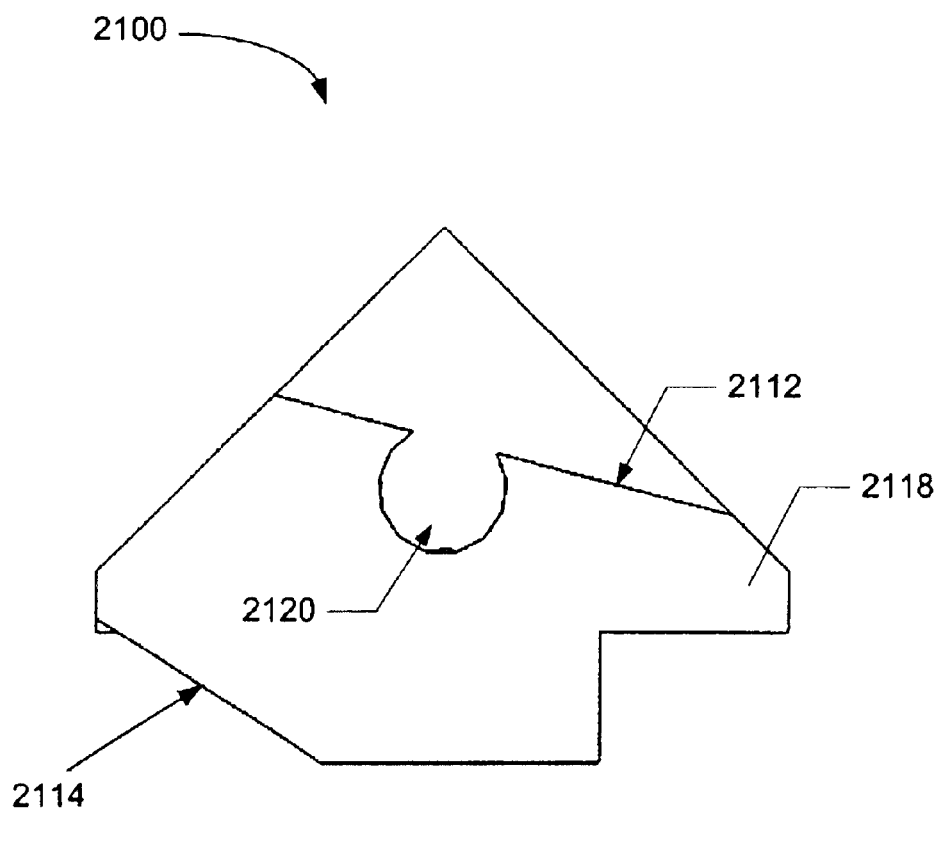
Figure 21E:
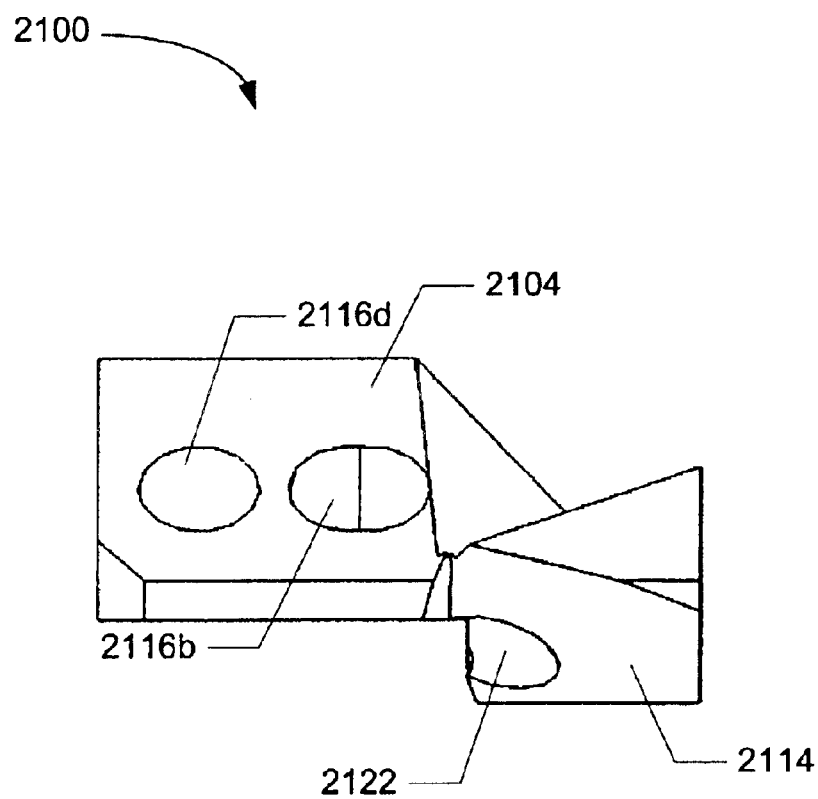
Figure 22A:
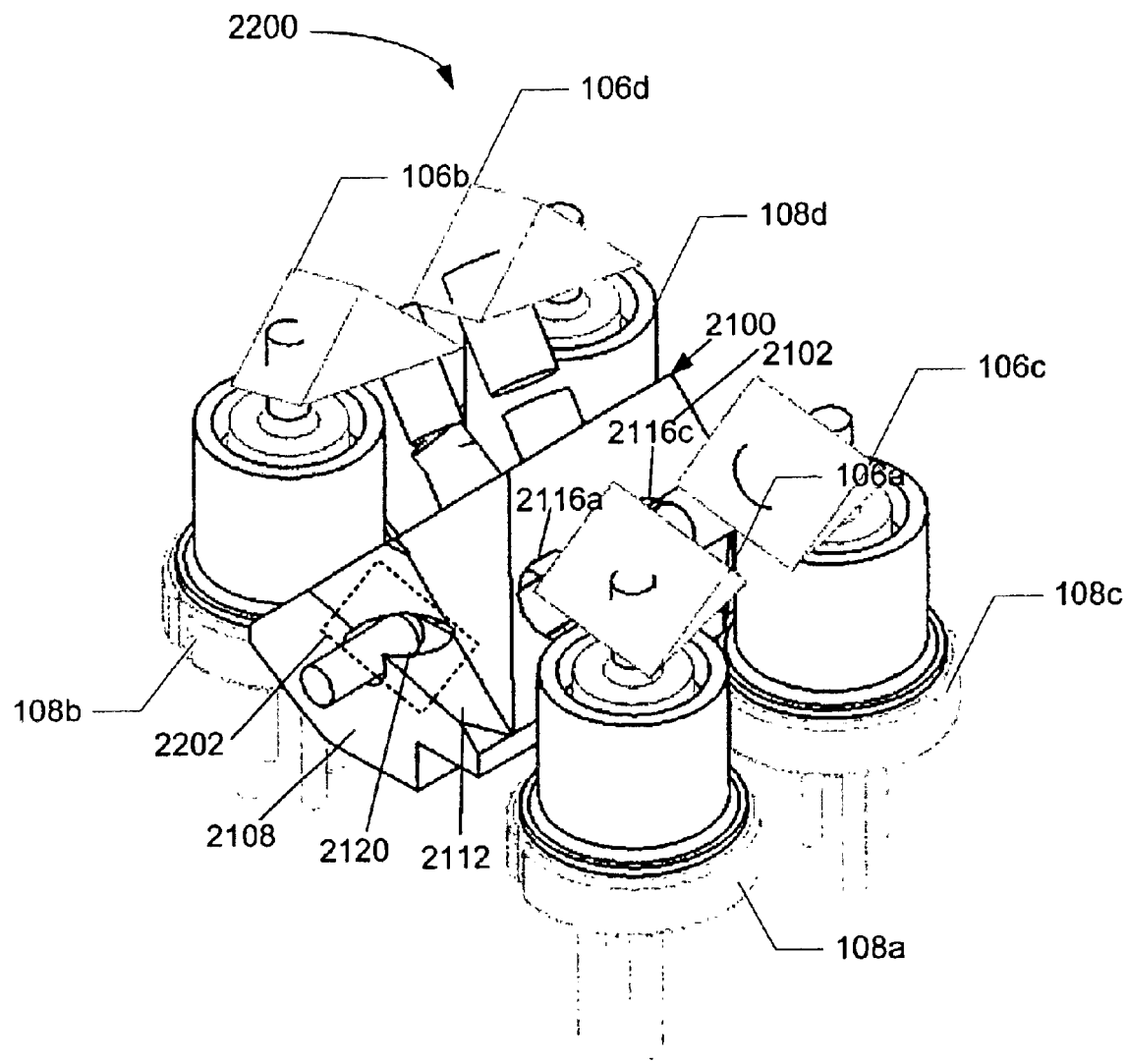
FIGS. 22A–22D illustrate a top isometric, bottom isometric, top, and side views, respectively, of another embodiment of the device with the another embodiment of the core.
Figure 22A:
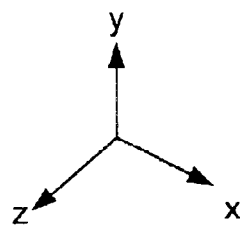
Figure 22B:
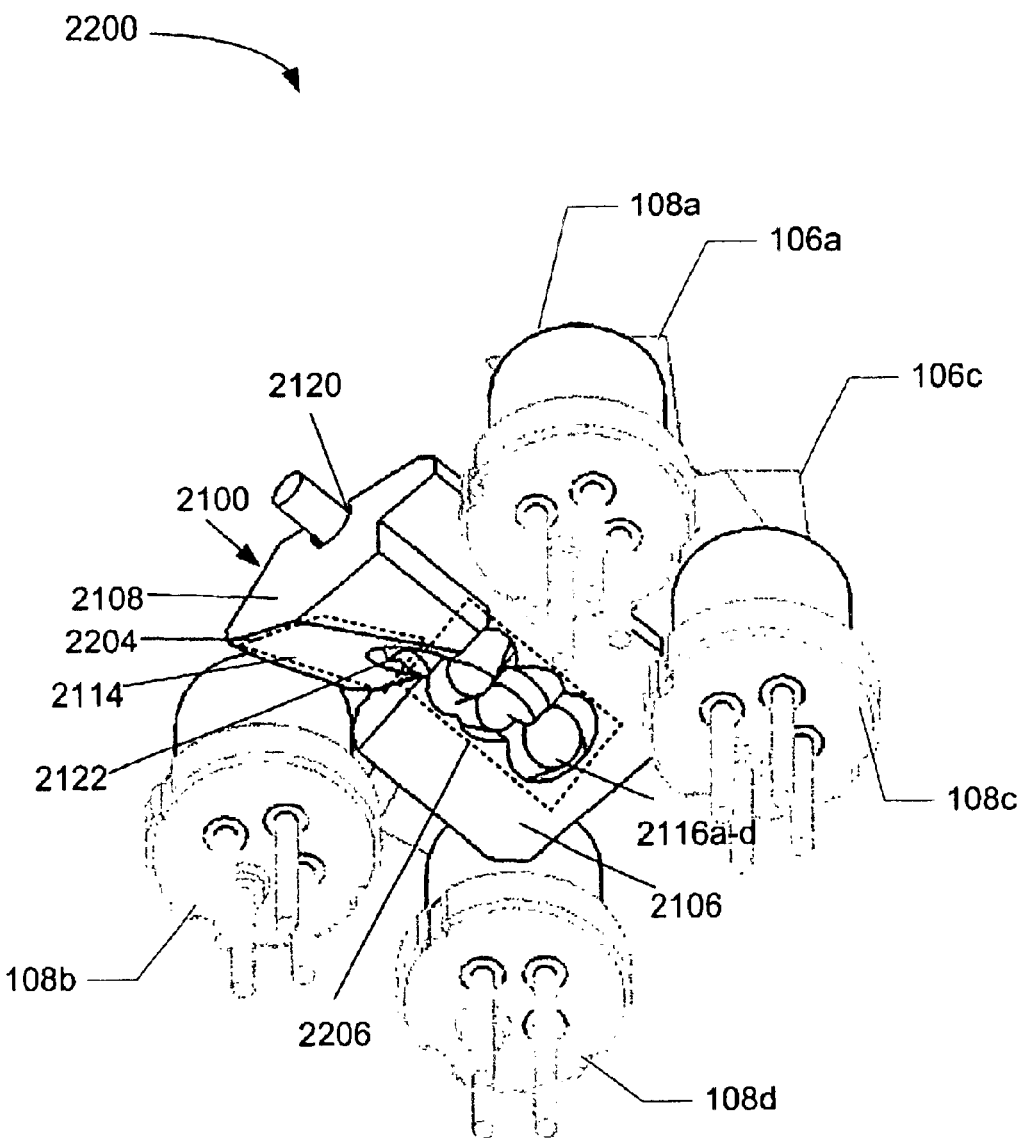
Figure 22B:
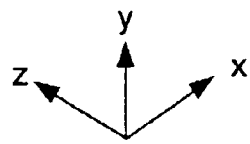
Figure 22C:
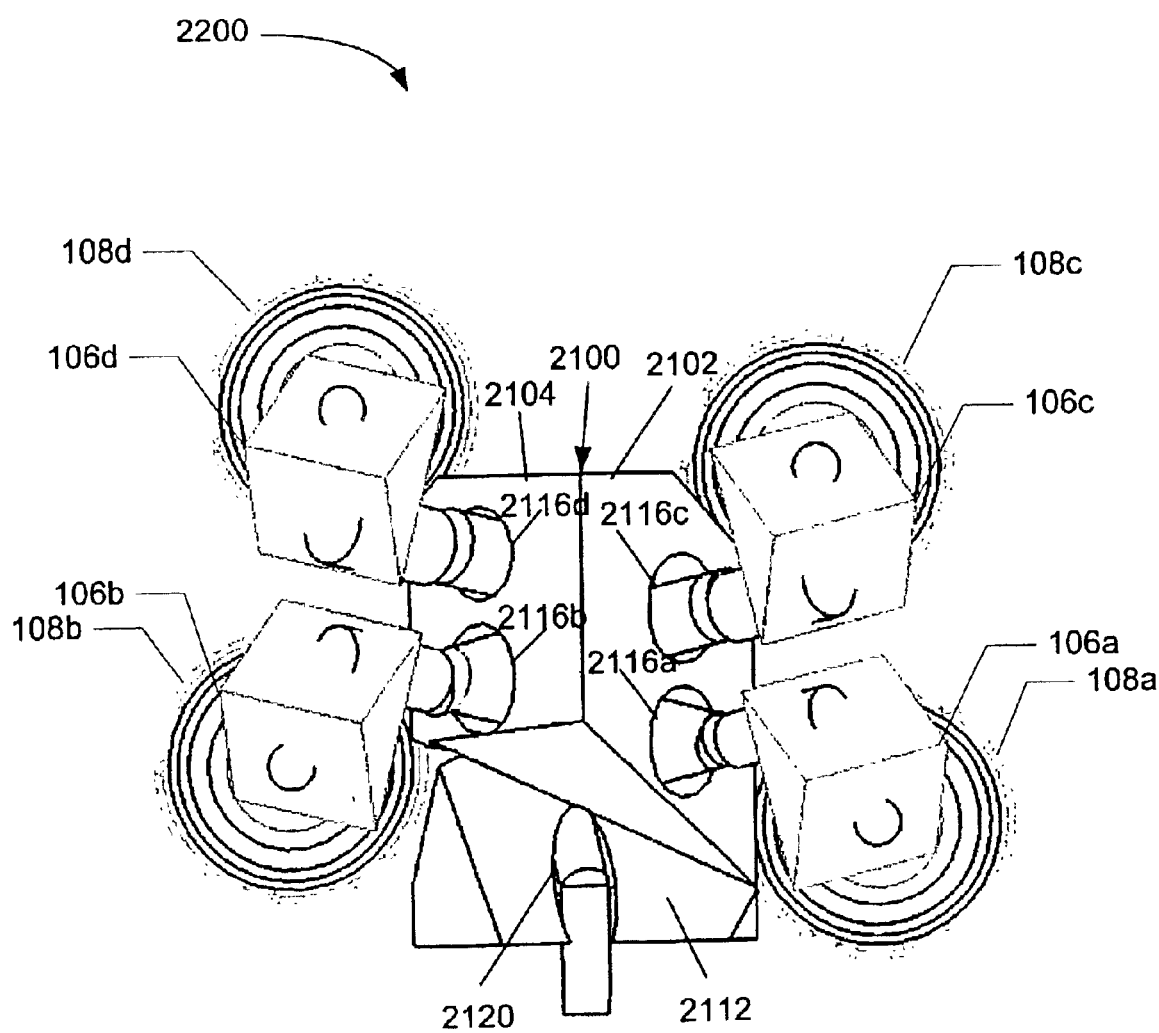
Figure 22D:
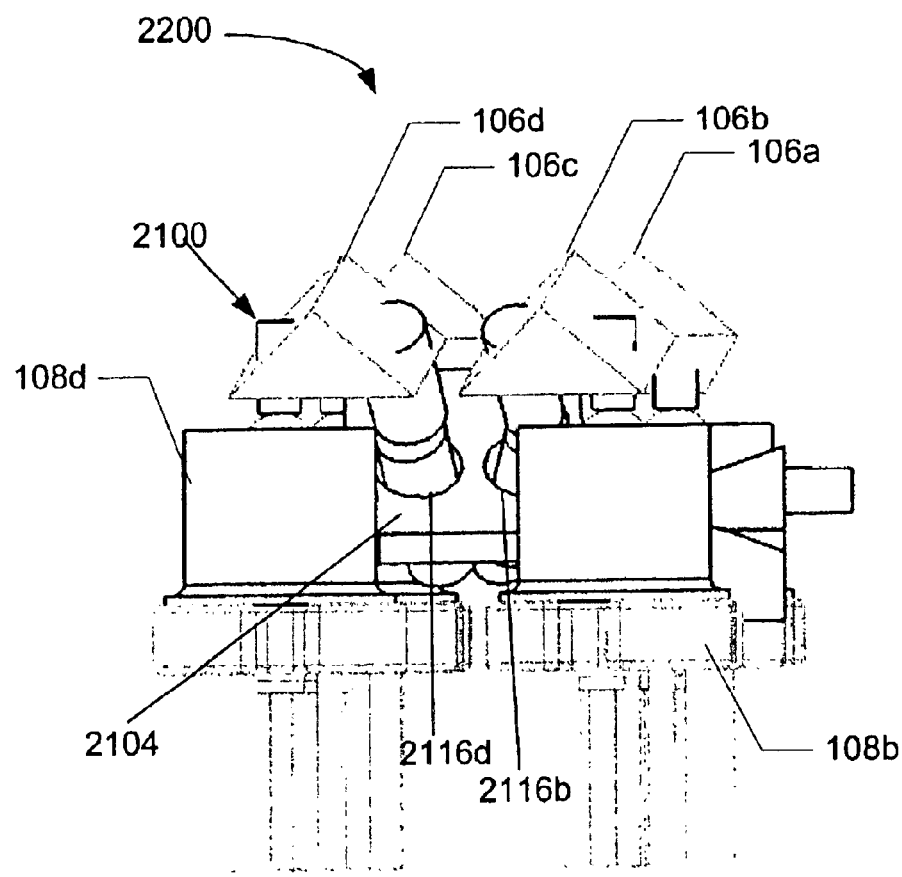
Figure 23A:
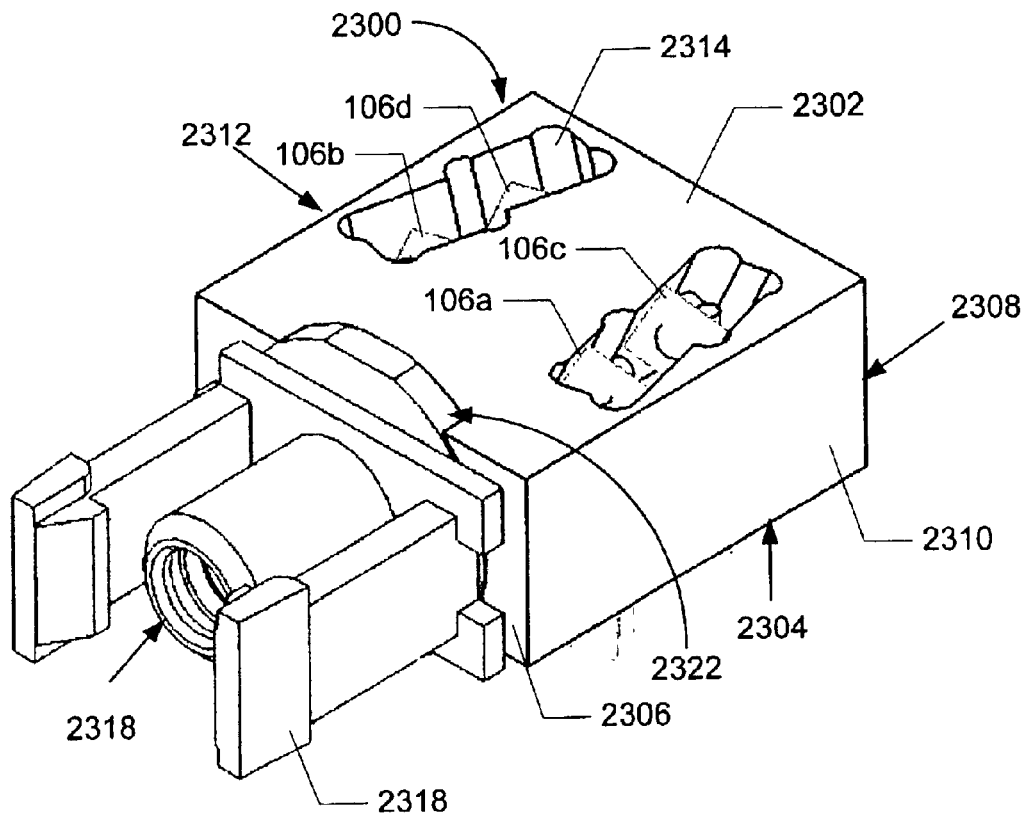
FIGS. 23A–23E illustrate a top isometric, bottom isometric, top, front, and side views, respectively, of an embodiment of a chassis for the device.
Figure 23A:
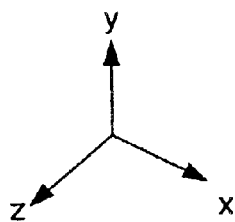
Figure 23B:
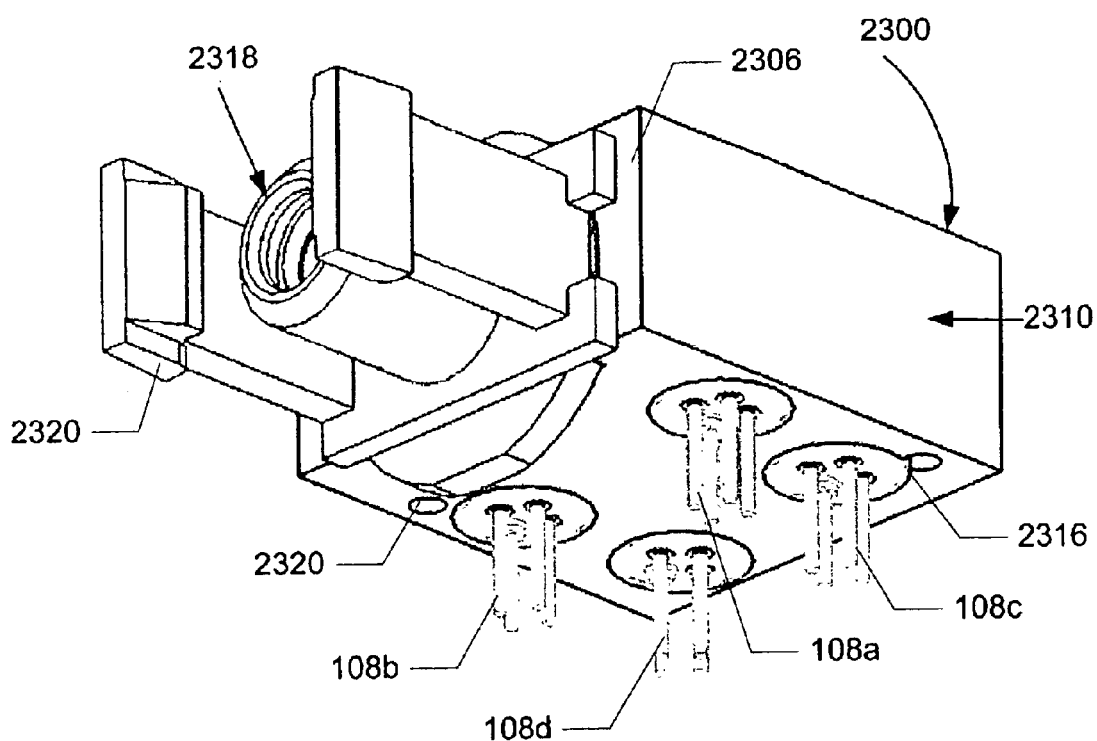
Figure 23B:
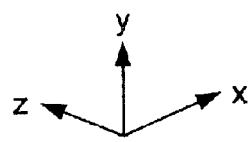
Figure 23C:
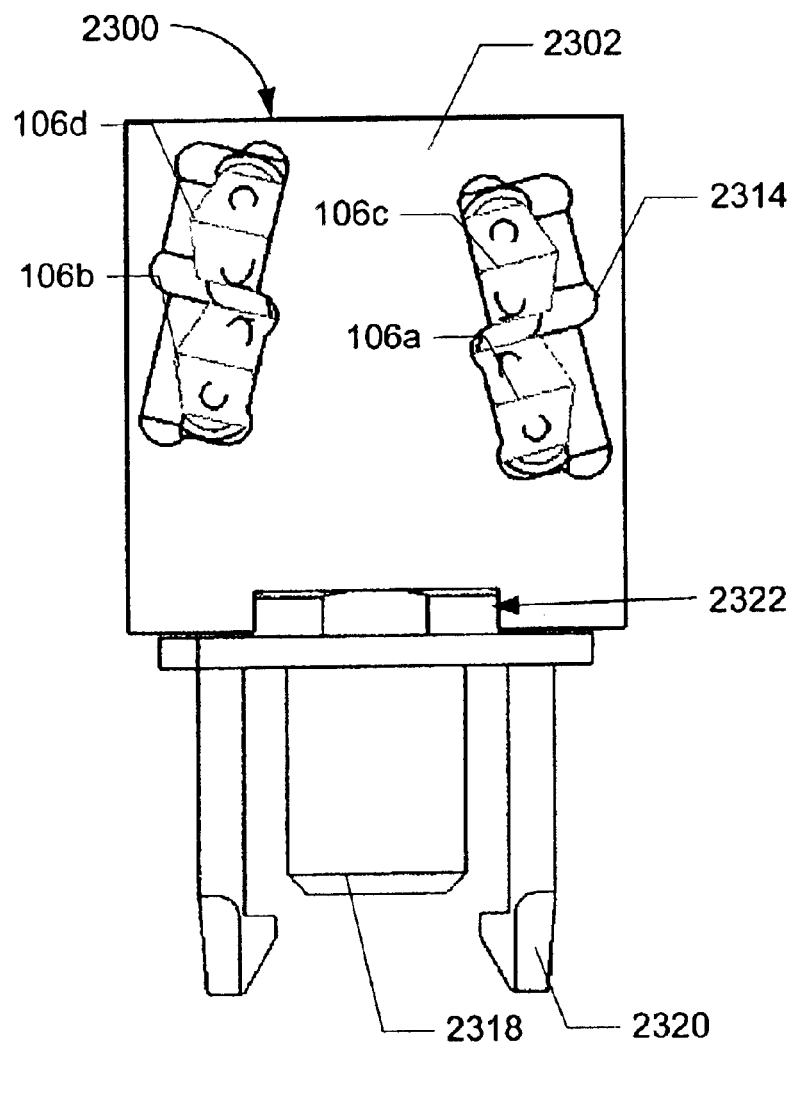
Figure 23C:
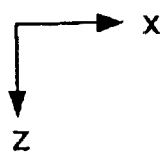
Figure 23D:
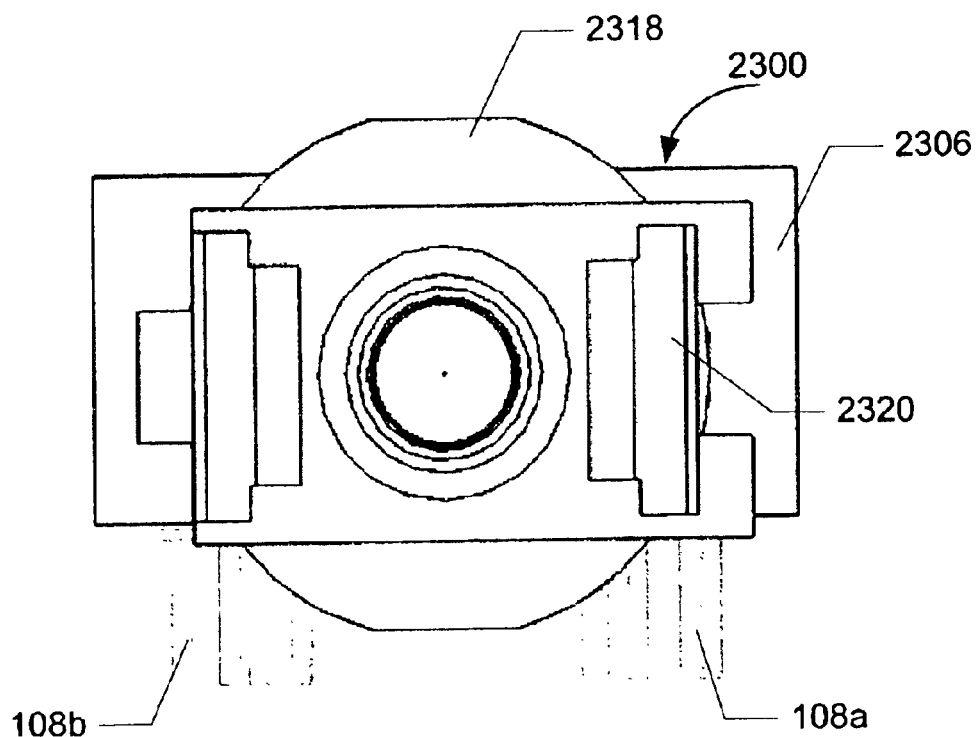
Figure 23D:
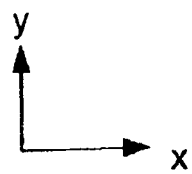
Figure 23E:
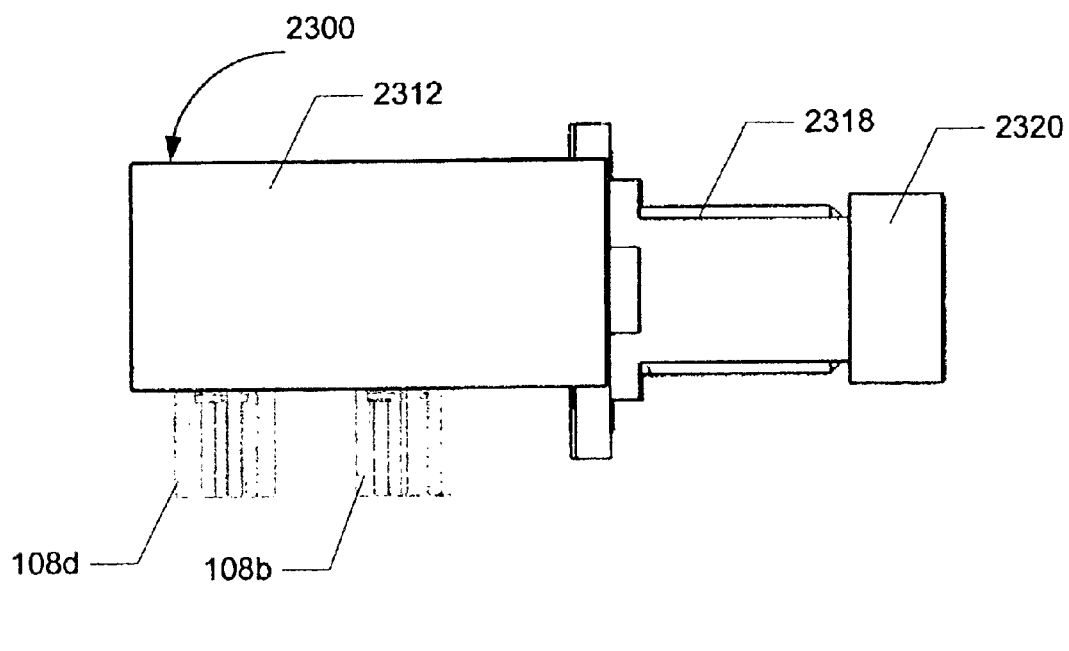

FIGS. 19A–19C illustrate a top isometric, bottom isometric, and top views, respectively, of an embodiment of a core for a device. In this embodiment, the device is active. Core 1900 has a prismatic shape and is composed of glass. The core 1900 comprises three side faces 1902, 1904, 1906, and two end faces 1908, 1910. The core 1900 also comprises a first cut face 1912 and a second cut face 1914. The function of the cut faces 1912 and 1914 will be described below.

FIGS. 20A–20E illustrate a top isometric, bottom isometric, top, front, and side views, respectively, of yet another embodiment of the device. In this embodiment, the device is active. The filters 104a and 104c are coupled to the side face 1902 of the core 1900, and the filters 104b and 104d are coupled to the side face 1904 of the core 1900. A first mirror 2002 is coupled to the cut face 1912, a second mirror 2004 (see FIG. 20B) is coupled to the second cut face side face 1914, and a third mirror 2006 is coupled to the face 1906. The OAE's 106a–106d are placed proximate to the core 200 so that they are optically coupled to their respective filters 104a–104d.

For example, assuming that the light sources 108a–108d are lasers packaged in cans, laser 108d emits $\lambda_4$ to the OAE 106d, which redirects $\lambda_4$ to the filter 104d. Filter 104d transmits $\lambda_4$ to the third mirror 2006, which in turn reflects $\lambda_4$ to the filter 104c. Laser 108c emits $\lambda_3$ to the OAE 106c, which redirects $\lambda_3$ to the filter 104c. Filter 104c transmits $\lambda_3$ to the third mirror 2006. Filter 104c also reflects $\lambda_4$ to the third mirror 2006. The third mirror 2006 in turn reflects $\lambda_3$–$\lambda_4$ to the filter 104b. Laser 108b emits $\lambda_2$ to the OAE 106b, which redirects $\lambda_2$ to the filter 104b. Filter 104b transmits $\lambda_2$ to the third mirror 2006. Filter 104b also reflects $\lambda_3$–$\lambda_4$ to the third mirror 2006. The third mirror 2006 in turn reflects $\lambda_2$–$\lambda_4$ to the filter 104a. Laser 108a emits $\lambda_1$ to the OAE 106a, which redirects $\lambda_1$ to the filter 104a. Filter 104a also reflects $\lambda_2$–$\lambda_4$ to the third mirror 2006. The third mirror 2006 in turn reflects $\lambda_1$–$\lambda_4$ to the first mirror 2002. The first mirror 2002 reflects $\lambda_1$–$\lambda_4$ to the second mirror 2004, which in turn reflects $\lambda_1$–$\lambda_4$ to the output element 2008. In this manner, a multiplexed light is provided by the device 2000. For an active device, an additional reflection of the multiplexed light is provided by mirror 2004 in order to provide the multiplexed light at a right angle to the channel beams, while meeting the geometrical constraints of the packaging of the device 2000. The mirror 2004 is mounted on the cut face 1914 to provide this additional reflection. More specifically, the mirror 2004 on the cut face 1914 reflects the multiplexed light at the appropriate angle so that it is provided at the correct vertical and horizontal position, as set forth in the GBIC form factor standard. A demultiplexer device may be provided by replacing input elements 108a–108d with output elements which may be detector packages and by replacing output element 2008 with an input element, as described for the other embodiments above.

FIGS. 21A–21E illustrate a top isometric, bottom isometric, top, front, and side views, respectively, of yet another embodiment of a core for a device. In this embodiment, the device is active. Core 2100 has a prismatic shape and is composed of metal. The core 2100 comprises three side faces 2102, 2104, 2106, and two end faces 2108, 2110. The core 2100 also comprises a first cut face 2112 and a second cut face 2114. The functions of the cut faces 2112 and 2114 are the same as the cut faces 1912 and 1914 of the core 1900. Traversing from the cut face 2112 to a first location on the face 2106 is a first bore 2120. Traversing from the first bore 2120 to a second location on the face 1106 is a second bore 2122. The core 2100 also comprises bores 2116a and 2116c that traverse from the face 2102 to the face 2106 and bores 2116b and 2116d, which traverse from the face 2104 to the face 2106. The function of the bores 2116a–2116d, 2120, and 2122 will be described below.

FIGS. 22A–22D illustrate a top isometric, bottom isometric, top, and side views, respectively, of still another embodiment of a device shown with the embodiment of the core described above. In this embodiment, the device is active. The filters 104a and 104c (not shown) are coupled to the side face 2102 of the core 2100 at the location of the bores 2116a and 2216c, respectively. The filters 104b and 104d (not shown) are coupled to the side face 2104 of the core 2100 at the location of the bores 2116b and 2116d, respectively. The filters 104a–104d are not illustrated in FIGS. 22A–22D so that the bores 2116a–2116d can be seen. A first mirror 2202 is coupled to the first cut face 2112 at the location of the first bore 2120, a second mirror 2204 is coupled to the second cut face 2114 at the location of the second bore 2122, and a third mirror 2206 is coupled to the side face 2106 at the location of the bores 2116a–2116d on that face. The OAE's 106a–106d are then placed proximate to the core 2100 so that they are optically coupled to their respective filters 104a–104d.

For example, laser package 108d emits $\lambda_4$ to the OAE 106d, which redirects $\lambda_4$ to the filter 104d. Filter 104d transmits $\lambda_4$ through the bore 2116d to the third mirror 2206, which in turn reflects $\lambda_4$ through the bore 2116c to the filter 104c. Laser package 108c emits $\lambda_3$ to the OAE 106c, which redirects $\lambda_3$ to the filter 104c. Filter 104c transmits $\lambda_3$ and reflects $\lambda_4$ through the bore 2116c to the third mirror 2206. The third mirror 2206 reflects $\lambda_3$–$\lambda_4$ through the bores 2116b to the filter 104b. Laser can package 108b emits $\lambda_2$ to the OAE 106b, which redirects $\lambda_2$ to the filter 104b. Filter 104b transmits $\lambda_2$ and reflects $\lambda_3$–$\lambda_4$ through the bore 2116b to the third mirror 2006. The third mirror 2206 reflects $\lambda_2$–$\lambda_4$ through the bore 2116a to the filter 104a. Laser 108a emits $\lambda_1$ to the OAE 106a, which redirects $\lambda_1$ to the filter 104a. Filter 104a transmits $\lambda_1$ and reflects $\lambda_2$–$\lambda_4$ through the bore 2116a to the third mirror 2206. The third mirror 2206 reflects $\lambda_1$–$\lambda_4$ through the second bore 2122 to the second mirror 2204. The second mirror 2204 reflects $\lambda_1$–$\lambda_4$ through the first bore 2120 to the first mirror 2202. The first mirror 2202 reflects $\lambda_1$–$\lambda_4$ to the output element. In this manner, a multiplexed light is provided by the device 2200. A demultiplexer device may also be provided by substituting the components described above.

FIGS. 23A–23E illustrate a top isometric, bottom isometric, top, front, and side views, respectively, of another embodiment of a device. In this embodiment, the device is active. The chassis 2300 comprises a top face 2302, bottom face 2304, first side face 2310, second side face 2312, a first end face 2306, and a second end face 2308. The chassis 2300 comprises a hole (not shown) that traverses from the first end face 2306 to the second end face 2308. The core 1900 or 2100, with the filters 104a–104d and mirrors 2002 or 2202, 2004 or 2204, and 2006 or 2206, resides within the hole. The chassis 2300 also comprises holes 2314 in the top face 2302 and holes 2316 in the bottom face 2304. The OAE's 106a–106d reside within the holes 2314, and the light sources 108a–108d (or output elements 109a–d for a demultiplexer) reside within the holes 2316. In addition, the chassis 2300 comprises a nozzle bore 2322 for housing a nozzle 2318, through which the multiplexed light is output or input. An optical fiber may be coupled to the nozzle 2318. Arms 2320 may be coupled to the nozzle 2318 to couple the device 2300 to a fiber connector or other optical system or subsystem. In this embodiment, the OAE's 106a–106d can be adjusted in their respective holes 2314 using any of the adjusting methods illustrated in FIGS. 15A–18B.

Although the embodiments of the cores described above are prismatic, other shapes with the desired surface geometry for the filters and mirrors can be used.

Figure 24:
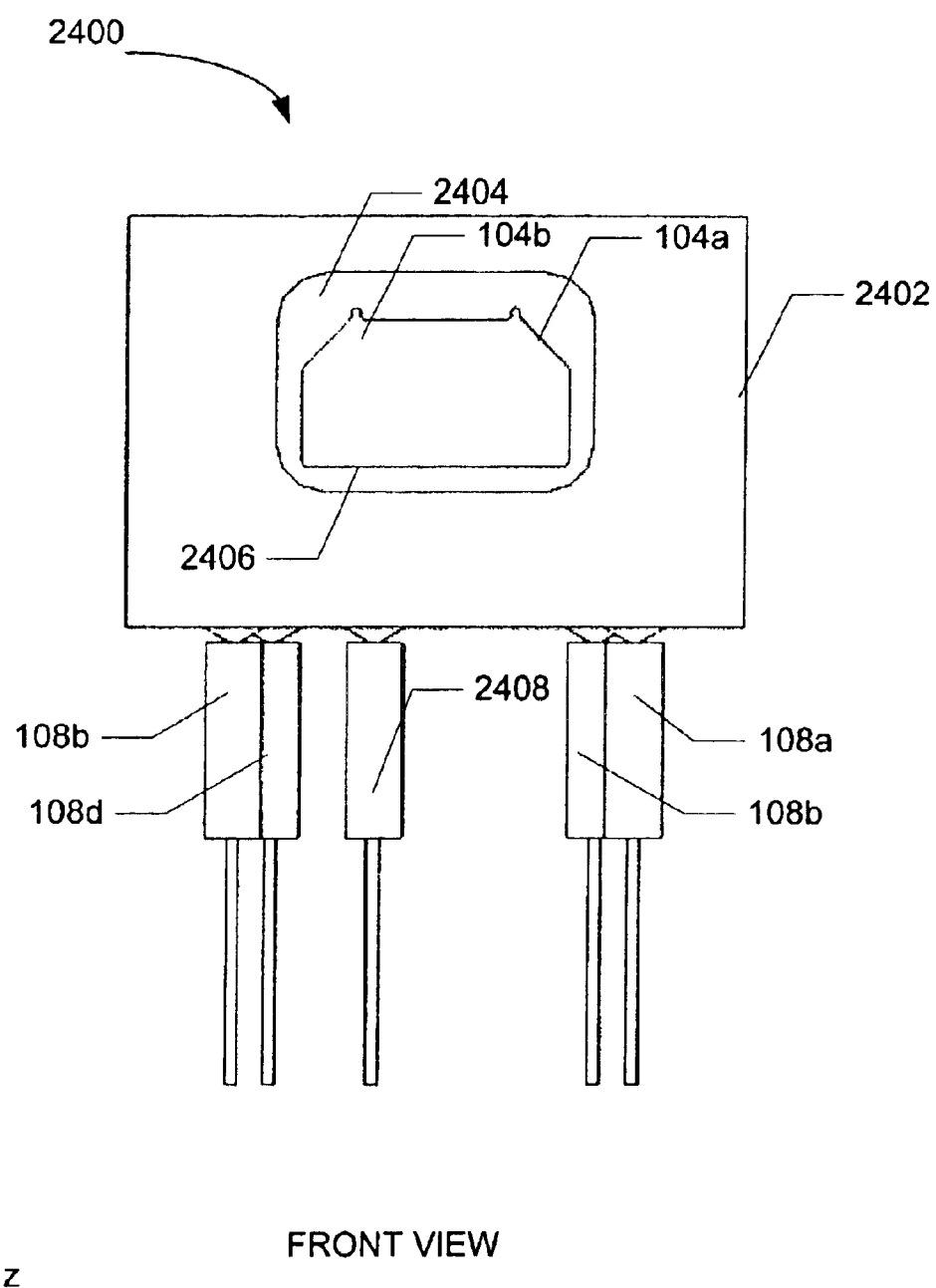
FIG. 24 illustrates a front view of an embodiment of the device without a core.

The device can also be provided with a chassis but no core. FIG. 24 illustrates a front view of an embodiment of the device without a core. The coreless chassis 2400 comprises a cavity 2404 which traverses from the front face 2402 to a back face (not shown). The features of the chassis 2400 within the cavity 2404 are such that the filters 104a–104d may be coupled onto the features at the appropriate angles. A mirror 2406 is also mounted within the cavity 2404. The chassis 2400 further comprises holes at its top face (not shown) for the OAE's 106a–106d, and holes (not shown) at its bottom face for the light sources 108a–108d (or output elements 109a–d for a demultiplexer) and for the output element 2408 (or input element for a demultiplexer). Light would traverse between the filters 104a–104d, the mirror 2406, and the OAE's 106a–106d in a manner similar to the filters 104a–104d, the second mirror 306, and the OAE's 106a–106d with the first embodiment of the core 200 described above. The output element 2408 performs the same function as output element 304 (FIGS. 3A–3D). A mirror that performs the same function as the first mirror 304 may also be mounted within the cavity 2404. In this embodiment, a front plate is used, as described below.

Figure 25A:
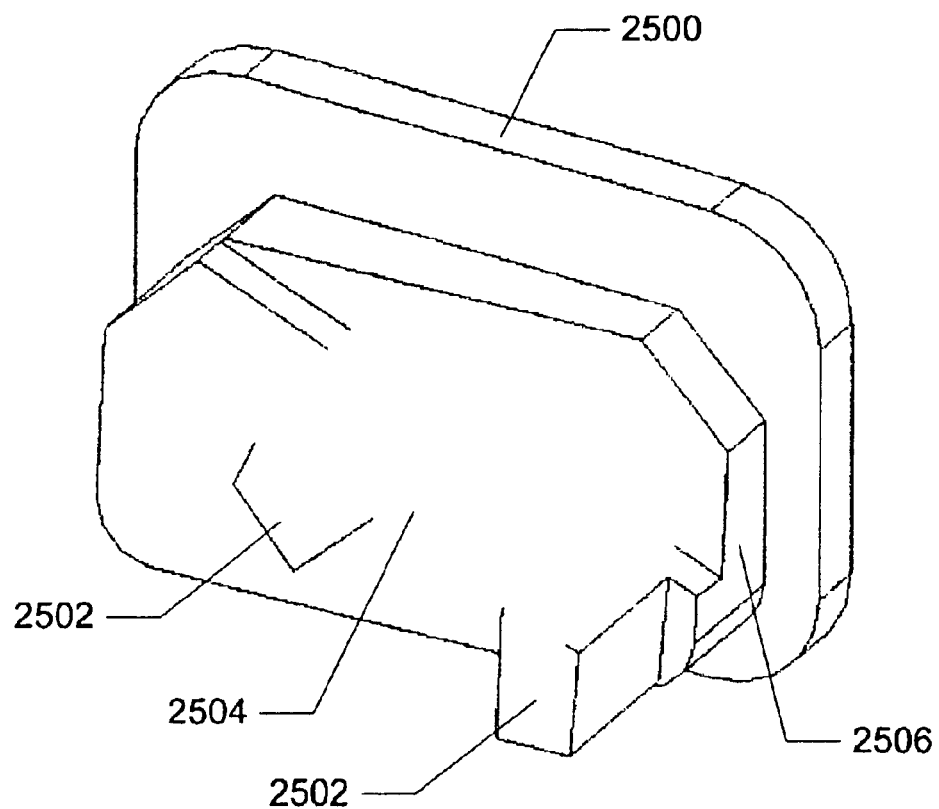
FIGS. 25A–25B illustrate a top isometric and bottom isometric views, respectively, of a front plate of the embodiment of the device without the core.
Figure 25A:
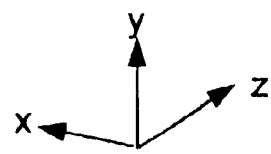
Figure 25B:
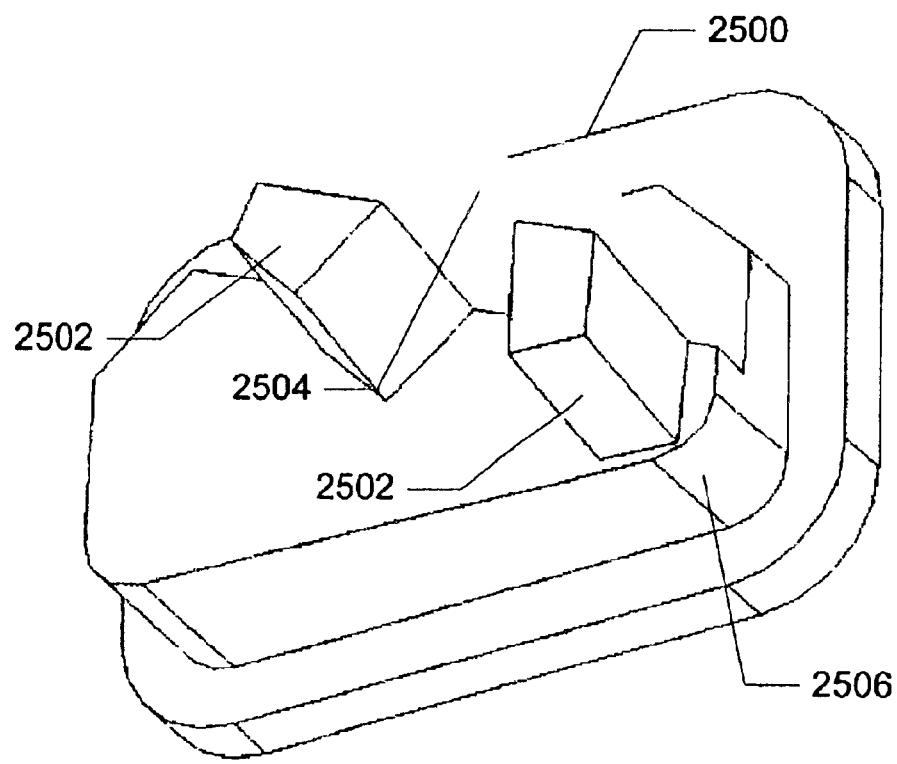
Figure 25B:
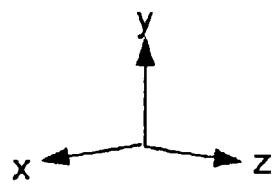

FIGS. 25A–25B illustrate a top isometric and bottom isometric views, respectively, of a front plate of the embodiment of the device without a core. In this embodiment, the device is passive. The front plate 2500 comprises shelves 2502 on which a mirror 2504 may be mounted at the appropriate angle. The shelves 2502 themselves are mounted onto a plate 2506. In this embodiment, the shape of the plate 2506 matches the shape of the opening of the cavity 2404. The front plate 2500 is then attached to the coreless chassis 2400 such that the shelves 2502, mirror 2504, and plate 2506 reside within the cavity 2404.

Figure 26A:
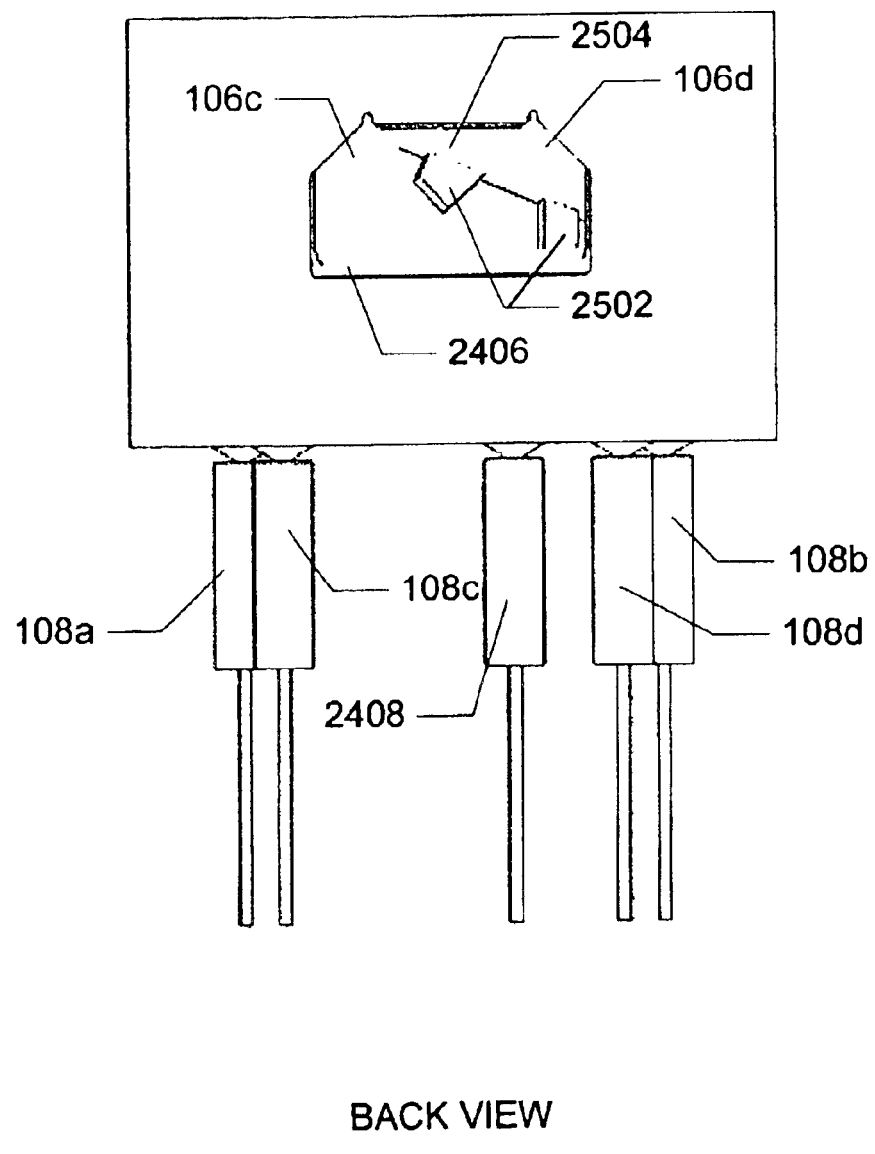
FIGS. 26A–26B illustrate a back and front views, respectively, of the embodiment of the device without the core.
Figure 26B:
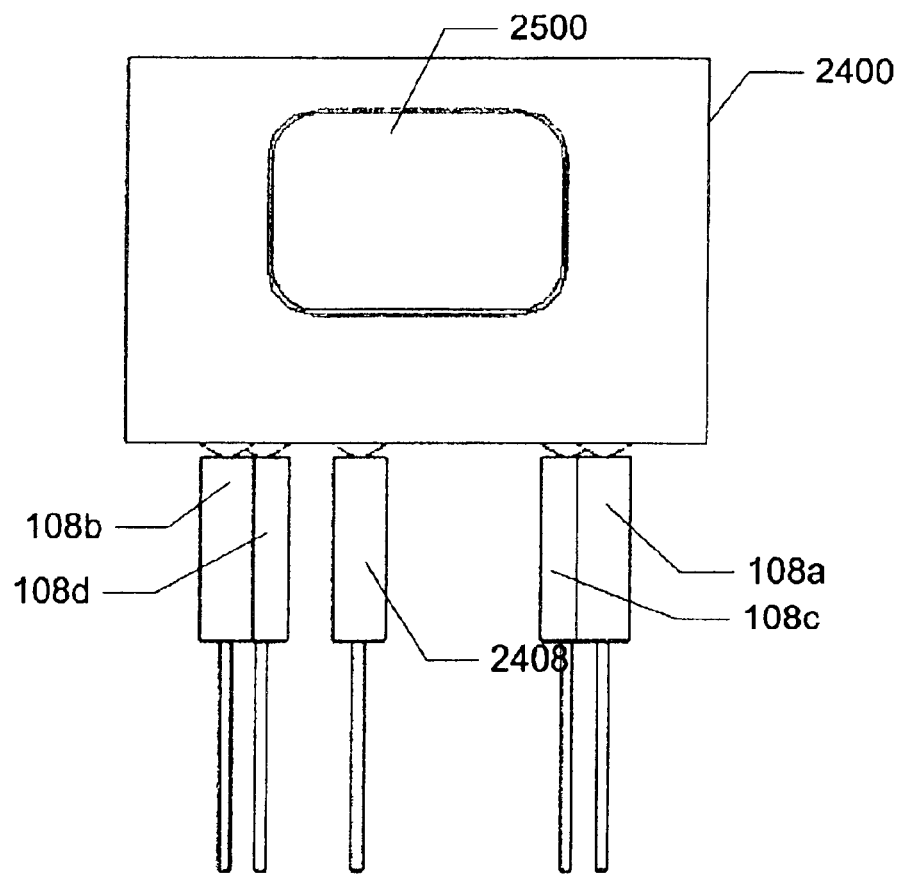
Figure 26B:
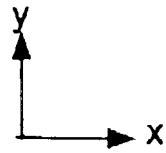

FIGS. 26A–26B illustrate a back and front views, respectively, of the embodiment of the device without the core. In the embodiment, the chassis provides the frame for the device without requiring a separate core. Once the front plate 2500 is attached to the coreless chassis 2400, the elements within the cavity 2404 are in the same orientation as the corresponding elements for the chassis 300 with a core 200. Because the shape of the plate 2506 matches the shape of the opening of the cavity 2404, the front plate 2500 also functions as a plug, such that when the front plate 2500 is soldered onto the coreless chassis 2400, it helps to create a hermetic seal. Additional plates may be soldered to cover the cavity opening at the chassis's back face and the holes for the OAE's 106a–106d. The light sources 108a–108d (or output elements for a demultiplexer) and output element 2408 (or an input element for a demultiplexer) may be soldered to the chassis 2402 as well. In this manner, the device 2400 may be hermetically sealed.

Improved methods and systems for routing and aligning beams and optical elements in an optical device have been disclosed. The methods and systems include a multiplexing device, which includes: a plurality of light sources, wherein each light source provides a beam with a channel in a range of wavelengths; a filter associated with each channel, wherein each filter selects the wavelengths for the respective channel; an output element to receive each channel after it traverses the respective filter; and an OAE associated with each channel, wherein the OAE is configured to provide at least two directional changes in the path of the beam, wherein the path of the beam input to the OAE may be non-coplanar to the path of the beam output from the OAE.

The methods and systems also include a demultiplexing device, which includes: an input element, wherein the input element provides a beam with a plurality of channels, each channel in a range of wavelengths; a filter associated with each channel, wherein each filter selects the wavelengths for the respective channel; an output element associated with each channel, wherein each output element receives the respective channel after it traverses the respective filter; and an OAE associated with each channel, wherein the OAE is configured to provide at least two directional changes in the path of the beam, wherein the path of the beam input to the OAE may be non-coplanar to the path of the beam output from the OAE.

The OAE can be configured to substantially compensate for the cumulative alignment errors in the beam path. The OAE allows the optical elements in a device, other than the OAE, to be placed and fixed in place without substantially compensating for optical alignment errors. The OAE is inserted into the beam path and adjusted. This greatly increases the ease in the manufacturing of optical devices, especially for devices with numerous optical elements, and lowers the cost of manufacturing. Even as the number of optical elements in the device increases, alignment is still accomplished through the adjustment of the OAE. Because only the OAE needs to be accessed and moved for final alignment, the size of the device can be smaller. Also, the tolerances of the placement of optical elements are increased, and the optical elements do not require special features for alignment.

The multiplexing device and/or demultiplexing device can reside within a standard form factor, such as the GBIC form factor. The devices fold the paths of the beams traversing therethrough with a geometry which allows a small package for the device. The geometry is provided by a core onto which filters and mirrors of the device are coupled.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of aligning an optical element comprising:

positioning an optical element in a starting position;

(A) aligning the optical element along a first axis including:

moving the optical element through a plurality of positions along the first axis;

measuring a power transmitted through the optical element in each of the plurality of positions along the first axis;

determining a first peak position along the first axis with substantially a highest power;

(B) after aligning the optical element alone the first axis, aligning the optical element along a second axis including:

moving the optical element through a plurality of positions along the second axis;

measuring the power transmitted through the optical element in each of the plurality of positions along the second axis;

determining a second peak position along the second axis with substantially a highest power;

(C) after aligning the optical element along the second axis, realigning the optical element along the first axis including:

moving the optical element through a second plurality of positions along the first axis while maintaining the optical element at the second peak position relative to the second axis;

measuring the power transmitted through the optical element in each of the second plurality of positions along the first axis;

determining a revised first peak position along the first axis with substantially a highest power; and (D) after realigning the optical element alone the first axis, aligning the optical element along a third axis including:

moving the optical element through a plurality of positions along the third axis;

measuring the power transmitted through the optical element in each of the plurality of positions along the third axis;

determining a third peak position along the third axis with substantially a highest power.

2. The method of claim 1 further comprising:

(E) positioning the optical element in the third peak position and realigning the optical element along the first and second axis while maintaining the optical element at the third peak position relative to the third axis.

3. The method of claim 2 wherein each of the steps of moving the optical element through a plurality of positions along an axis further comprises stepping the optical element through the plurality of positions using a step size for each respective axis.

4. The method of claim 3 further comprising reducing the step size for each respective axis after positioning the optical element in the third peak position and repeating the alignment alone the three axes using the reduced step size for each respective axis.

5. The method of claim 4, wherein the optical element is an optical alignment element (OAE) configured to provide at least four degrees of freedom which effect a direction of a beam and the step size is reduced by substantially one-fifth.

6. A method of claim 1 further comprising:
after determining the third peak position:
(D2) aligning the optical element along a fourth axis including:
moving the optical element through a plurality of positions along the fourth axis;
measuring the power transmitted through the optical element in each of the plurality of positions along the fourth axis;
determining a fourth peak position along the fourth axis with substantially a highest power; and
(D3) realigning the optical element along the third axis including:
moving the optical element through a second plurality of positions along the third axis while maintaining the optical element at the fourth peak position along the fourth axis;
measuring the power transmitted through the optical element in each of the second plurality of positions along the third axis;
determining a revised third peak position along the third axis with substantially a highest power.

7. The method of claim 6 further comprising:
(E) positioning the optical element in the revised third peak position and realigning the optical element along the first and second axis.

8. The method of claim 7 wherein each of the steps of moving the optical element through a plurality of positions along an axis further comprises stepping the optical element through the plurality of positions using a step size for each respective axis.

9. The method of claim 8 further comprising reducing the step size for each respective axis after positioning the optical element in the revised peak position and realigning the optical element along the first and second axis and repeating the alignment along the four axes using the reduced step size for each respective axis.

10. The method of claim 9, wherein the optical element is an optical alignment element (OAE) configured to provide at least four degrees of freedom which effect a direction of a beam and the step size is reduced by substantially one-fifth.

11. The method of claim 2 further comprising:
(F) moving the optical element along the first axis in a first direction until the power drops below a threshold;
moving the optical element along the first axis in a second direction until the power drops below the threshold;
determining a first alignment position along the first axis between the positions at which the power drops below the threshold in the first and the second directions along the first axis.

12. The method of claim 11 wherein the first alignment position is at substantially a mid-point between the positions at which the power drops below the threshold in the first and the second directions along the first axis.

13. The method of claim 11 further comprising:
(G) moving the optical element along the second axis in a first direction until the power drops below a threshold;
moving the optical element along the second axis in a second direction until the power drops below the threshold;
determining a second alignment position along the second axis between the positions at which the power drops below the threshold in the first and the second directions along the second axis.

14. The method of claim 13 further comprising:
(H) moving the optical element along the third axis in a first direction until the power drops below a threshold;
moving the optical element along the third axis in a second direction until the power drops below the threshold;
determining a third alignment position along the third axis between the positions at which the power drops below the threshold in the first and the second directions along the third axis.

15. The method of claim 1, wherein the first axis is selected such that movement along the first axis has substantially a greatest impact on the power transmitted through the optical element.

16. The method of claim 6, wherein the first axis is selected such that movement along the first axis has substantially a greatest impact on the power transmitted through the optical element.

17. The method of claim 16, wherein the optical element is an optical alignment element (OAB) configured to provide at least four degrees of freedom which effect a direction of a beam.

18. The method of claim 7, wherein each peak position along each respective axis is determined in accordance with a hill climb algorithm.

19. A method of aligning an optical element comprising:
positioning an optical element in a starting position;
(A) aligning the optical element along a first axis including:
moving the optical element along the first axis in a first direction until a power drops below a threshold;
moving the optical element along the first axis in a second direction until the power drops below the threshold;
determining a first alignment position along the first axis between the positions at which the power drops below the threshold in the first and the second directions along the first axis;
(B) after aligning the optical element along the first axis, aligning the optical element along a second axis including:
moving the optical element along the second axis in a first direction until the power drops below a threshold;
moving the optical element along the second axis in a second direction until the power drops below the threshold;
determining a second alignment position along the second axis between the positions at which the power drops below the threshold in the first and the second directions along the second axis;
(C) after aligning the optical element alone the second axis, realigning the optical element along the first axis including:
moving the optical element along the first axis in a first direction until the power drops below a threshold while maintaining the optical element in the second alignment position relative to the second axis;
moving the optical element along the first axis in a second direction until the power drops below the threshold;
determining a revised first alignment position along the first axis between the positions at which the power drops below the threshold in the first and the second directions along the first axis; and
(D) after realigning the optical element alone the first axis, aligning the optical element along a third axis including:

moving the optical element along the third axis in a first direction until the power drops below a threshold;
moving the optical element along the third axis in a second direction until the power drops below the threshold;
determining a third alignment position along the third axis between the positions at which the power drops below the threshold in the first and the second directions along the third axis.

20. The method of claim 19 further comprising:
(E) positioning the optical element in the third alignment position and realigning the optical element along the first and second axis while maintaining the optical element at the third alignment position relative to the third axis.

21. The method of claim 19 each respective alignment position is at substantially the mid-point between the positions at which the power drops below the threshold in the first and the second directions along each respective axis.

22. The method of claim 20 wherein each respective alignment position is at substantially the mid-point between the positions at which the power drops below the threshold in the first and the second directions along each respective axis.

23. The method of claim 22, wherein the optical element is an optical alignment element (OAB) configured to provide at least four degrees of freedom which effect a direction of a beam.

24. The method claim 19 further comprising:
after aligning the optical element along the third axis:
(D2) aligning the optical element along a fourth axis including:
moving the optical element along the fourth axis in a first direction until the power drops below a threshold;
moving the optical element along the fourth axis in a second direction until the power drops below the threshold;
determining a fourth alignment position along the fourth axis between the positions at which the power drops below the threshold in the first and the second directions along the fourth axis; and
(D3) realigning the optical element along the third axis including:
moving the optical element along the third axis in a first direction until the power drops below a threshold;
moving the optical element along the third axis in a second direction until the power drops below the threshold;
determining a revised third alignment position along the third axis between the positions at which the power drops below the threshold in the first and the second directions along the third axis.

25. The method of claim 24 further comprising:
(E) positioning the optical element in the revised third alignment position and realigning the optical element along the first and second axis while maintaining the optical element at the revised third alignment position along the third axis.

26. The method of claim 24 wherein each respective alignment position is at substantially the mid-point between the positions at which the power drops below the threshold in the first and the second directions along each respective axis.

27. The method of claim 25 wherein each respective alignment position is at substantially the mid-point between the positions at which the power drops below the threshold in the first and the second directions along each respective axis.

28. The method of claim 27, wherein the optical element is an optical alignment element (OAE) configured to provide at east four degrees of freedom which effect a direction of a beam.

29. The method of claim 25, wherein the starting position is determined using a spiral search algorithm, further comprising:
after positioning the optical element at the third alignment position:
(F) aligning the optical element along a first axis including:
moving the optical element along the first axis in a first direction until the power drops below a threshold;
moving the optical element along the first axis in a second direction until the power drops below the threshold;
determining a first alignment position along the first axis between the positions at which the power drops below the threshold in the first and the second directions along the first axis;
(G) aligning the optical element along a second axis including:
moving the optical element along the second axis in a first direction until the power drops below a threshold;
moving the optical element along the second axis in a second direction until the power drops below the threshold;
determining a second alignment position along the second axis between the positions at which the power drops below the threshold in the first and the second directions along the second axis;
(H) realigning the optical element along the first axis including:
moving the optical element along the first axis in a first direction until the power drops below a threshold;
moving the optical element along the first axis in a second direction until the power drops below the threshold;
determining a revised first alignment position along the first axis between the positions at which the power drops below the threshold in the first and the second directions along the first axis; and
(I) aligning the optical element along a third axis including:
moving the optical element along the third axis in a first direction until the power drops below a threshold;
moving the optical element along the third axis in a second direction until the power drops below the threshold;
determining a third alignment position along the third axis between the positions at which the power drops below the threshold in the first and the second directions along the third axis.
(J) aligning the optical element along a fourth axis including:
moving the optical element along the fourth axis in a first direction until the power drops below a threshold;
moving the optical element along the fourth axis in a second direction until the power drops below the threshold;
determining a fourth alignment position along the fourth axis between the positions at which the power drops below the threshold in the first and the second directions along the fourth axis; and (K) realigning the optical element along the third axis including:
moving the optical element along the third axis in a first direction until the power drops below a threshold;
moving the optical element along the third axis in a second direction until the power drops below the threshold;
determining a revised third alignment position along the third axis between the positions at which the power drops below the threshold in the first and the second directions along the third axis; and (L) positioning the optical element in the revised third alignment position and realigning the optical element along the first and second axis while maintaining the optical element at the revised third alignment position relative to the third axis.

30. The method of claim 29 wherein each respective alignment position is at substantially the mid-point between the positions at which the power drops below the threshold in the first and the second directions along each respective axis.

31. The method of claim 30, wherein the optical element is an optical alignment element (OAE) configured to provide at least four degrees of freedom which effect a direction of a beam.

* * * * *